Feb. 1, 1944.    F. S. KINKEAD ET AL    2,340,599
TELETYPEWRITER EXCHANGE SYSTEM
Filed July 31, 1940    23 Sheets-Sheet 1

INVENTORS: F.S. KINKEAD
          C.W. LUCEK
BY
       J.W. Schmied
       ATTORNEY Feb. 1, 1944.  F. S. KINKEAD ET AL  2,340,599
TELETYPEWRITER EXCHANGE SYSTEM
Filed July 31, 1940    23 Sheets-Sheet 2

FIG. 2

INVENTORS: F. S. KINKEAD
C. W. LUCEK
BY
J. W. Schmied
ATTORNEY

Feb. 1, 1944.  F. S. KINKEAD ET AL  2,340,599
TELETYPEWRITER EXCHANGE SYSTEM
Filed July 31, 1940  23 Sheets-Sheet 4

INVENTORS: F.S.KINKEAD
C.W.LUCEK
BY
J.W.Schmied
ATTORNEY

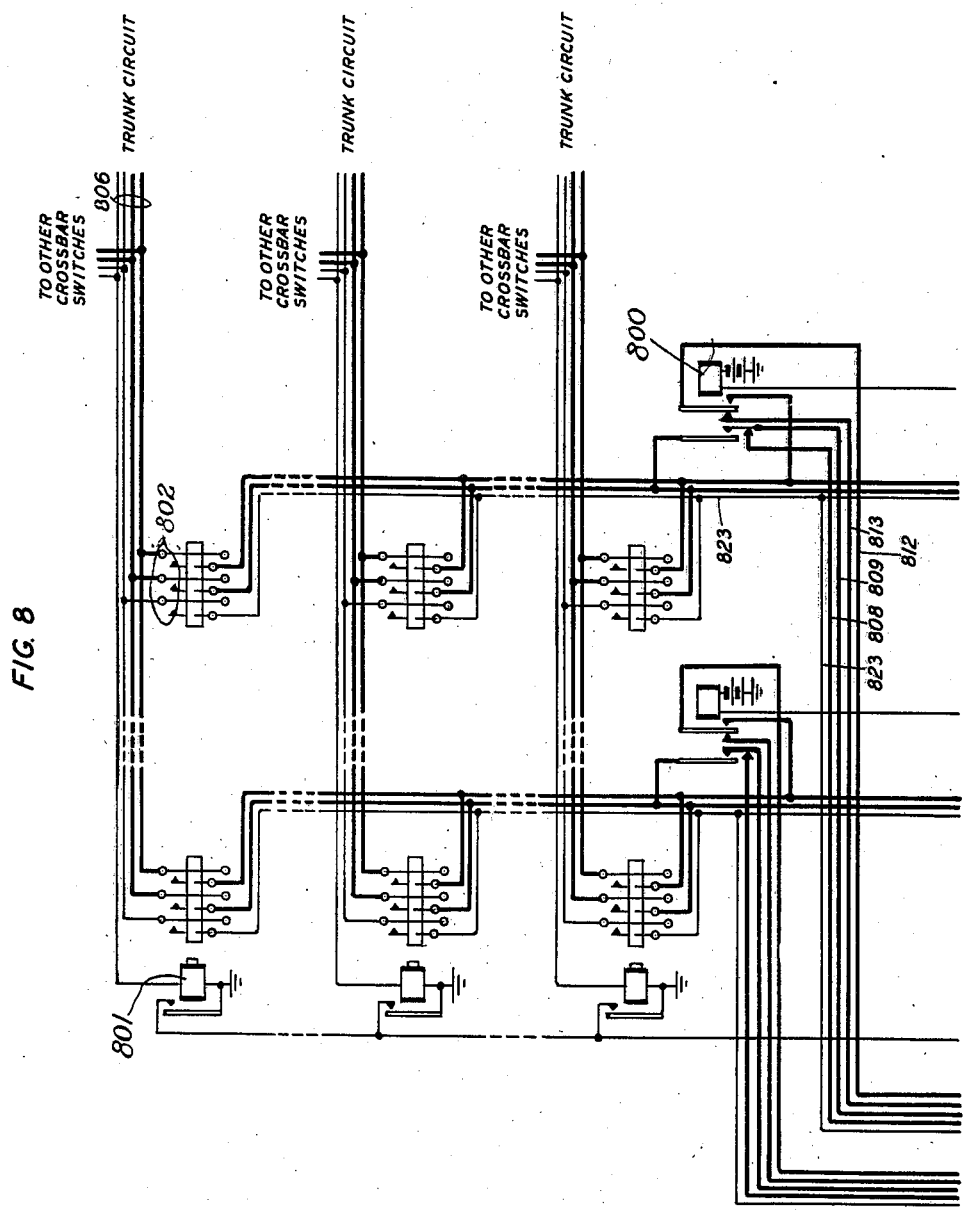

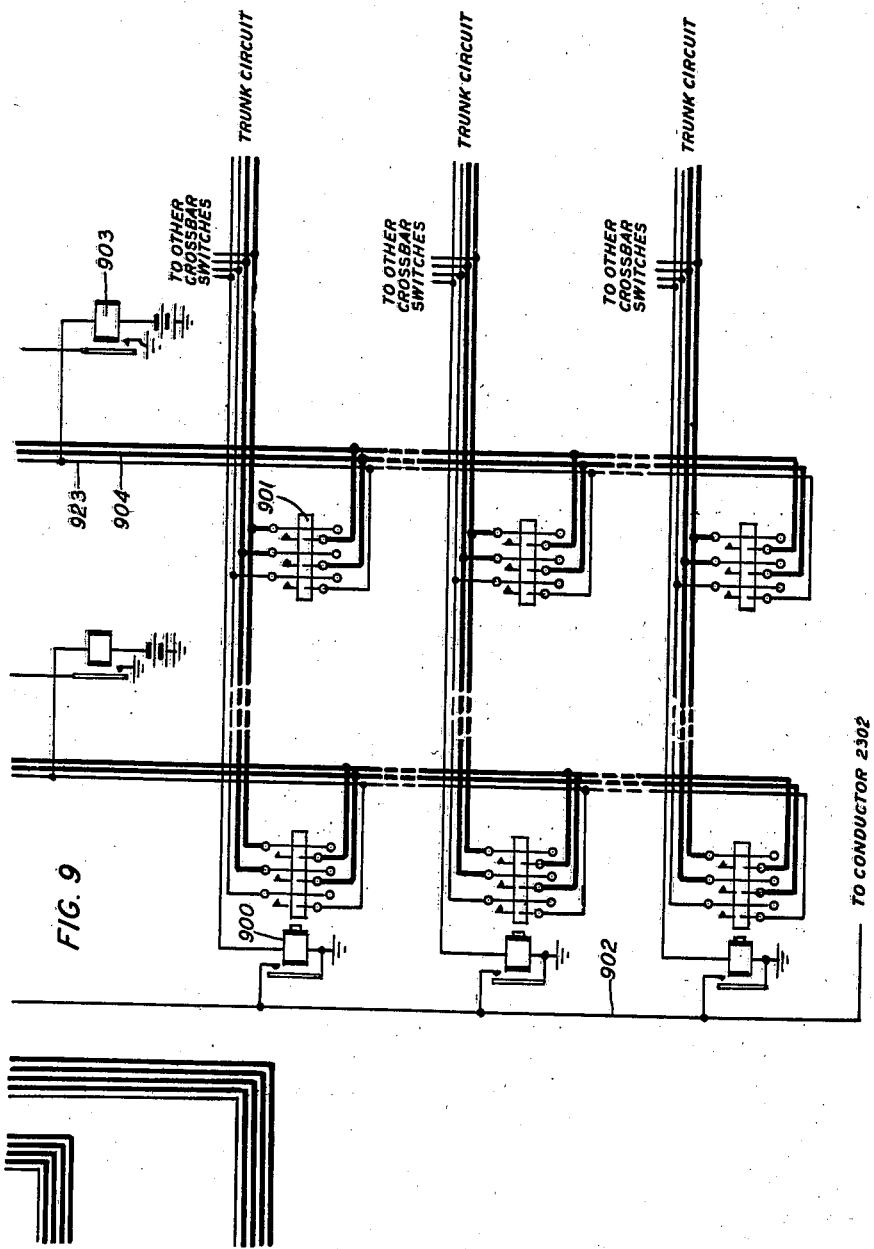

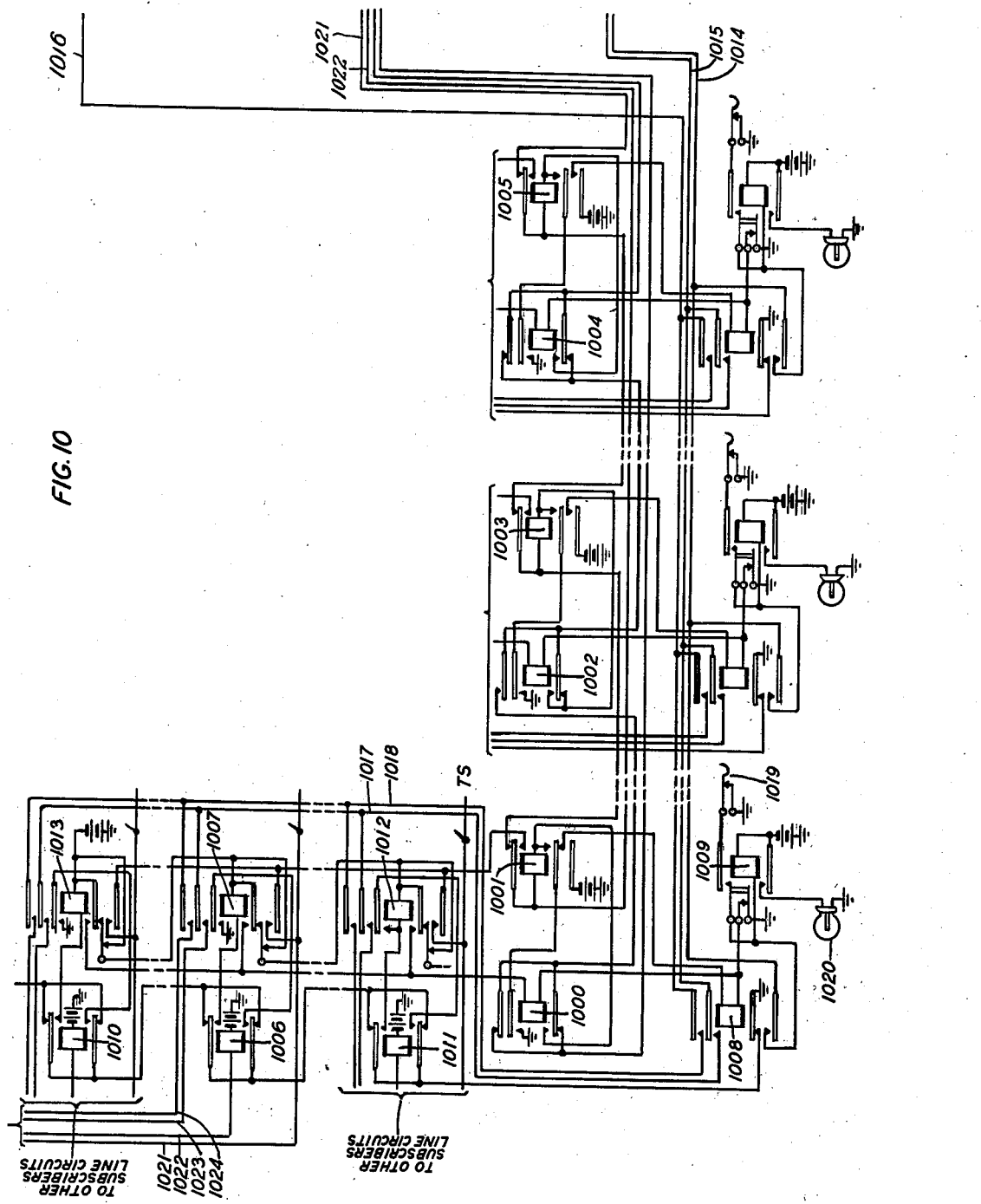

FIG. 11

Feb. 1, 1944. F. S. KINKEAD ET AL 2,340,599
TELETYPEWRITER EXCHANGE SYSTEM
Filed July 31, 1940 23 Sheets-Sheet 15

FIG. 16

INVENTORS: F. S. KINKEAD
C. W. LUCEK
BY J. W. Schmied
ATTORNEY

Feb. 1, 1944.   F. S. KINKEAD ET AL   2,340,599
TELETYPEWRITER EXCHANGE SYSTEM
Filed July 31, 1940   23 Sheets-Sheet 19

INVENTORS: F. S. KINKEAD
C. W. LUCEK
BY J. W. Schmied
ATTORNEY

INVENTORS: F. S. KINKEAD
C. W. LUCEK
BY J. W. Schmied
ATTORNEY

Patented Feb. 1, 1944

2,340,599

UNITED STATES PATENT OFFICE 2,340,599

TELETYPEWRITER EXCHANGE SYSTEM

Fullerton S. Kinkead, New York, and Charles W. Lucek, Port Chester, N. Y., assignors to Bell Telephone Laboratories, Incorporated, New York, N. Y., a corporation of New York Application July 31, 1940, Serial No. 348,628

31 Claims. (Cl. 178—2)

This invention relates to communication systems and particularly to interconnecting circuits for machine telegraph subscribers' stations. The invention is an improvement on the system disclosed in the application of Fitch et al., Serial No. 173,958, filed November 11, 1937, and the system disclosed in the application of Lucek Serial No. 262,158, filed March 16, 1939, Patent No. 2,228,279, granted Jan. 14, 1941.

The object of the invention is to provide improved supervisory equipment in common trunk circuits which will be more economical in first cost and in maintenance and more accurate in operation.

In accordance with a feature of the invention, certain timing functions are performed by vacuum tube and condenser circuits in which the grid of the tube is connected to a condenser. When a function is to be timed, the condenser is charged and when the condenser charge reaches a certain point plate current begins to flow and in turn causes a circuit change by means of controlled relays. The use of vacuum tubes and condensers for timing is old but the combinations herein disclosed and the specific uses made of these timing circuits are novel.

There is, for instance, a vacuum tube timing circuit for controlling a "cut through" operation. When a common circuit, such as a trunk to a distant office, is appropriated for use by a local station and the call is answered by an operator at the distant office, the response by the operator is timed to be sure that such response is not a fortuitous circuit change such as a hit and when this response persists long enough to characterize it as a genuine signal the circuit is cut through to a proper transmitting condition and so held thereafter under control of this vacuum tube circuit. Such a circuit may be adjusted to time out in about one-half a second.

There is, for instance, another timing circuit adjusted under one condition to time out in about two-thirds of a second to differentiate between spacing signals of permutation code signal length and other signals having the same immediate effect such as break and disconnect signals all transmitted from a subscriber's station, and under another condition to time out in about three seconds to differentiate between disconnect signals intended to cause disconnection and disconnect signals intended to "flash" the distant operator.

There is a similar timing circuit known as the operator break tube which times out on break and disconnect signals sent from the distant office. This tube circuit controls the first, so that here is an example of one timing circuit controlling another. When the distant operator sends a break signal, such a signal manifests itself at the location of these tube timing circuits as a short space signal followed by ringing current. The result is that the operator break tube operates and releases the cut through tube. Another tube known as the disconnect tube is also involved. If the space signal should persist long enough this disconnect tube would operate and cause disconnection. However, before the disconnect tube can operate the short space signal is changed to alternate mark and space signals of a frequency insufficiently low to allow the operation of either the cut through tube by a mark signal or the disconnect tube by a space signal. When the ringing current ceases and the responding relay comes to rest on either of its contacts, the corresponding one of these tubes operates. If for instance, the distant operator terminates the break in the normal manner then such relay will come to rest on its marking contact and the cut through tube will, within a time limit much shorter than its normal adjustment, operate and restore the circuit to its normal transmission condition. If the distant operator terminates the break in such a way, as by disconnecting, that the relay will come to rest on its spacing contact, then the disconnect tube will operate and cause disconnection. Another tube known as the break limiting tube will time out in about five seconds after the said relay has started to vibrate between its mark and space contacts so as to bring about a circuit change to allow the first tube, the subscriber break tube, to perform its function.

A feature of the invention may thus be stated to be a plurality of vacuum tube timing circuits, a first of which reports the beginning of a signal, a second of which reports one kind of ending of the signal, a third of which reports another kind of ending of the signal, and a fourth of which reports an undue length of the signal.

Another feature of the invention is a trunk circuit extending between two points and having a termination circuit at each end. A supervisory signal coming to this trunk will be reported by a vacuum tube and condenser timing circuit in the termination circuit at the near end of the trunk and reported in the termination circuit at the far end of the trunk in respect to its beginning, the manner of its ending, and its duration.

A further feature of the invention is the combination of the special supervisory means hereinbefore described in a system involving an established connection including as one section thereof a trunk circuit extending between two points and having a termination circuit at each end thereof. By means of such an established connection, communication signals may be transmitted from end to end of such a connection but supervisory signals cause the connection to break up automatically into separate sections and rearrange the various termination circuits so that the supervisory signal is transmitted over each section in a form suitable for that section and unsuitable for an adjacent section. The use of the aforesaid vacuum tube and condenser timing circuits besides giving marked advantage in accuracy in measuring time intervals also results in simplification of the circuit and reduction in both first cost and maintenance.

The drawings consist of twenty-three sheets. The first sheet contains Fig. 1 and Fig. 7.

Fig. 1 is a diagram showing how Figs. 2 to 6, inclusive, and Figs. 8 to 24, inclusive, shall be placed to form a complete circuit diagram illustrating the invention;

Fig. 7 is a like representation of the placing of the various figures, with circuit function designating captions placed in the corresponding positions;

Figs. 2 and 3 show two varieties of toll subscribers' station circuits;

Figs. 8 and 9 show the link circuit, in this case a cross-bar type switch, used to establish connections between subscribers' circuits and trunk circuits extending to distant TWX offices;

Figs. 11 and 13 show the concentration unit termination of an automatic signaling master office trunk circuit extending to distant TWX office;

Figure 12:
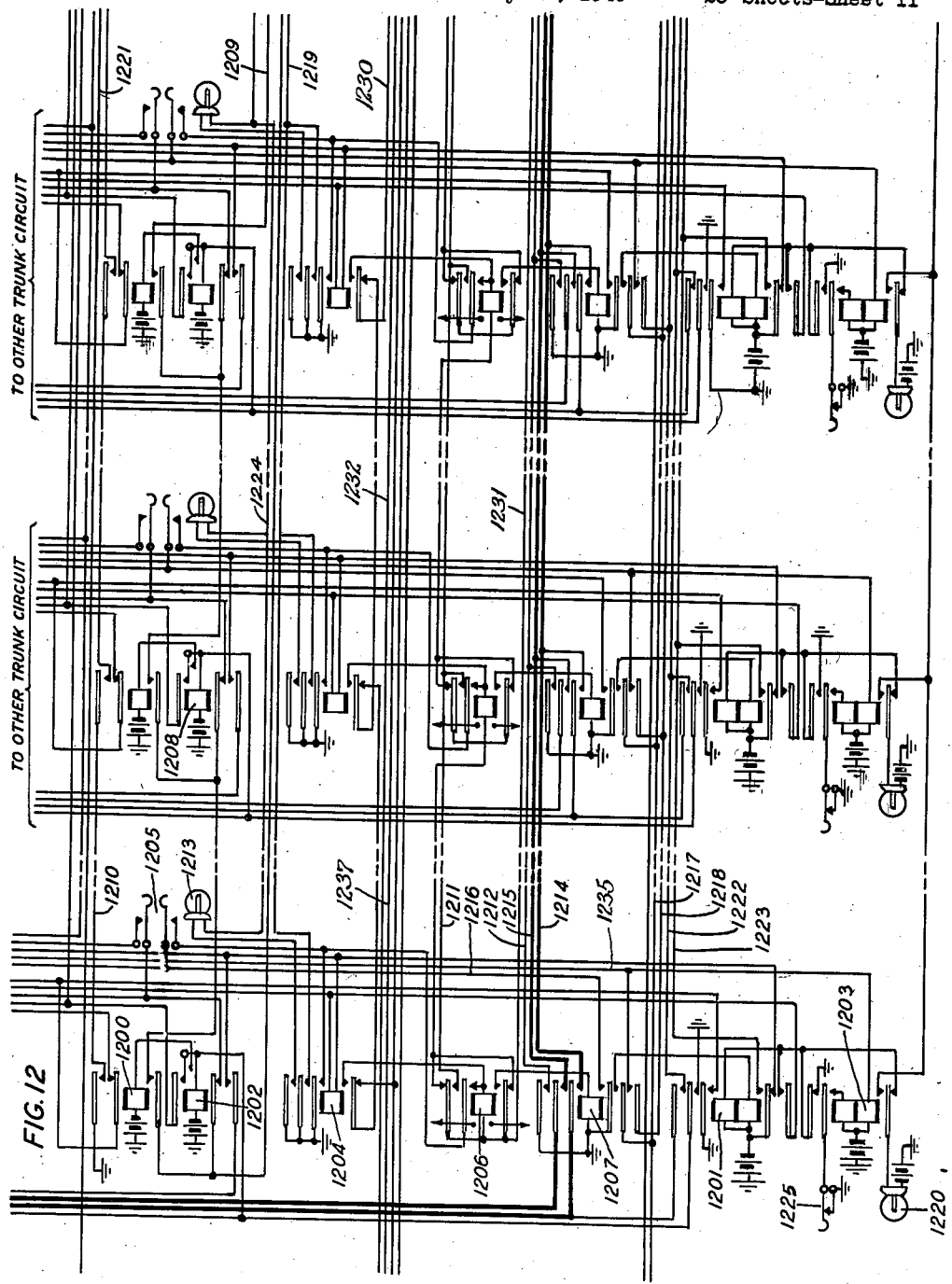
Figure 14:
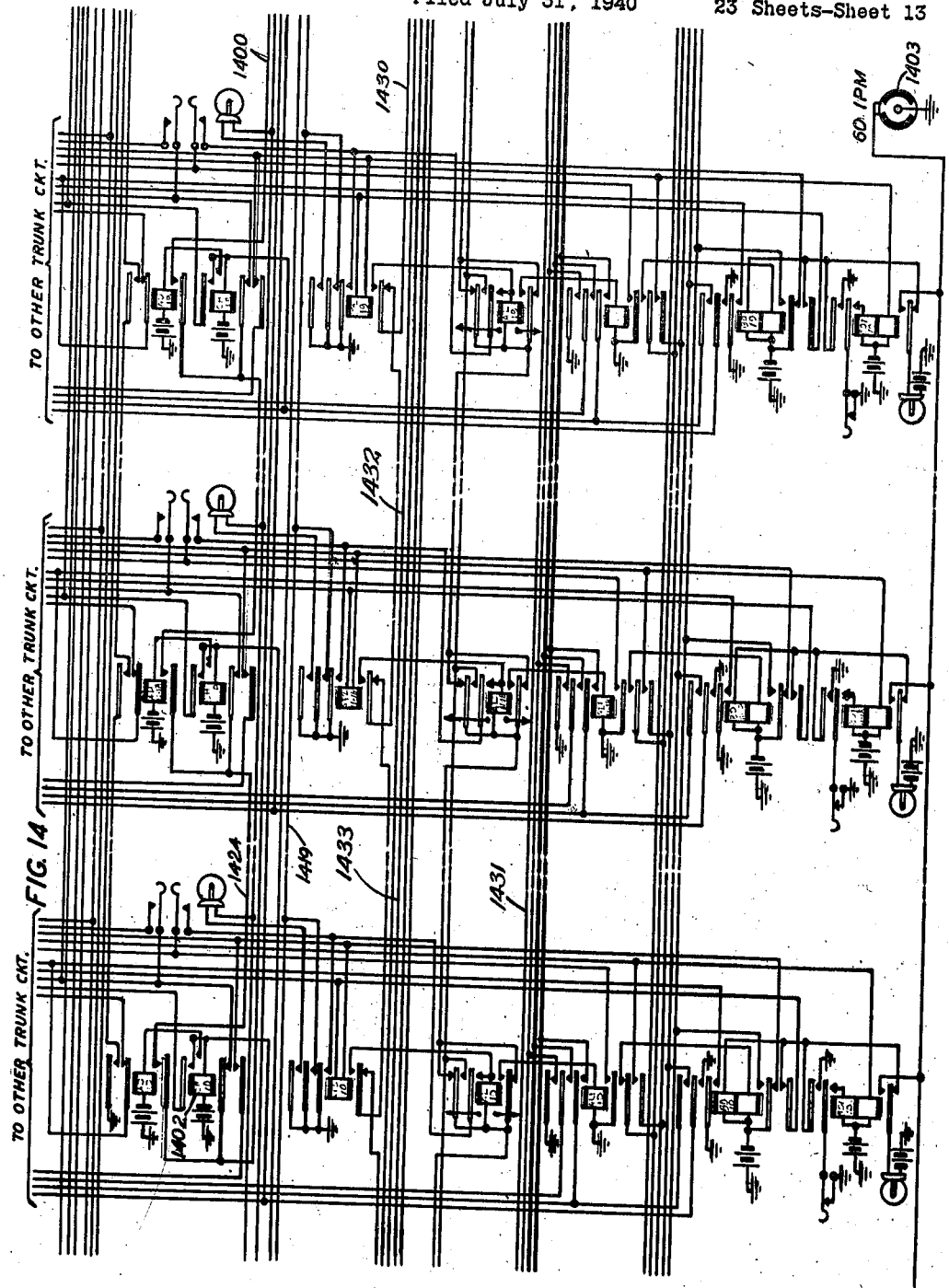
Figure 20:
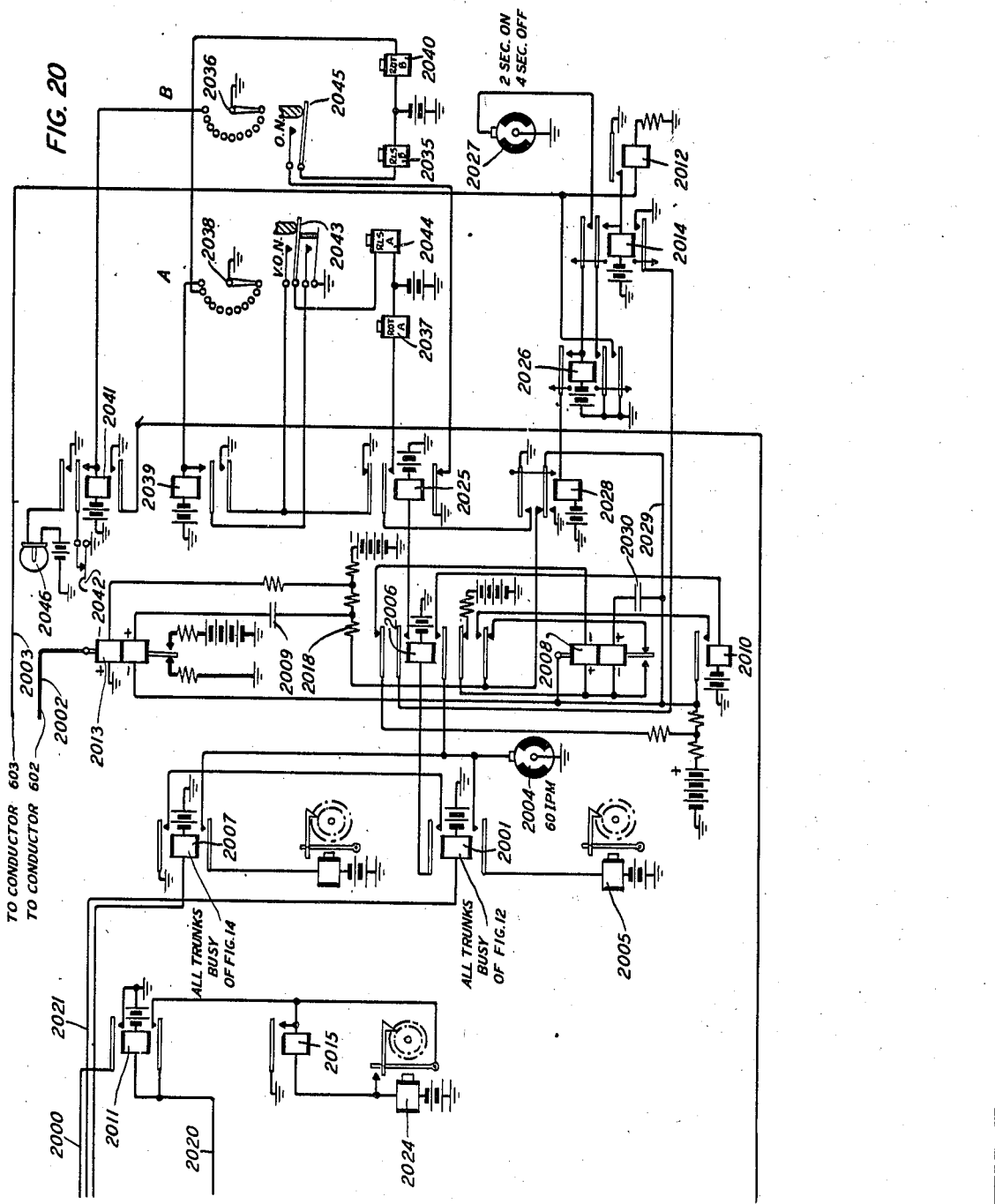
Figure 21:
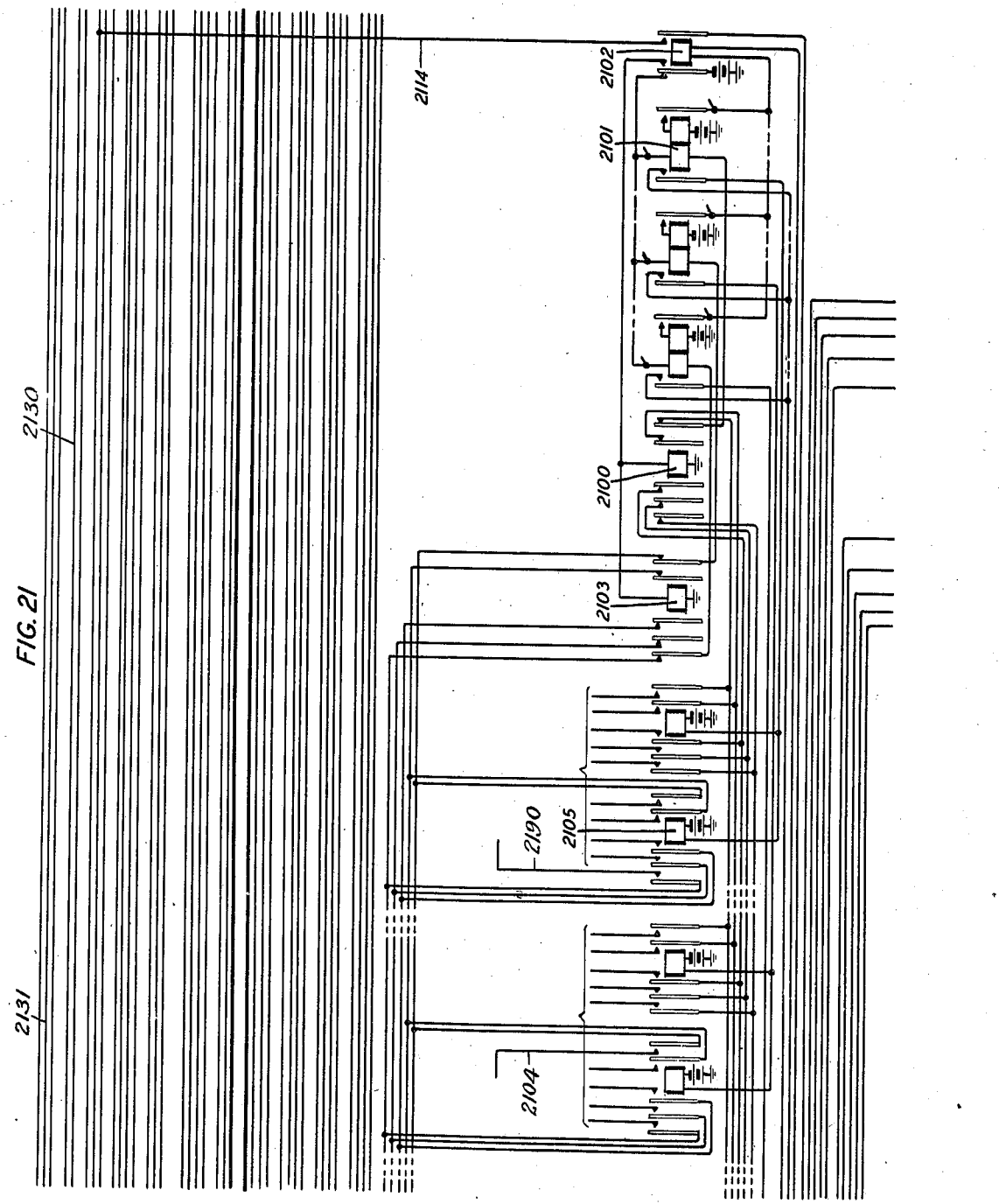
Figure 22:
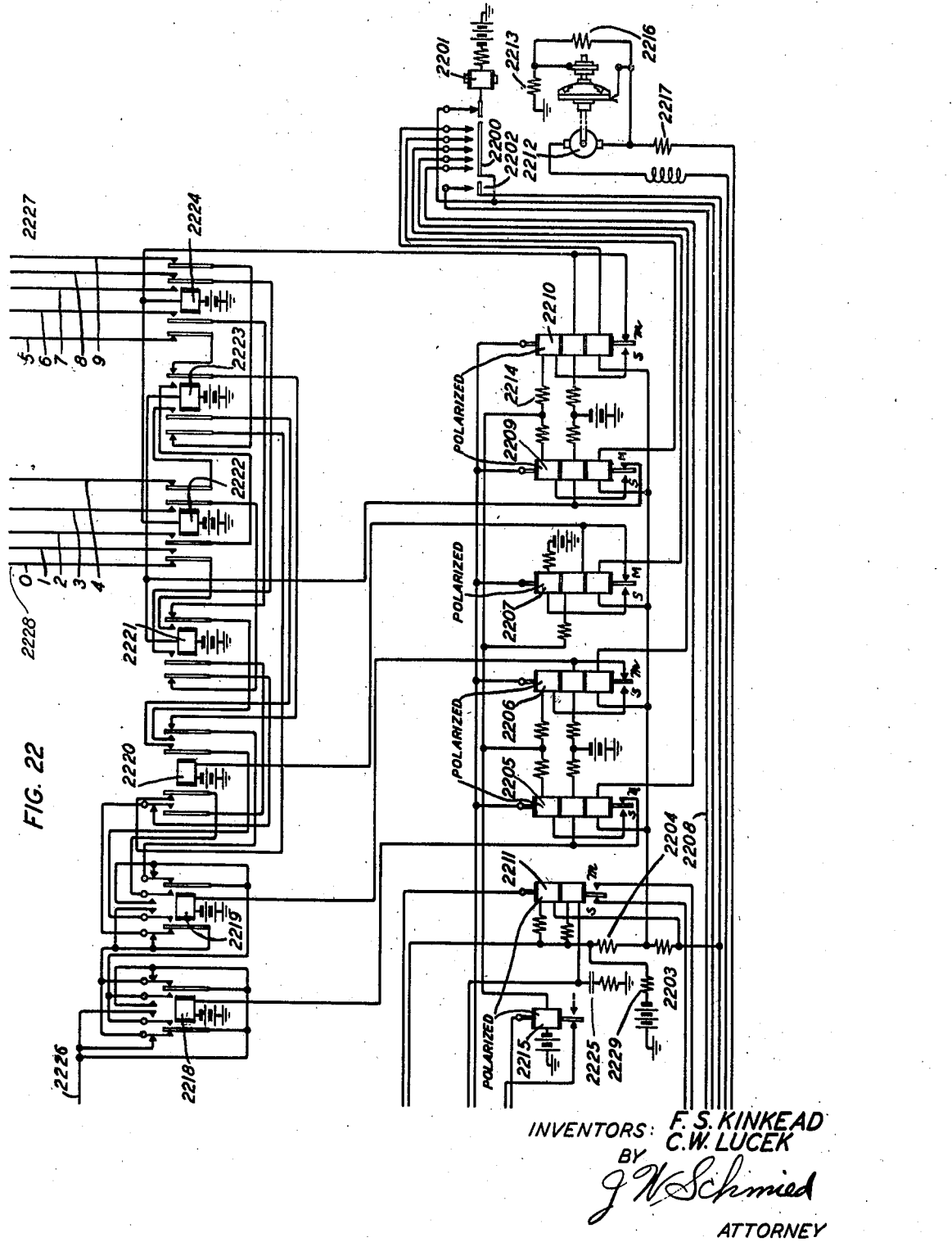

Figs. 10, 12, 14 and 16 together show a sequence circuit. Fig. 10 shows the subscriber line sequence, Figs. 12 and 14 show the trunk sequence, and Fig. 16 shows certain common controls;

Figs. 17, 18, 21 and 22 show the director circuit;

Fig. 20 shows an all-trunks-busy circuit; and

Figure 23:
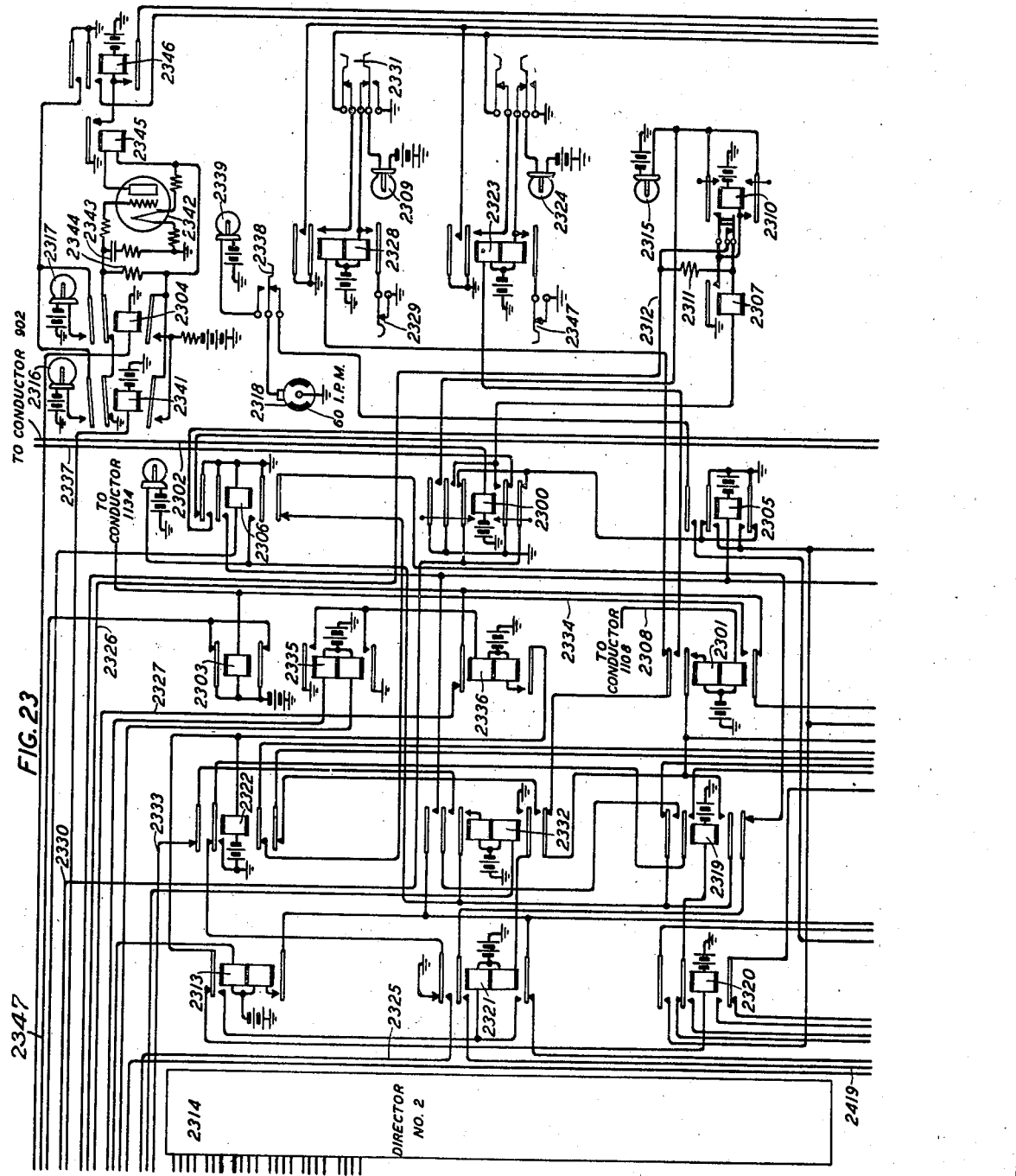
Figure 24:
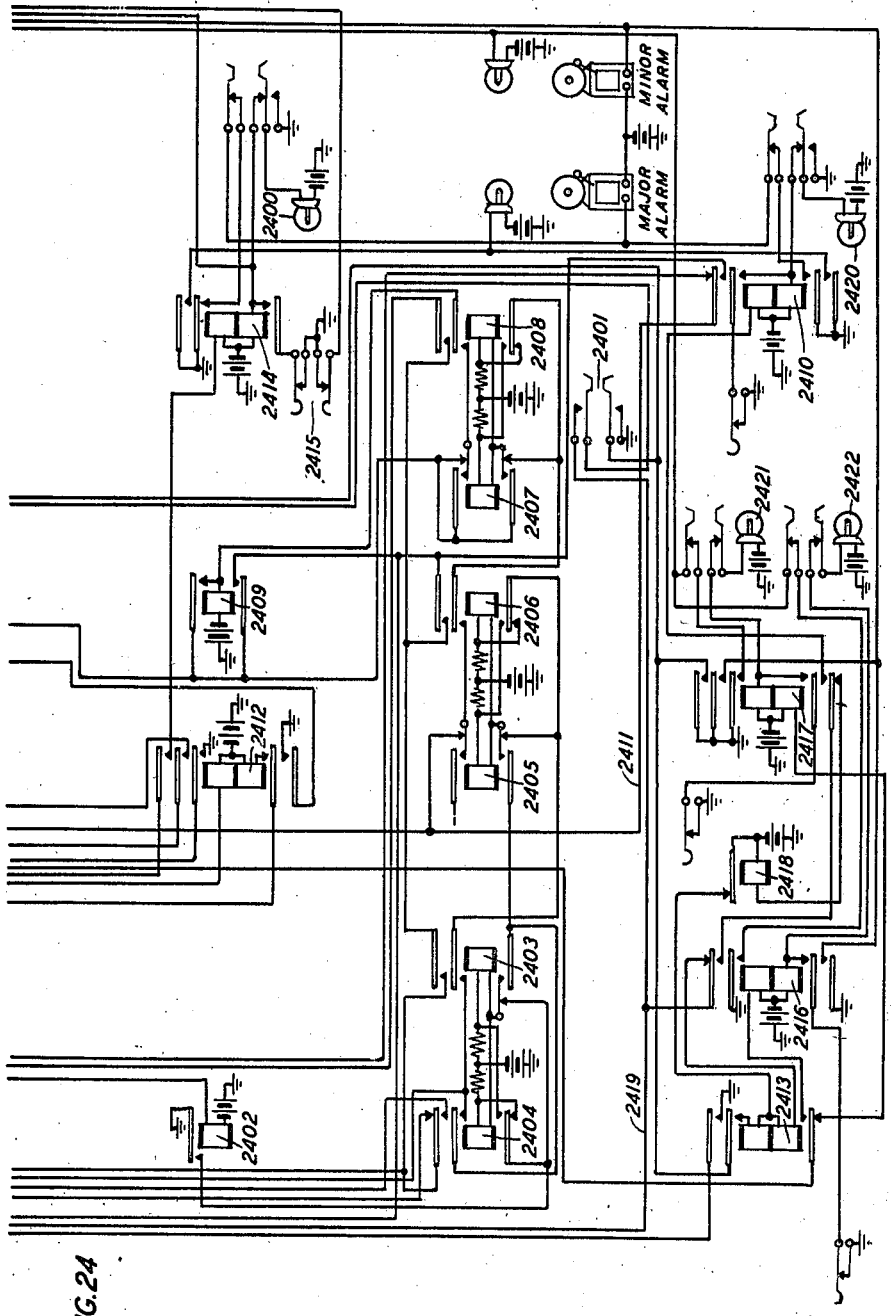

Figs. 23 and 24 show the miscellaneous alarm circuit.

The numbering of the various pieces of apparatus and parts of the circuit shown on the various figures has been kept to a rigid plan. Thus all numerals on Fig. 2, for instance, are numerals between 200 and 299, the hundred numeral designating the figure. Likewise, for example, all of the numerals in Fig. 18 lie between 1800 and 1899 and thus begin with the designating numeral 18.

In some cases in order to avoid the tracing of a conductor through many sheets, it is terminated in one sheet with a label. Thus conductor 902 in Fig. 9 which extends to Fig. 23, is labelled in Fig. 9 "To conductor 2302." Similarly, in Fig. 23 this conductor is labelled "To conductor 902."

The complete operation of the system is set forth hereinafter under various headings, as follows:

Local subscriber's station

Figure 4:
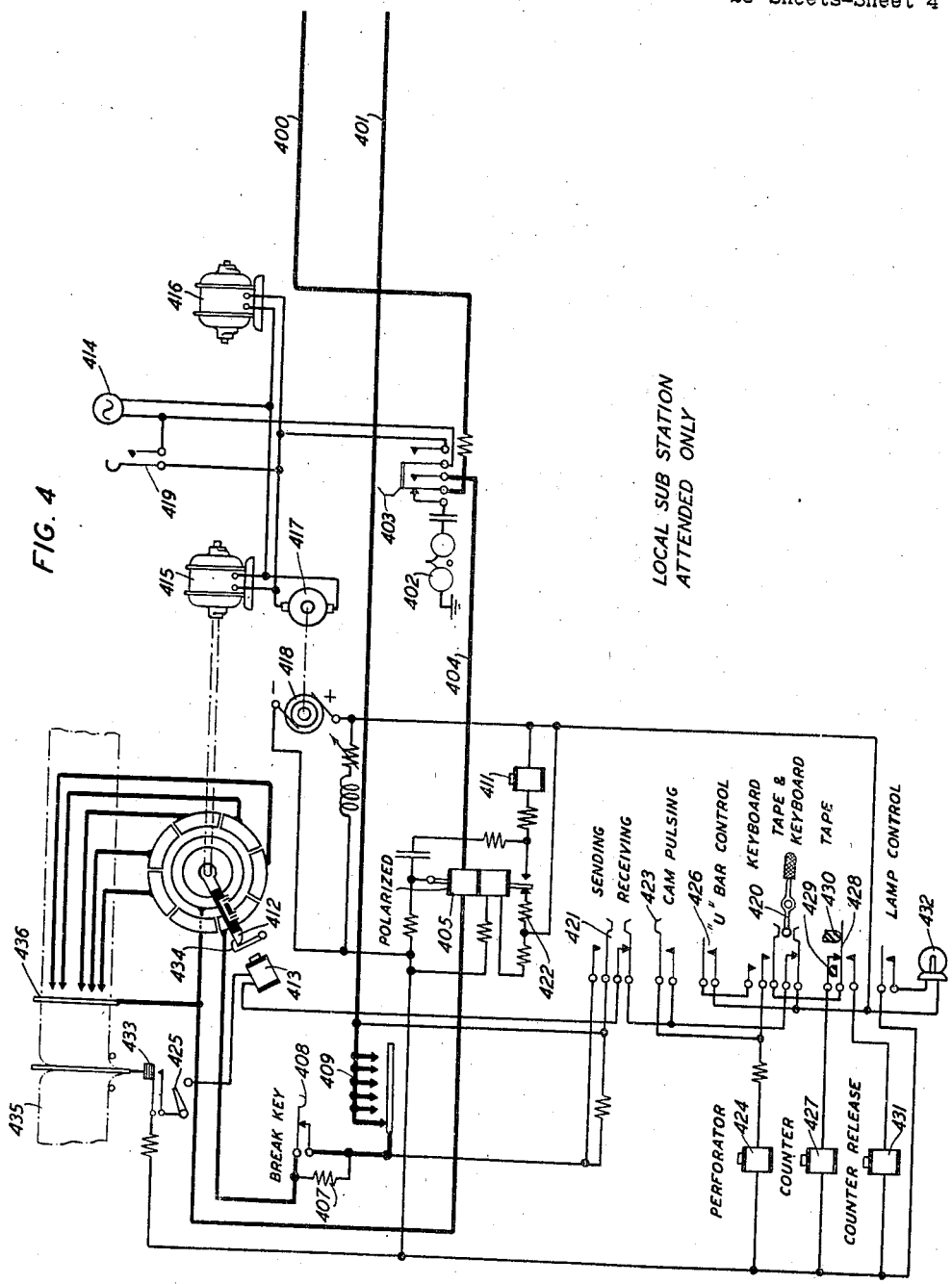
Fig. 4 shows a local subscriber's station circuit.

In Fig. 4 there is illustrated in schematic form a local subscriber's station connected with the concentration unit by a pair of lines 400 and 401. In idle condition, line 400, known as the tip, is connected to a ringer 402 so that incoming calls to this station will be indicated by the sounding of the ringer 402 through the application of ringing current to the tip 400 at the concentration unit. When the station is in use, the switch 403 is operated to connect the tip conductor 400 through to conductor 404 and thence through the loop comprising upper winding of relay 405, brush arm 412, resistance 407 and break key 408 in parallel, pulsing contacts 409 to the ring side of the line 401. Under circuit conditions to be explained hereinafter current will flow through this circuit at a value of about 20 milliamperes for a marking condition and zero for a spacing condition. With steady marking current established by the conditions at the concentration unit the operation of the pulsing contacts 409 in series with this circuit will reduce the current to the spacing value.

The biasing winding of relay 405 has a current of an intermediate value flowing therethrough so that with no current flowing through the upper winding in the spacing condition, the armature will remain on its spacing contact, but with the marking current flowing through its upper winding the biasing winding will be overcome and the relay will move to its marking contact. Incoming marking and spacing signals will therefore operate the printing magnet 411 in the proper manner and these same current variations caused by the operation of pulsing contacts 409 will cause the operation of relay 405 to again operate the printing magnet 411 for the purpose of making local copy.

Under idle condition of the distributor 412, the loop circuit through the station is closed. Therefore, when the magnet 413 is operated which attracts latch 434 and releases the brush arm 412 and the distributor arm 412 begins to travel over its segments, spacing signals will be created by the opening of the loop and marking signals will be created by closing of the loop.

A special point to be noted in connection with this subscriber's station is the manner in which a call may be originated from the station. The key 403 may be operated to close the loop, whereupon current of the marking value will be established which will cause an operation of one kind at the concentration unit. On the other hand, the break key 408 may be first operated and held operated for a short space of time until the switch 403 has been operated. In this case current of a reduced value as determined by the inclusion of resistance 407 in the loop will first be established so that an operation of a different nature will take place at the concentration unit.

From the subscriber's point of view the operation will be as follows: Commercial arrangements have been made so that this subscriber will ordinarily be connected with a certain distant office. Therefore, when the subscriber initiates a cell by throwing the starting switch 403, the call will be automatically directed toward this specified distant office. However, there may be occasions when the subscriber wishes to have his call directed toward a different distant office. In this case he knows that by operating the key 408 and holding it operated until he has operated the start key 403 his call will be automatically directed toward this secondary choice office. The manner in which his call is directed to one or another office under these conditions will be explained more fully hereinafter.

In somewhat more detail the operation of the local subscriber's station in Fig. 4 will now be described. For a full and complete explanation of these circuits and the detailed means by which they are operated, reference may be had to the following prior art: Patent No. 1,904,164 to S. Morton et al., April 18, 1933; Patent No. 1,965,572 to C. W. Burcky et al., July 10, 1934; Patent No. 1,965,602 to R. A. Lake, July 10, 1934; Patent No. 1,969,891 to R. A. Lake et al., Aug. 14, 1934; and Patent No. 2,019,505 to A. H. Reiber, Nov. 5, 1935.

The operation of switch 403 besides closing the tip through to the station circuit also effectively connects the local source of power 414 to three motors 415, 416 and 417. Motor 415 operates the distributor designated by its arm 412. Motor 416 operates the teletypewriter unit comprising the pulsing contacts 409 and the mechanism under control of the printing magnet 411. Motor 417 operates a generator 418 which supplies local power to the teletypewriter apparatus. It should be noted also that a switch 419 will start these three motors while leaving the tip conductor 400 connected to the ringer 402 so that should the subscriber desire, he may be perforating tape preparatory to transmitting at some later time, while holding the station in a condition to receive an incoming call. This station is equipped with a keyboard transmitter as well as a tape transmitter and means is provided for either sending permutation code pulses directly from the keyboard and at the same time perforating tape, or for perforating a tape alone. In case it is desired to employ only the keyboard transmitter, the switch handle 420 is operated in its upper position, marked "Keyboard," where it interrupts the circuit of the start magnet 413 of the tape-controlled transmitter-distributor 412. In order to transmit, the subscriber must also operate the sending and receiving switch 421 to the position shown so that the transmission circuit extends through the pulsing contacts 409. When the subscriber operates the keyboard, pulsing contacts 409 transmit telegraph signaling impulses in accordance with the keys operated by the subscriber by opening and closing the line to the transmission circuit.

The line relay 405 will follow the signal impulses and repeat them to the printer magnet 411 which records the transmitted signals on the local teletypewriter and provides a home copy for the subscriber. Relay 405 in its spacing position connects resistance 422 between the positive and negative terminals of the generator 418 to compensate for the load of the printer magnet 411 and thus maintain the load on the generator substantially constant when relay 405 is in both its marking and spacing conditions.

In case the subscriber wishes to perforate tape at the same time the message is transmitted from the keyboard, key 420 is left in its intermediate position so that the lower contacts of this key are closed. This completes a circuit from the positive terminal of the generator through the lower contacts of key 420 to the cam pulsing contacts 423. These cam pulsing contacts are controlled by the cams which actuate pulsing contacts 409. Thus during each rotation of the cams during which the impulses representing a particular character are transmitted, the cam pulsing contacts 423 are closed once. When these contacts are closed a circuit may be traced through them for the operation of the tape perforating magnet 424 from the positive terminal of generator 418, lower contacts of key 420, the cam pulsing contacts 423, through the winding of perforator magnet 424 to the negative terminal of generator 418. This causes the perforator magnet to operate and perforate a series of holes in the tape in accordance with the particular character key depressed.

When the subscriber wishes to transmit from the keyboard it is essential that the transmitter-distributor switch 425 remain open so that the brush arm 412 of the distributor will remain at rest and not interfere with the transmission from the pulsing contacts 409.

Means is also provided for permitting the subscriber to perforate tape and then transmit from the perforated tape. In case the subscriber wishes to merely perforate tape, he operates key 419 which, as hereinbefore mentioned, causes the connection of the local power supply to the motors at the substation but does not connect the line to the concentration unit. In order to perforate the tape the key 420 is operated to its lower position, marked "Tape," where all of the contacts of the key are closed. In this position a mechanical connection between key 420 and the cams controlling the pulsing contacts 409 functions to prevent the operation of these pulsing contacts 409. Consequently, the cam pulsing contacts are unable to operate for each depression of a keyboard key. Instead, the U-bar contacts 426, which operate each time a keyboard key is depressed, are employed. Such U-bar contacts are only effective upon the operation of key 420 to the "Tape" position.

Under these conditions the line relay 405 and the printer magnet 411 are maintained in their spacing positions since the operating circuit for the line relay 405 is opened at the switch 403 and the relay 405 is held to its spacing contact through its biasing winding. Inasmuch as the pulsing contacts 409 do not function at this time, no copy of the symbols recorded on the tape will be printed on the teletypewriter. This necessitates the use of a counter to count the characters transmitted in each line. This is operated by a magnet 427 which is energized in a circuit from negative terminal of generator 418, winding of counter magnet 427, counter contacts 428, upper contacts of key 420 and U-bar contacts 426 to the positive terminal of the generator. Thus every time the U-bar contacts are operated by one of the keyboard keys, counter magnet 427 is operated to count the character. However, in case a shift or unshift signal or certain other signals are transmitted, the lever 429 moves in the direction indicated and mechanically opens the counter contacts 428 so as to interrupt the circuit of the counter magnet 427, since these particular signals do not cause any character to be printed on the teletypewriter and therefore do not require space in a line of characters. When sufficient characters to constitute a line have been recorded counter contacts 428 are operated by lever 430 in response to a carriage-return signal and thus cause the operation of release magnet 431 which restores the counter to zero.

The counter lamp 432 is provided to give a visible signal when sufficient characters have been recorded to form almost a line so that a carriage-return signal may be sent at the end of the next word or syllable.

In this way a supply of tape may be perforated without transmitting the information stored in the tape over the line to the concentration unit. If it is desired to return the equipment to normal without transmitting the information at this time, switch 419 is returned to normal and the power supply cut off.

When it is desired to transmit from the tape the transmission circuit is established by the operation of switch 403, as heretofore described. After the circuit is fully established the key 420 is operated to the "Tape" position and switch 425 is closed. This completes a circuit from the negative terminal of generator 418 through the tape control contacts 433, key 425, winding of start magnet 413, sending-receiving contacts 421 and lower contacts of key 420 to the positive terminal of generator 418. Start magnet 413 operates in this circuit and withdraws the stop latch 434 from engagement with the brush arm 412. The brush arm is driven through a friction clutch (not shown) from motor 415 and as it carries its brush over the various segments of the distributor, the line circuit extending to the concentration unit is opened and closed in accordance with the perforations of tape 435 under the tape control contacts 436. So long as the supply of perforated tape is available, tape control contacts 433 remain closed and the transmitter-distributor continues to transmit over the line to the concentration unit. Transmission relay 405 follows the signals transmitted by the distributor 412 and repeats them to printer magnet 411 of the teletypewriter where they are recorded.

It is also possible for the subscriber to perforate additional tape at this time by the operation of the keyboard. The perforation of the tape at this time is just the same as described above when no signals were transmitted from the subscriber's station.

In case the supply of perforated tape 435 becomes exhausted the tape control contacts 433 will open and interrupt the circuit of magnet 413 which will in turn release latch 434 to engage the brush arm 412 and interrupt the transmission over the line to the concentration unit until more tape is supplied.

*Toll subscriber's station—Attended only*

Figure 2:
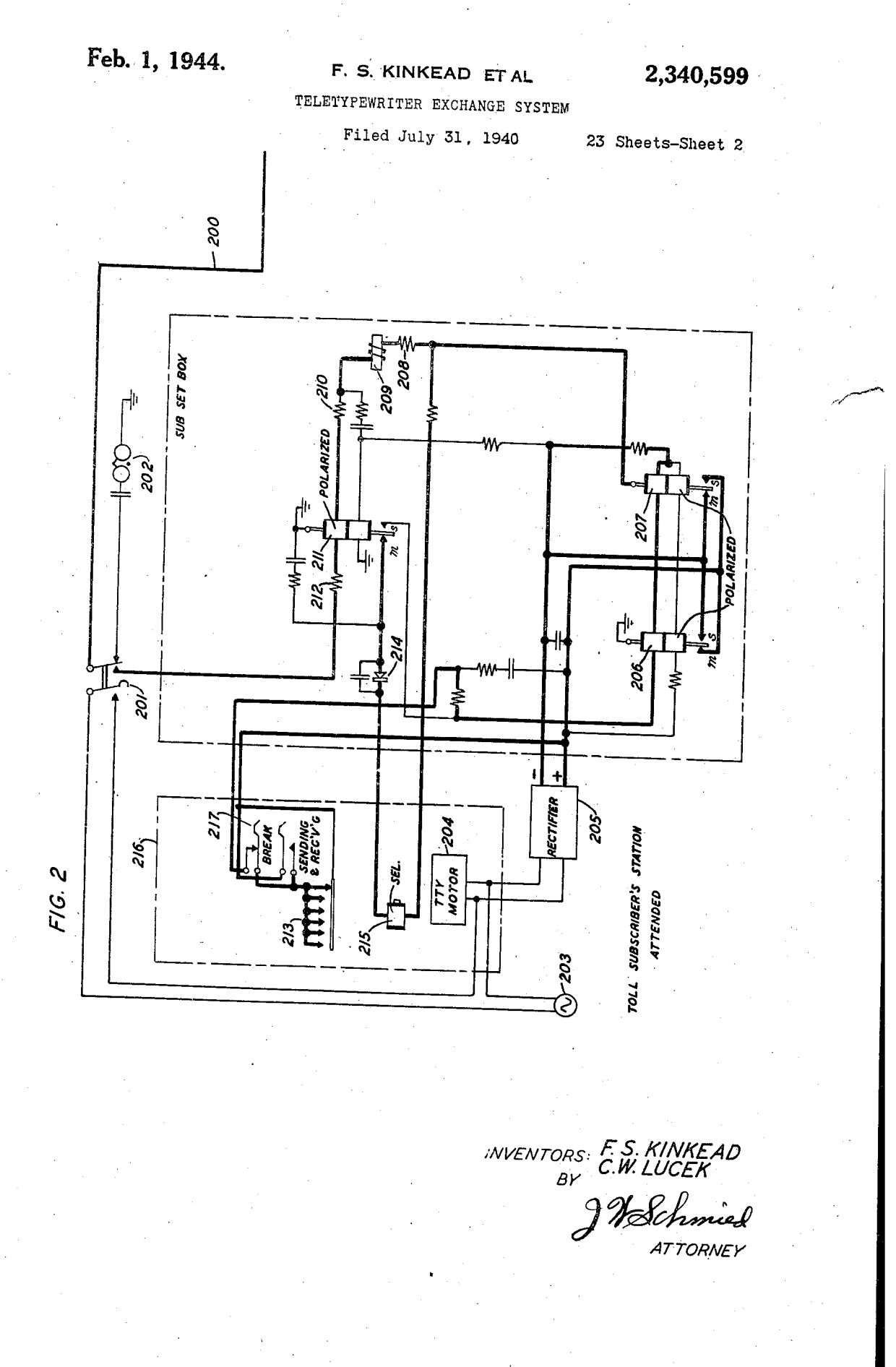
Figure 5:
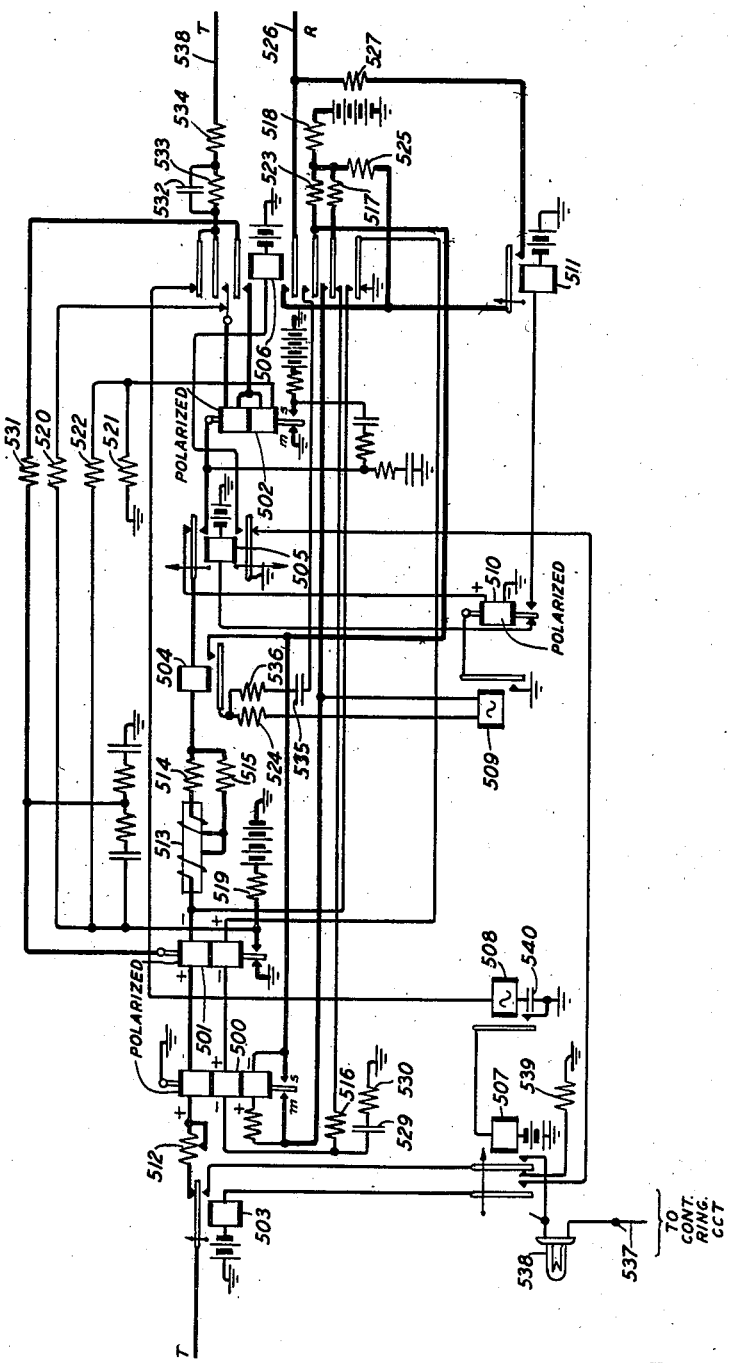
Fig. 5 shows a toll subscriber's line circuit.
Figure 6:
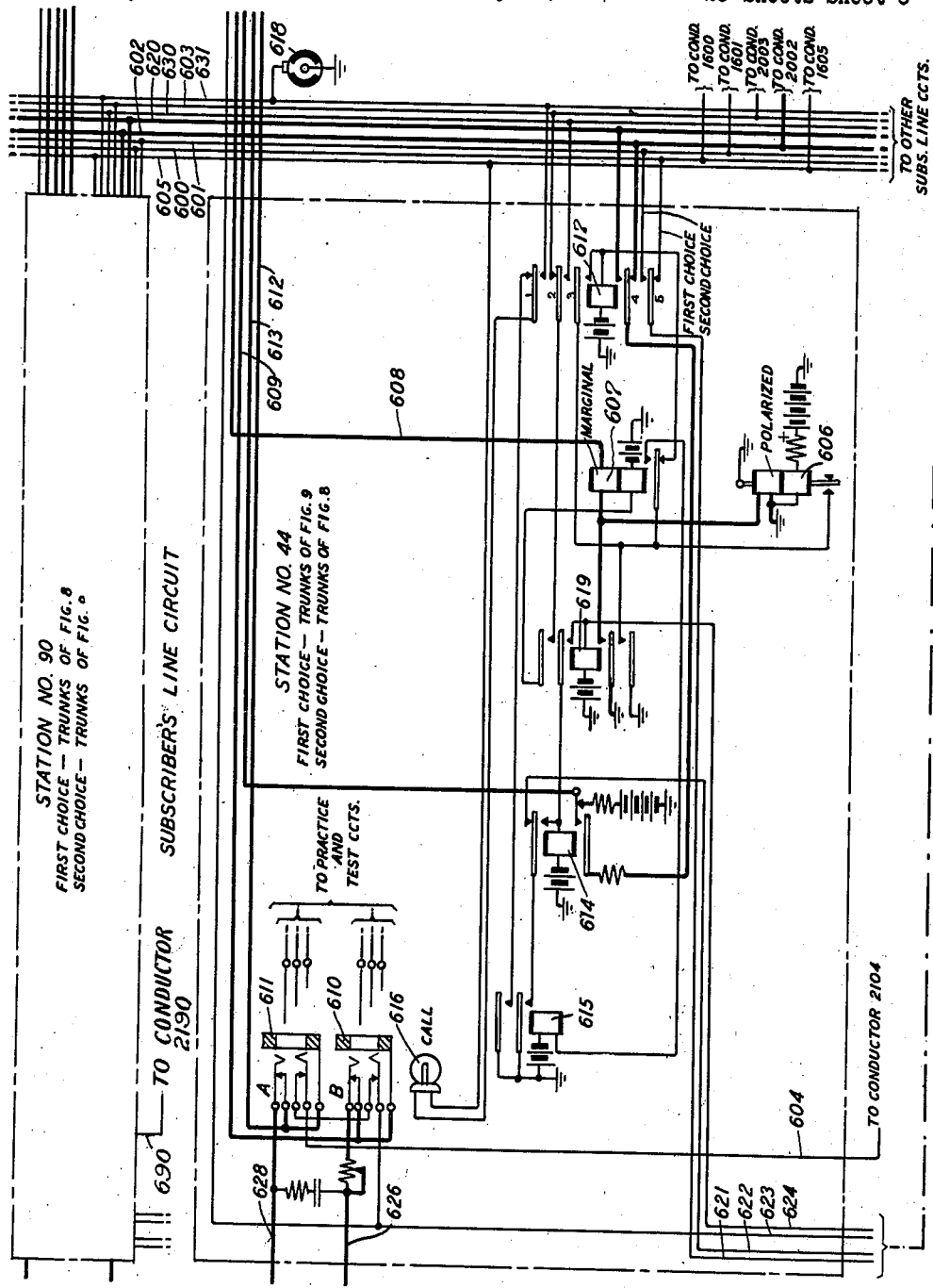
Fig. 6 shows a subscriber's line circuit which will operate with either a local subscriber's station circuit or the toll subscriber's line circuit.

In Fig. 2 there is shown a toll subscriber's station which by connecting to a toll subscriber's line circuit (Fig. 5) will ultimately operate a subscriber's line circuit (Fig. 6) in the same manner that the local subscriber's station (Fig. 4) operates such a subscriber's line circuit (Fig. 6). The toll subscriber's station is connected with the concentration unit by a single line conductor 200 and the toll subscriber's line circuit (Fig. 5) acts as a translating medium to translate the operations at this subscriber's station into operations equivalent in effect to those at the local subscriber's station.

Under the idle condition conductor 200 is connected through the off position of switch 201 to the bell 202 and no current flows through the line. When the switch 201 is thrown to the on position, a current will flow through the line 200 which may, for example, be −30 milliamperes. This will be the marking condition. When permutation code impulses are being sent from the concentration unit as will be more fully explained hereinafter, the marking impulse will be as stated, −30 milliamperes and the spacing current will be −80 milliamperes or thereabouts. Thus the transmission from the concentration unit will be a low value of current for marking and a high value of current in the same direction for spacing. Transmission in the opposite direction, that is, from this station to the concentration unit, will be of a different nature. Marking current will be −30 milliamperes but spacing current will be +30 milliamperes.

Assuming the switch 201 to be in its on position, the local source of power 203 will be connected both to the teletypewriter motor 204 and to the rectifier 205. The rectifier supplies direct current to the local circuit, for example, 75 volts. The plus and minus poles of this direct current source are indicated coming from the rectifier 205. Under line-closed conditions marking current is established through a circuit from ground, the armature of relay 206 and its marking contact, the plus lead of rectifier 205, the minus lead of rectifier 205, the marking contact of relay 207, armature of relay 207, resistance 208, inductance coil 209, resistance 210, upper winding of polarized relay 211, resistance 212, contacts of switch 201 to the line 200. The application of −75 volts in series with this circuit to what will later appear to be a ground connection at the concentration unit, causes the flow of −30 milliamperes.

The relays 206 and 207 respond to the pulsing contacts 213, being held in the position shown for marking and having their armatures driven to their alternate positions by the biasing current in their lower windings when the circuit through their upper windings is broken at the pulsing contacts 213 for a spacing condition. With the armatures of relays 206 and 207 in their alternate positions, the plus and minus poles of the rectifier are effectively reversed so that now a +75 volts is included in series with the line and meeting, as will later appear, a ground connection at the concentration unit a current of +30 milliamperes will flow.

The means for causing currents of different value for marking and spacing to flow over this line under control of the concentration unit will be described hereinafter. The effect of this, however, can be seen at once. The polarized relay 211 is biased in such a manner that the −30 milliampere current does not move the armature from the position shown. However, when the current is increased to −80 milliamperes the bias is overcome and the relay moves to its spacing contact.

Under marking conditions a circuit is established from ground, the armature of relay 211 and its marking contacts, through the rectifier 214, the selecting magnet 215 of the teletypewriter, the armature and marking contact of polarized relay 207, the minus pole of rectifier 205, the positive pole of this rectifier to ground at the armature of relay 206. When the relay 211 moves to its spacing contact the above-described circuit is broken. Thus as relay 211 responds to incoming permutation code impulses the selector magnet 215 will respond and operate the teletypewriter generally indicated in the broken-line rectangle 216.

When the subscriber wishes to transmit from this substation he will operate the keyboard which will in turn operate the pulsing contacts 213. This will affect the relays 206 and 207 and send different permutation code impulses in accordance with the characters selected on the keyboard.

A point to be noted in connection with this station is that the subscriber in initiating the call to the concentration unit may do so by merely closing the switch 201 whereby a marking current condition will be established or he may, alternatively, first operate the break key 217 and hold it operated until he has operated the key 201 whereby a spacing condition will be first established. In accordance with the call being initiated by either a marking or a spacing current condition the toll subscriber's line circuit (Fig. 5) will respond and translate this into a condition similar to that described in connection with the local subscriber's station (Fig. 4).

Unattended toll subscriber's station

Figure 3:
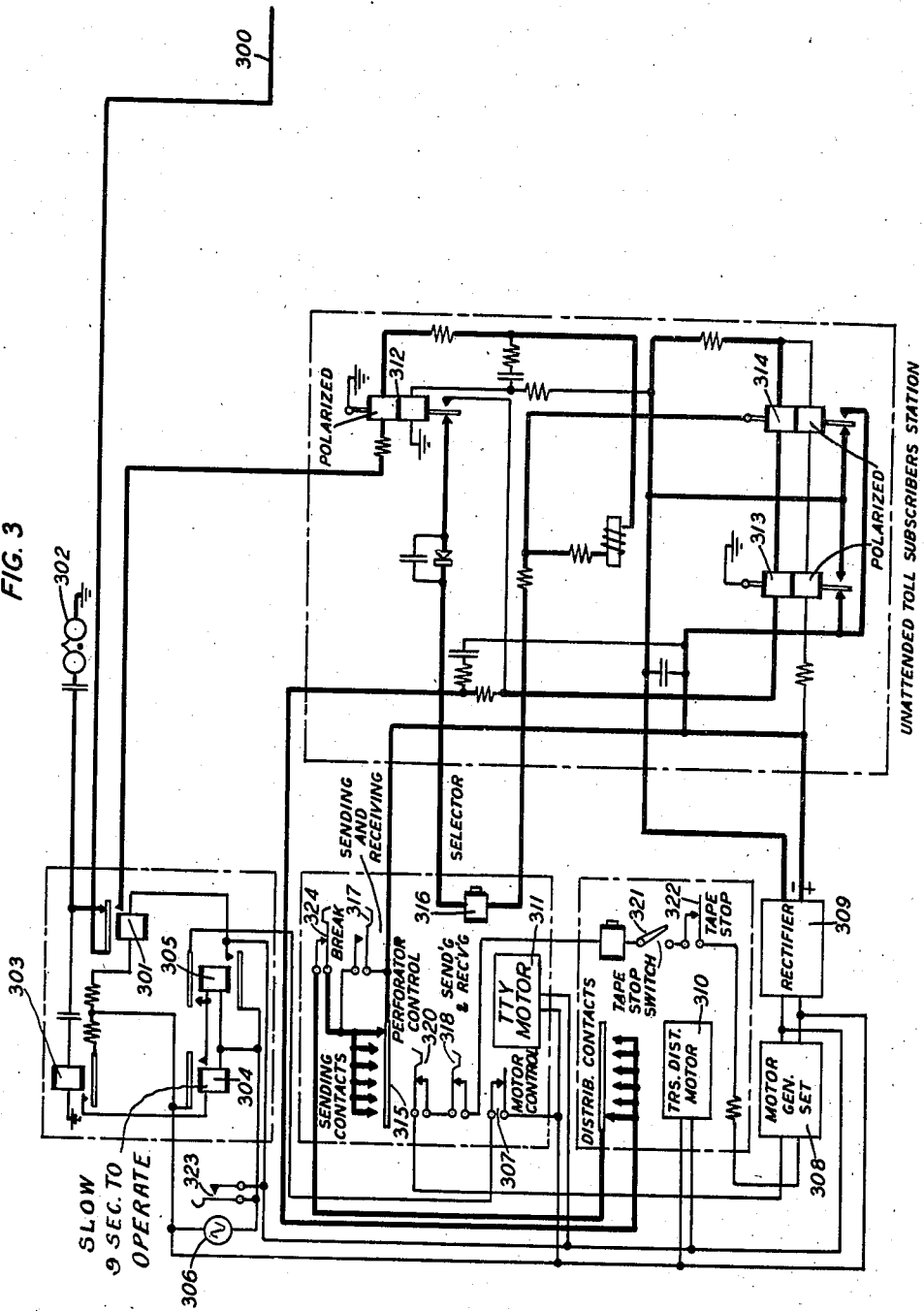

The subscriber's station shown in Fig. 3 operates on the same principle as that shown in Fig. 2 and works into the circuit shown in Fig. 5. The transmission line 300 extends to the armature of the relay 301. This is one of a set of relays for controlling the subscriber's station. If the station is not in operating condition and a call is extended from the concentration unit, the line 300 will extend through the armature and back contact of relay 301 to a ringer 302 and an alternating current relay 303. The ringer 302 is for the purpose of notifying the subscriber of an incoming call but even if no subscriber is present, relay 303 will become energized and, through the movement of its armature, will cause the energization of relays 304, 305 and 301 in succession. Relay 304 operates from one side of the local supply of power 306 through the armature of relay 303, the winding of relay 304 to the other side of the local supply of power. Relay 304 is slow to operate and after a time of approximately nine seconds brings up its armature and connects the relay 305 across the power supply wires and relay 305 locks itself through its front contact and upper armature and thence through motor control contacts 307 to the other side of the power supply. Relay 305 closes a circuit through its lower armature and front contact to connect the local supply of power 306 to the motor generator set 308, the rectifier 309, the transmitting distributor motor 310 and the teletypewriter motor 311. At the same time, relay 301 becomes energized through the operation of relay 305 and its operates its armature to cut off the line 300 from the bell 302 and the alternating current relay 303 and to connect the line 300 to the transmission circuit of the station. With the rectifier, the motor generator set and the various other motors connected to the source of power, the apparatus at the substation comes into active operation.

The transmission circuit is the same and functions in the same manner as that in Fig. 2 and hence it need only be necessary here to mention certain of the pieces of apparatus, such as the polarized line relay 312 which responds to incoming permutation code impulses, the two transmitting relays 313 and 314 which respond to the pulsing contacts 315 to reverse the potential of the current supply to make the difference between marking and spacing impulses, and the selector magnet 316 operated from the contacts of the line relay 312. The various sending and receiving contacts, such as 317 and 318, the perforator control contacts 320, the tape stop switch 321 and the tape controlled stop switch 322 all operate in a well-known manner as described in connection with the local subscriber's station in Fig. 4 and the various patents of the prior art mentioned.

The operation of the apparatus at this station while unattended may be stopped by the transmission of a predetermined sequence of code signals, such for instance as those for "blank," "shift" and "H," whereupon the motor control contacts 307 will be operated to unlock relay 305 and cut off the local supply of power.

Should the subscriber at this station wish to initiate a call through the concentration unit, he will operate switch 323 which will have the same effect as the operation of relay 305, that is, it will cause the rectifier, the motor generator set and the various motors to come into operation and will energize relay 301 so that the line 300 will be cut through to the transmission circuit of the station. Again, attention is drawn to the fact that the subscriber may initiate the call with either a marking or a spacing condition on the conductor 300 whereby he will automatically route his call either to the office normally reached or the second choice office which he may wish to enter under other circumstances. Should the switch 323 be operated alone, then the call will be initiated in the concentration unit under a marking condition, that is, with a current of —30 milliamperes flowing over the conductor 300. Should he, on the other hand, wish to reach his second choice office, then he will first operate the break key 324 and, while holding this operated, then operate the switch 323.

Toll subscriber's line circuit—Fig. 5

The toll subscriber's line circuit shown in Fig. 5 is designed to provide a terminating line circuit for toll lines such as those shown in Figs. 2 and 3 and to translate the signals to and from such stations into signals like those going to and from a local station such as that shown in Fig. 4. The functions of the toll subscriber's line circuit are:

(1) To provide means for holding the receiving relay 501, the line relay 500 and the send relay 502 on their marking contacts during the idle condition of the circuit.

(2) To cause the concentration unit to function to display a line signal at the switchboard at the distant central office when the toll subscriber calls.

(3) To transmit signals in each direction.

(4) To provide for transmitting a "break" signal from the subscriber.

(5) To provide for transmitting a "break" signal to the subscriber.

(6) To provide for transmitting a steady supervisory signal to the distant central office when a disconnect signal is received from the toll subscriber's station.

(7) To provide a recall signal for transmission to the distant central office under control of the toll subscriber.

(8) To provide for disconnecting the repeater from the line and transmitting continuous ringing current over the line for operating the subscriber's ringer, and means for discharging the line, before it is reconnected to the terminal repeater in order to prevent false operation of the calling-in relays.

(9) To provide when calling an unattended station for giving the central office operator an indication that the unattended station teletypewriter has been started and the circuit is ready for the transmission of signals.

Terminal repeater used with subscriber sets of Figs. 2 and 3

The transmission system used with the subscriber sets shown in Figs. 2 and 3 has been designed so that leakage does not cause bias in the received signals at the subset or at the concentrating unit office thus eliminating the necessity of readjustment for varying weather conditions on open wire lines. This is accomplished as follows: From the subset to the central office transmission is on a polar basis from ±75 volts at the subset to ground at the terminal repeater. The usual received current is from 20 to 30 milliamperes depending on the length of the line and the effect of leakage which decreases the marking and spacing currents equally. From the terminal repeater the transmission is ground for marking and +130 volts for spacing which meets −75 volts marking at the subset. This results in a marking received current of from 20 to 30 milliamperes and a spacing current of about three times the marking current in the same direction. The receiving polar relay at the subset has a biasing circuit adjusted to oppose both marking and spacing currents of a value about mid-way between them. Therefore the armature will follow incoming signals. The effect of leakage is to increase the marking current and decrease the spacing current equally, but this does not cause a bias in the receiving relay since the net effect on a relay is always equal and opposite. Therefore as long as leakage is not great enough to cause the marking and the spacing currents to become nearly equal to each other and equal to the current in the biasing winding the receiving relay will follow signals unbiased.

*Idle condition*

During the idle condition the line conductor such as 200, is connected through a condenser and ringer such as 202 to ground in the subscriber set. At the central office end conductor 200 may be traced through a back contact of relay 503 through resistance 512 through the upper winding of line relay 500, the upper winding of receiving relay 501, winding of retardation coil 513, resistances 514 and 515, winding of relay 504, upper armature and back contact of relay 505 and winding of relay 510 to ground. Relay 506, when not operated, separates the line winding of relay 501 from the biasing winding thereof by opening the connection between the front contact and armature 7 of relay 506. Ground on the back contact of this armature 7 of relay 506 is connected through the lower winding of relay 501, the middle winding of relay 500, resistance 516, back contact and armature 6 of relay 506, resistance 517, resistance 518 to battery will hold the relays 500 and 501 in marking condition. Relay 506 when non-operated also connects battery through resistance 519, resistance 520, normal contacts of armature 2 of relay 506, the upper and lower windings of relay 502 in series to a potentiometer point consisting of a connection between the resistances 521 and 522. Current flowing in the potentiometer from ground through resistances 521, 522 and 519 to battery places a potential on the windings of relay 502 sufficient to maintain this relay in its marking condition during this idle condition.

*Call from subscriber*

A call is originated at the subscriber set by the closure of the power supply circuit of the set if all calls are routed through the same central office or may be originated in two ways if the circuit is arranged for routing calls through either of two central offices. If the call is for one central office it is originated by closure of the power supply circuit of the subscriber set the same as when all calls are routed through one central office. If the call is for the other central office it is originated by operating the "break" key of the subscriber set and holding it operated while the power supply circuit is closed. In the first case negative marking polarity is connected to the line and in the second case positive spacing polarity is connected to the line. In either case relay 504 of the toll subscriber line circuit operates.

The operating path for relay 504 may be traced from ground through the winding of relay 510, the back contact and upper armature of relay 505, winding of relay 504 and thence over a circuit previously traced to the line conductor leading to the toll subscriber's station circuit. Relay 504 operates and establishes a connection from battery, resistance 518, resistance 523, front contact and armature of relay 504, resistance 524, winding of relay 509, marking contact and armature of relay 500 to ground. Relay 510 being polarized does not operate on the negative marking polarity from the subscriber's station circuit. The operation of relay 504, however, causes relay 509 to operate. This in turn establishes a circuit from the front contact and armature of relay 509, through the armature and left-hand contact of relay 510, winding of relay 505 to battery. Relay 505 operates and closes a circuit for the operation of relay 506. Relay 506 connects battery through resistance 518 and resistance 525, the front contact and armature 4 of relay 506 to the R lead 526 leading to the concentration unit. The result of this connection will be to bring in an answering lamp at the switchboard at the distant manual office as will be more fully described hereinafter.

If the call is initiated while positive spacing polarity is applied to the line at the subscriber station as, for instance, when the break key thereat is operated, then relays 504 and 510 operate in series. Relay 510 is operated only as long as the break key at the subscriber set is held operated and releases as soon as the break key is released thereby applying marking polarity to the line. Relay 504 causes the operation of relay 509 as hereinbefore described. Relay 504 releases and reoperates when the break key is released thereby changing the polarity of the line from positive to negative, but relay 509 being slow-release holds operated. Relay 510 being operated now causes the operation of relay 511 instead of relay 505. Relay 511 connects battery through resistances 518 and 525 through the armature and front contact of relay 511, through resistance 527 to conductor 526. As soon as relay 510 releases, relay 505 becomes operated in the manner hereinbefore described. Relay 505 now causes the operation of relay 506 as hereinbefore described and the direct connection of the battery through resistances 518 and 525 to conductor 526, thus leaving out of the connection the resistance 527. The effect of this chain of operations is to first place battery on conductor 526 through a high resistance 527 which will cause a different operation in the subscriber's line circuit than will take place when the battery connected to conductor 526 is through a lower resistance. This will be more fully described hereinafter.

The operation of relay 506 also (a) closes the transmission lead 528 from the concentration unit to the sending relay 502 through the alternate contacts of armature 2 of relay 506 to hold the repeater to marking, (b) connects the apex of the send relay through the front contact and armature 3 of the relay 506 to the armature of the receive relay 501 in order to arrange both the line and the bias windings of relay 502 for a communication condition, (c) disconnects relay 508 from lead 528 and (d) closes a path for operating relay 509 from current reversals. The circuit is now prepared for the transmission of signals when the operator answers.

Transmission of signals—Central office to subscriber's station

The send relay 502 follows signals from the central office and is operated to marking by a current of approximately 20 milliamperes through its upper winding. A spacing signal reduces the current through this upper winding to zero and the relay is operated to spacing by current of approximately 10 milliamperes through its lower biasing winding. The operation of the send relay 502 transmits a marking signal of approximately 30 milliamperes to the subscriber station and increases the current about three times to approximately 80 milliamperes for a spacing signal. This circuit may be traced from the armature of relay 502 through the front contact and upper armature of relay 505, winding of relay 504, the network comprising resistances 514 and 515 and the retardation coil 513, upper windings of relays 501 and 500, resistance 512 and back contact and armature of relay 503 to the line circuit leading to the subscriber station circuit. A branch path may also be traced from the junction between retardation coil 513 and the upper winding of relay 501 through the front contact and armature 7 of relay 506, lower winding of relay 501, middle winding of relay 500, where it connects to ground through a condenser 529 and resistance 530. This prevents the line relay 500 and the receive relay 501 of this circuit from "kicking off" on capacity surges when transmitting to the subscriber. Relay 504 holds operated since the current is always in the same direction through its winding and relay 500 holds to marking through its upper winding for the same reason.

Subscriber station to central office

A negative marking signal and positive spacing signal of approximately 20 to 30 milliamperes is transmitted from the subscriber station. Relay 500 and relay 501 follow these signals. The receive relay 501 retransmits the signals to the central office, transmitting ground for marking and positive battery for spacing. The transmission path may be traced from the armature of the receive relay 501 through resistance 531, armature 3 and front contact of relay 506, upper winding of relay 502, alternate contact and armature 2 of relay 506 through the network consisting of condenser 532 and resistances 533 and 534 to conductor 528, leading to the central office. Relay 504 may or may not follow the signals but relay 509 is held operated in turn operating relays 505 and 506. The hold paths for relay 509 are as follows: When relay 504 is operated and relay 500 is marking, a path may be traced from battery through resistance 518, resistance 523, front contact and armature of relay 504, resistance 524, winding of relay 509 to ground on the marking contact of relay 500. When relay 500 is spacing, the current is in the reverse direction from battery through resistance 518, resistance 517, armature 6 of relay 506 and its front contact, winding of relay 509, resistance 524, armature and front contact of relay 504 to ground now found on the spacing contact of relay 500. When relay 504 is released and relay 500 is marking, relay 509 is held operated by the charging current through condenser 535, the path being from battery, through resistances 518 and 523, armature 5 and front contact of relay 506, condenser 535, resistance 536, resistance 524, winding of relay 509 to ground found on the marking contact of relay 500. When relay 500 is on the spacing contact, the charging current of condenser 535 is in the reverse direction from battery through resistances 518, 517, armature 6 and front contact of relay 506, winding of relay 509, resistances 524 and 536, condenser 535, front contact and armature 4 of relay 506 to ground which is now found on the spacing contact of relay 500. When relay 500 is marking, the current through its lowermost winding is in such a direction as to assist in holding it marking and when the relay is spacing is in such a direction as to assist in holding it spacing. This winding is to prevent "kick off" of relay 500 due to cross-fire on the subscriber's line.

Break signal from the subscriber

When the subscriber operates his "break" signal key, positive polarity will be applied to the line at the subscriber's set during the time the break key is operated. The toll subscriber's line circuit will repeat this spacing condition to the loop circuit and prevent transmission from the loop. Relay 504 continues to hold relay 509 and its associated relays operated. When the subscriber restores his "break" signal key, negative marking polarity will be again applied to the line at the subscriber's set and the relays of this circuit will operate to their marking contacts. The circuit is then in condition for the transmission of telegraph signals.

Break signal to the subscriber

A break signal from the central office will cause the send relay 502 to operate to spacing under influence of its biasing circuit and to transmit a spacing signal to the subscriber, thus preventing transmission by the subscriber. Relay 504 continues to hold relay 509 and its associated relays operated.

Disconnection by the subscriber

The subscriber disconnects by opening the power circuit of the set. The set returns to the normal idle condition, that is, the line is open to direct current and is connected through a condenser and ringer to ground. Relay 504 releases and in turn releases relay 509. Relay 509 in turn releases relay 505. The release of relay 505 releases relay 506, disconnects the transmission lead from the sending relay 502 and applies ground through the back contact of relay 505 from the winding of relay 510 to the line leading to the subscriber's set. Relay 506 released applies local battery to the windings of the send relay 502 and receive relay 501 to hold them in marking condition. Relay 506 also opens the tip lead 528 to the concentration unit and removes battery from the ring lead 526 to the concentration unit circuits which function to bring in the disconnect signal at the central office in a manner to be more fully described hereinafter.

Recall signal from the subscriber

A recall signal is given to the central office switchboard operator by the subscriber set attendant momentarily opening the power circuit or operating the recall set key of the subscriber set. While the power switch is opened or the recall key operated the line is opened to direct current and relay 504 releases and in turn relays 509, 505 and 506 release. Relay 506 functions as described previously to remove battery from the ring lead 526 which causes the concentration unit to function to bring in a steady lamp at the central office. Relay 506 released opens the path for operating relay 509 on reversals and furnishes battery for holding the received relay 501 and the send relay 502 in a marking condition in the same manner as described in the preceding paragraph. When the power switch is closed or the recall key is released at the subscriber's set, negative marking polarity will be applied to the line at the set. This causes relay 504 to operate and in turn to operate relays 509, 505 and 506. Relay 506 operated again connects battery to the ring lead 526 which causes the concentration circuits to function to give the switchboard operator a flashing supervisory relay recall signal. Relay 506 also restores the receive relay 501 and the send relay 502 to their transmitting condition.

Calling subscriber's station

When the calling cord is inserted in a line jack of the two-way trunk circuit to the line concentration unit and the ringing key is operated, the concentration unit circuit will function to connect ringing current to the tip lead 528 which will operate relay 508. The circuit may be traced from lead 528 through the network consisting of condenser 532 and resistances 533 and 534 over armature 1 and the back contact of relay 506, winding of relay 508 through condenser 540 to ground. Relay 508 operated, in turn operates relays 507 and 503. The circuit for relay 507 is obvious and the circuit for relay 503 may be traced from the lower armature and back contact of relay 505 over the front contact and outer left-hand armature of relay 507, the winding of relay 503 to battery. Relay 503 in operating disconnects the toll subscriber line from the transmission lead and applies ringing current through the contacts of relays 507 and 503 to the line leading to the subscriber set. Ringing current is applied from a source connected to the lead 537 through a current limiting device 538 connected to the front contact of the inner left-hand armature of relay 507. When the operator releases the ringing key, relay 508 releases causing the release in turn of relays 507 and 503. Relay 503 is slow releasing and relay 507 is slow operating, hence, upon the release of relay 508 there will be a short interval during which relay 507 is released but relay 503 is not released. During this interval the line to the subscriber's station is connected through the armature and front contact of relay 503 and over the inner armature and back contact of relay 507 through resistance 539 to ground. Through this connection any capacity charge of the subscriber's line will be discharged. When the subscriber answers, relay 504 operates, operating in turn relays 509, 505 and 506. Relay 505 operated closes through the transmission lead from the line to the send relay 502 and relay 506 closes positive battery to the ring lead 526 to the concentration unit which in turn functions to disconnect ringing in a manner to be more fully described hereinafter.

If the called subscriber station is arranged as in Fig. 3 for unattended service, steady ringing current will be connected to the tip lead 528 from the concentration unit circuit for a period of approximately 9 seconds during which time relays 508, 507 and 503 will remain operated. When the subscriber station is started further functioning will take place as for an answer condition as described in the preceding paragraph. If the subscriber station has not been started within 9 seconds, ringing current will be automatically cut off in the concentration unit circuit and relays 508, 507 and 503 will be released which will disconnect ringing current from the subscriber station. If, after a reasonable time the unattended station is not started, the failure of the distant operator to receive an answer signal will indicate that a trouble condition exists.

Subscriber's line circuit Fig. 6

This circuit may be used either to connect a local subscriber's station circuit such as that shown in Fig. 4 to the concentration unit or toll subscriber's stations such as those shown in Figs. 2 and 3 and terminating in the toll subscriber's line circuit, Fig. 5. The operation toward the station is the same whether the circuit connected to it be a local subscriber's station circuit or a toll subscriber's line circuit.

The functions of this circuit are as follows:

(1) This circuit is arranged to register the subscriber's calling-in signal and to start the sequence circuit to permit routing the call to the manual office.

(2) This circuit lights the call lamp when the subscriber calls until his call is routed to the manual office.

(3) This circuit, when all available trunk circuits are busy, is ordered to release the sequence circuit and to attach itself to the all-trunks-busy circuit for the purpose of transmitting to the subscriber information concerning the availability of trunk circuits. Connection to the all-trunks-busy circuit is maintained until the subscriber disconnects.

(4) When the subscriber disconnects after receiving information from the all-trunks-busy circuit, this circuit returns to normal.

(5) When the subscriber line on an outward call is connected to a trunk circuit, the line circuit returns to normal, releasing the sequence circuit.

(6) This circuit is arranged on an optional basis to register the particular outlet a key selection subscriber wishes to reach and to start the sequence circuit in an effort to route the call to that outlet.

(7) When arranged for key selection of outlet, this circuit lights the call lamp steadily if a primary outlet is required or flashes it at 60 interruptions per minute if a secondary outlet is desired. In either case, the lamp functions until the call has been routed to the manual office.

(8) This circuit is provided with a set of test jacks which will permit testing of the subscriber line for line conditions and for transmission and for testing the subscriber line circuit.

(9) The test jacks of this circuit are also available for semiautomatic and full manual operation of the concentration unit in case of failure of automatic apparatus.

(10) One of these test jacks can be used to make the particular line test busy, out of order or unassigned to inward calls.

(11) The test jacks are available for continuous monitoring of the subscriber line by means of a test circuit.

(12) The test jacks can also be used to patch a subscriber line to a practice circuit.

Description of Operation

The subscriber originates an outward call

When a subscriber originates an outward call for his first choice office or primary outlet, he does this by merely closing his power key whereupon both the line relay 606 and the marginal relay 607 become operated. The circuit for the operation of these relays may be traced from ground, the upper winding of the line relay 606, the upper winding of the marginal relay 607, conductor 608, conductor 808, normal contacts of the outer left-hand armature of hold magnet 800, conductor 809, conductor 609 through the normal contacts of test jack 610 to conductor 626. If the station calling is a toll subscriber, then the connection from conductor 626 may be traced over conductor 526 to positive battery through a network which will cause the operation of both relays 606 and 607. If the call is originated by a local subscriber, then the connection from conductor 626 may be traced over the loop of the subscriber's line from conductor 401 back over conductor 400, thence over conductor 628, the normal contacts of test jack 611, conductor 612, conductor 812, the inner armature and back contact of hold magnet 800, conductor 813, conductor 613, the normal contacts of the lower armature of relay 614 to positive battery. Sufficient current will flow in this circuit to cause the operation of both line relay 606 and marginal relay 607. Thereupon a circuit is closed from ground, the armature of relay 606 and its left contact, the armature and front contact of relay 607 to the winding of relay 615. Relay 615 in operating places a ground through its inner armature and front contact, the upper armature and back contact of relay 614 to the start lead 622 leading to the sequence circuit. Relay 615 also places a steady ground connection on call lamp 616 from ground, the upper armature and front contact of relay 615, the back contact and armature 1 of relay 617 to call lamp 616. The other terminal of the lamp connects to conductor 605 which extends to conductor 1605 in the master control circuit for the sequence circuit in a manner to be hereinafter described. This will cause the lighting of lamp 616 steadily.

If the subscriber wishes to reach his second choice office or secondary outlet, he holds the break key of his station operated while turning on the power switch and thereafter releases the break key. In the case of a toll subscriber, this results in the connection of positive battery to conductor 526 through the resistance 527 as hereinbefore described. This results in insufficient current flowing over conductor 626 to cause the operation of relay 607, therefore only line relay 606 becomes operated. In the case of a local subscriber, the current flow is similarly reduced through the introduction of resistance 407 in the circuit so that only line relay 606 becomes operated. In either case, when the subscriber releases the break key, the current flowing will be augmented and relay 607 will then become operated. During the interval when only relay 606 is operated, relay 617 becomes operated in a circuit from ground, the armature and left-hand contact of relay 606, the armature and back contact of relay 607, through the winding of relay 617 to ground. Relay 617 operates and locks through its front contact and armature 3 to the ground on the armature of relay 606. When thereafter relay 607 becomes operated and causes the operation of relay 615, the call lamp 616 will be connected to an interrupted ground on conductor 631 through the interrupter 618. The start conductor 622 will be grounded in the same manner but conductor 621 through the movement of armature 5 of relay 617 will be connected to conductor 601 instead of to conductor 600, as before. This condition is maintained until the line is connected to a trunk or the automatic equipment finds no trunk available.

All-trunks-busy condition

As the sequence circuit and the all-trunks-busy circuit are described hereinafter, it is provided that a call directed to a particular trunk group will cause an action similar to a hunting operation in that particular trunk group, thereafter an overflow hunting operation in the other trunk group and finally an operation of the all-trunks-busy circuit. In such operations, the transfer functions performed by armatures 2 and 4 of relay 617 are not necessary as the front contact of the upper outer armature of relay 619 is connected directly to the common conductor 603 and the lower armature of relay 614 is connected directly to common conductor 602.

In cases where the overflow operation is not provided for, then it becomes necessary to have a separate all-trunks-busy circuit for each group of outgoing trunks and hence, by way of example, these two transfer contact arrangements are shown on relay 617 so that the leads 602 and 603 to one all-trunks-busy circuit are shown and corresponding leads 620 and 630 to the other all-trunks-busy circuit are indicated. Since the more elaborate overflow arrangement in the sequence circuit is disclosed, the description hereafter will ignore armatures 2 and 4 of relay 617 and the common conductors 620 and 630.

If the automatic apparatus of the concentration unit finds no trunk available it grounds lead 624, thereby causing the operation of relay 619. Relay 619 (1) connects the secondary winding of marginal relay 607 over the upper outer armature and front contact of relay 619 to conductor 603 leading to the all-trunks-busy circuit, (2) supplements ground furnished by the line relay 606 through its lower outer armature and front contact, (3) short-circuits the line winding of the line relay 606 through its inner lower armature, and (4) permits relay 614 to operate from ground coming in over conductor 624 through the front contact and inner upper armature of relay 619. Relay 614 operates and (1) transfers the tip lead to the subscriber to the all-trunks-busy circuit over conductor 602 (2) removes the ground from the start lead 622, causing the sequence circuit to return to normal, and (3) locks under control of relay 615. The all-trunks-busy circuit generates a "letters" signal or a "K" signal as required, which, being transmitted to the subscriber, gives an indication relative to the availability of trunks. During the interval that these signals are being sent the ground returned from the all-trunks-busy circuit on conductor 603 through the front contact and upper outer armature of relay 619 holds relay 607 operated. Since relays 614 and 619 are operated relay 615 will remain operated. If the subscriber disconnects as a result of receiving these signals then in the following silent interval when ground is removed from conductor 603 relay 607 will release whereupon relay 615 and in turn thereafter relays 614 and 619 are released and the circuit returns to normal.

Connection of a subscriber's line to a trunk circuit

If an idle trunk is found and the connection thereof to the subscriber's line is ordered by the automatic equipment the sequence circuit grounds lead 623, causing the operation of the hold magnet in the link circuit over conductors 823 and 923. Ground on conductor 923 operates the holding relay 903 which through an obvious circuit causes the operation of the holding magnet 800. Through the operation of magnet 800 conductors 608 and 613 are opened and the subscriber's line is alternatively connected to a trunk of first or second choice which now takes over all supervision of the call. The opening of the leads 608 and 613 causes the release of relay 615 which extinguishes the call lamp 616 and releases the sequence circuit. Through the release of relay 615 and the opening of lead 608 the remaining relays of this subscriber's line circuit will be released.

Each subscriber's line circuit has an individual conductor leading to the director circuit. It will be noted that the subscriber's line circuit shown in full detail in Fig. 6 is marked "Station #44." It will be further noted that conductor 604 is labeled "To conductor 2104." Conductor 2104, it will be found, is that particular conductor in the director circuit which may be reached through the sending of figures 4—4. Similarly, conductor 690 leading to conductor 2190 from the upper subscriber's line circuit marked "Station #90" is that particular conductor in the director circuit which may be reached through the sending of the characters 9 and 0. The function of these conductors will appear hereinafter.

Link circuit

In Figs. 8 and 9 there is illustrated what is known as the link circuit. It is a diagrammatic representation of a cross-bar switch with the various connections leading on the one side to the subscriber's line circuit and on the other side to the trunk circuits to the distant office.

For a full explanation of the details of construction and operation of a cross-bar switch reference may be had to the following patents: 1,953,503, J. N. Reynolds, Apr. 3, 1934; 2,021,329; J. N. Reynolds, Nov. 19, 1935; 2,040,334, J. N. Reynolds, May 12, 1936; 2,039,630, J. A. Burrell, May 5, 1936; and 2,039,644, D. H. Gleason et al., May 5, 1936.

It will be understood that with selecting magnet 801 and holding magnet 800 operated (with selecting magnet 801 then released) that the set of contacts 802 will be operated so as to extend the subscriber's line circuit shown in Fig. 6 to the trunk circuit 806 which with the other trunk circuits of Fig. 8 lead to one master office. The trunk circuits of Fig. 8 may be reached through that portion of the sequence circuit shown in Fig. 14. It will be understood also that with selecting magnet 900 operated and the holding magnet 800 operated (with selecting magnet 900 then released) that the set of contacts 901 will effectively connect the subscriber's line circuit of Fig. 6 to the trunk circuit shown in full in Figs. 11 and 13 and extending to the circuit of Figs. 15 and 19. This trunk and others indicated on Fig. 9 lead to another master office and may be reached through that portion of the sequence circuit shown on Fig. 12.

Assuming that the trunks from Fig. 8 extend to an office in one locality and that the trunks from Fig. 9 extend to an office in another locality, the subscriber has, according to commercial arrangements made, selected one or another as his first choice office whereupon the other becomes the second choice office. Assuming the trunks of Fig. 8 to represent the first choice office then if he initiates the call by the mere operation of his power switch the selecting magnet 801 or one of the other selecting magnets shown in Fig. 8 will cooperate with the holding magnet 800 to extend his line over trunk 806 by way of example. It will be more fully explained hereinafter how, if all of the trunks leading from Fig. 8 are busy, the call will nevertheless be extended over one of the second choice trunks leading from Fig. 9. In case all of these are busy then the all-trunks-busy condition will be set up and the subscriber will have an appropriate signal displayed before him. In case the subscriber initiates the call in such a manner as to extend his call over one of the trunks of Fig. 9 to his second choice office then if all of the trunks indicated here are busy his call will nevertheless be extended over a trunk in Fig. 8 and in case that all of these are also busy an all-trunks-busy condition will be set up and he will be appropriately notified. The action of these circuits may be explained in another manner, that is to say that all of the available trunks in both the first and second choice offices are placed in a sequence circuit and when a call is initiated something akin to hunting for an idle trunk will take place, starting from a point determined in advance by the commercial arrangements made by the subscriber and continuing through the sequence until no idle trunk at all is found when the all-trunks-busy circuit will become effective. If the subscriber changes the point of entrance into the sequence of these trunks by the operation of his break key in order to get a second choice trunk, then the action akin to hunting will begin with the second choice trunks but will nevertheless continue throughout all of the trunks in sequence until the all-trunks-busy condition is encountered.

In the idle condition of the link circuit or the cross-bar switch of Figs. 8 and 9 all magnets are released and the tip and ring sides of the subscriber lines are connected through the subscriber line circuit through the back contacts of the holding magnet, such as the holding magnet 800. When a subscriber places a call the sequence circuit, as will be more fully explained hereinafter, will determine which trunk the subscriber shall use. The selecting magnet, such as 801, which is associated with the trunk thus selected will be energized to position the selecting fingers of the cross-bar switches. The closure of the selector off-normal contacts will place a ground on conductor 902 which will extend to conductor 2302 and there operate relay 2300. The operation of relay 2300, as will be explained more fully hereinafter, will, through the operation of the sequence circuit, place a ground on conductor 623 which corresponds to conductors 823 and 923 and which will operate the holding relay 903 to close an energizing circuit for the holding magnet 800. Operation of the holding magnet will cause the closure of the switch contacts at the intersection of the trunk and the calling subscriber line.

When a trunk is selected by the distant manual operator for the purposes of placing an inward call, the selecting magnet will be operated in advance of the completed selection of the desired subscriber line. If the selected subscriber is idle the closed condition of the selecting off-normal contacts through the operation of relay 2300 will extend the ground through the director circuit, which will eventually appear as a ground on conductor 623 and, as before, will cause the operation of relay 903 and thence the holding magnet 800.

Figure 11:
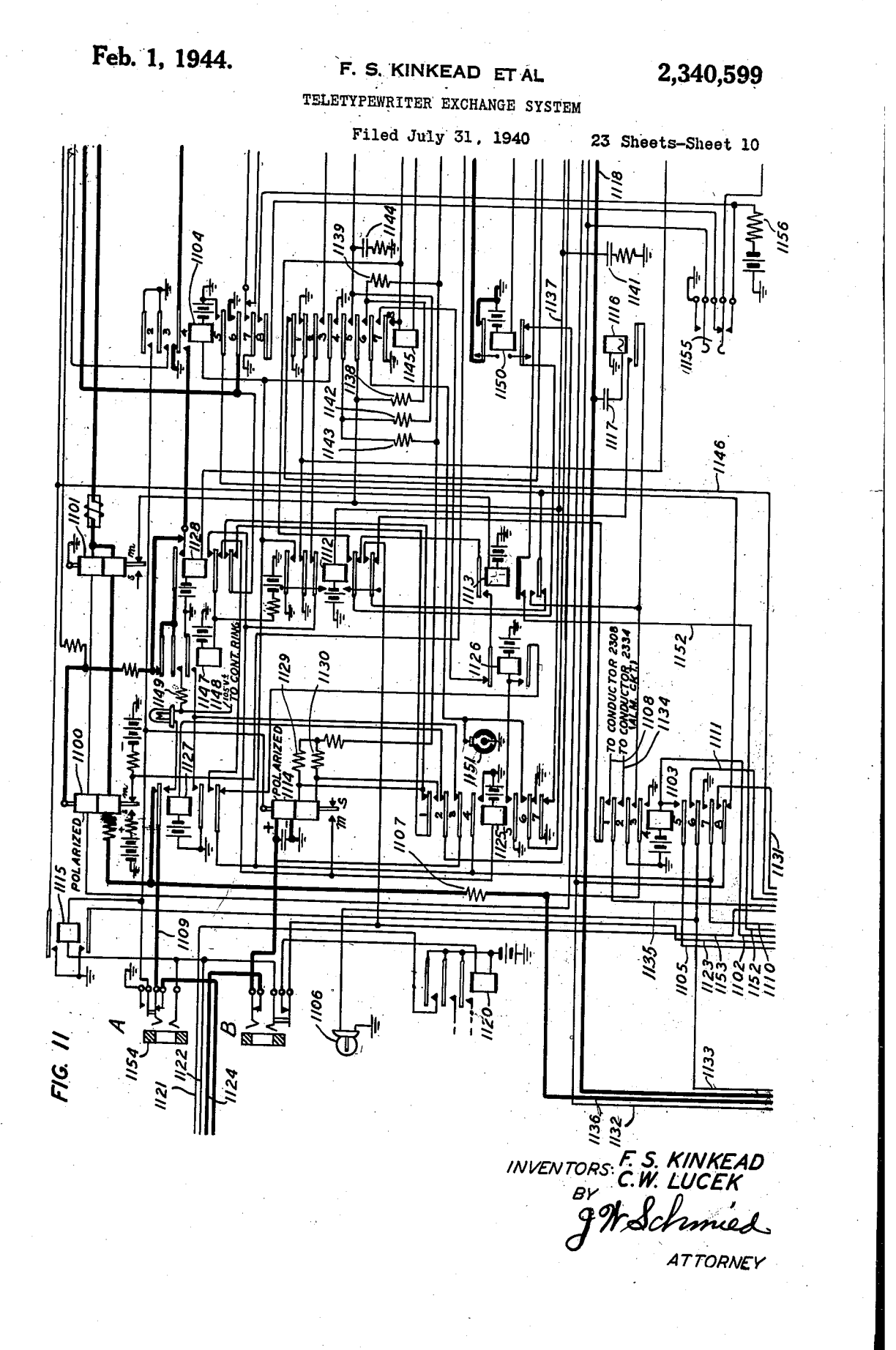
Figure 13:
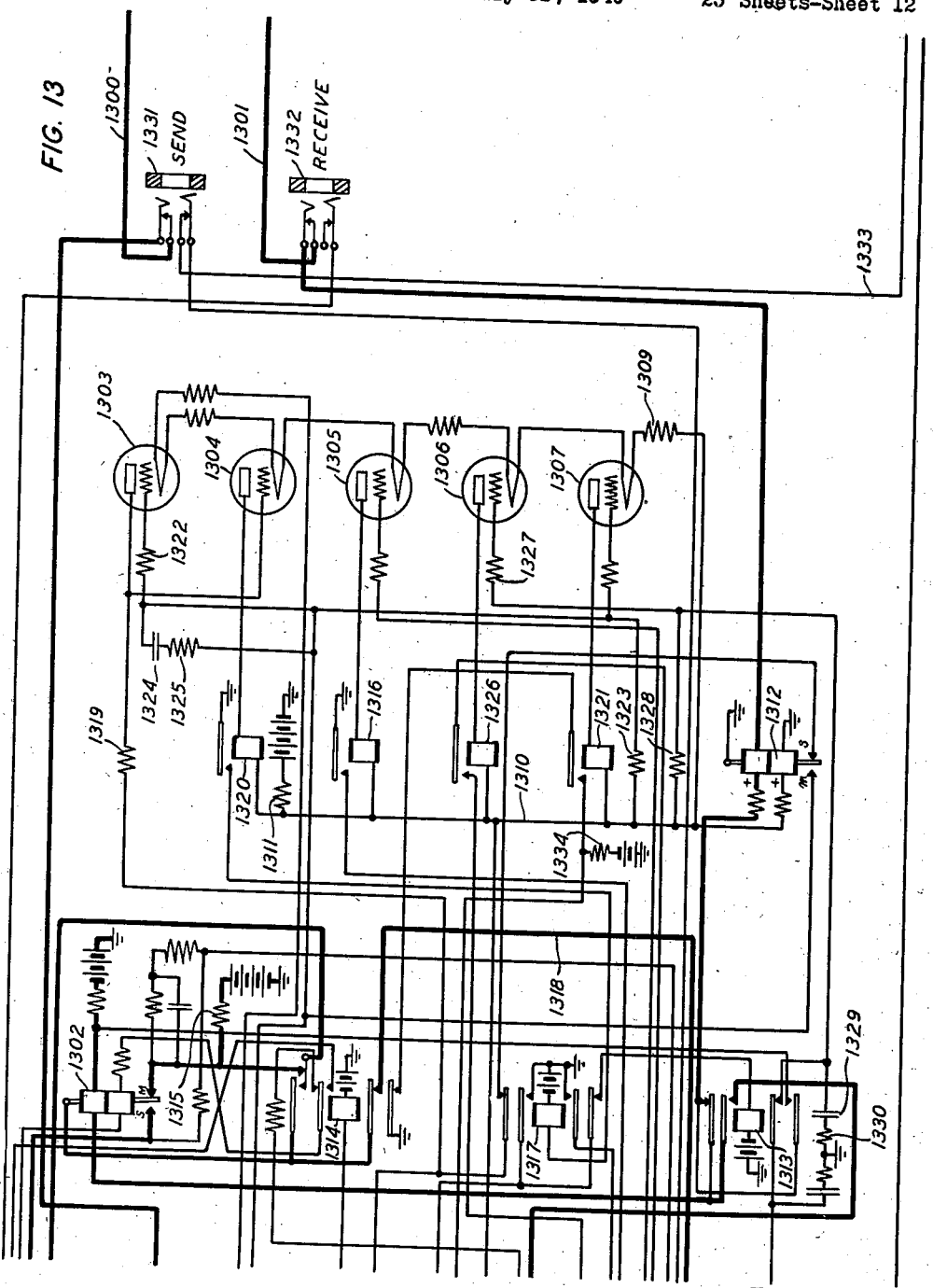

*Automatic signaling master office trunk circuit—Figs. 11 and 13*

This circuit is designed as the terminating equipment at the concentration unit end of a two-way trunk extending to a manual master office. This circuit possesses automatic signaling supervision features and is arranged to be connected between a toll line repeater and a concentration unit subscriber with loop transmission on a 0 to 20 milliampere basis.

The functions of this circuit are as follows:

(1) On an outward call from a concentration unit subscriber when the trunk is preselected by the sequence circuit this circuit sends a continuous "mark" to the manual master office and lights the trunk busy lamp.

(2) Under the condition stated above this circuit awaits the reception of "ringing" from the master office as a trunk vertification test before ordering the link circuit to connect the particular calling subscriber to the trunk circuit.

(3) Under the condition first stated this circuit simultaneously with the sending of the "mark" grounds the trunk lead to the miscellaneous alarm circuit which is timing the interval required for the routing of the outward call.

(4) If the link circuit has connected the calling subscriber to the trunk the sequence circuit is dismissed and the subscriber is held connected to the trunk under control of the power switch at his set while the trunk is made busy to other calling subscribers whose lines are connected to this satellite office.

(5) Under the condition in paragraph 3 if an interval as determined by the alarm circuit has been exceeded without the appearance of "ringing" from the master office, the miscellaneous alarm circuit orders the trunk busy lamp extinguished, the particular trunk removed from service, the calling subscriber being transferred to the next idle available trunk, while the characteristic trouble signal is sent from the sequence circuit to the trunk for retransmission to the manual end.

(6) While awaiting the answer of the operator at the master office the subscriber can "flash" the operator. Under this condition this circuit sends mark and space signals to the master office in unison with the operation of the busy switch at the subscriber's station.

(7) If the calling subscriber abandons an outward call before the operator at the master office answers, this circuit sends a permanent space signal to the master office and when the reception of continuous ringing ceases orders the link to disconnect the subscriber's line from the trunk, removing the busy appearance of the trunk to other calling subscribers and also extinguishing the trunk busy lamp.

(8) When the operator at the master office answers the outward call the continuous ringing is replaced by a mark signal, upon the reception of which this circuit advances to the half duplex stage in which it is capable of distinguishing between normal teletypewriter signals, break signals or disconnect signals from either end.

(9) When a prolonged space signal is received from the concentration unit subscriber this circuit transmits a space to the master office and after approximately two-thirds of a second ascertains if the subscriber has disconnected. If the subscriber has disconnected, this circuit continues to send a space signal to the central office, returns to the full duplex system of transmission but remains in condition to permit the "reringing" of the disconnected subscriber. If the space signal is the result of a subscriber "flash" the circuit functions as if he had disconnected during the "off" operation of the power switch and returns to half duplex transmission, transmitting a mark as soon as the switch is again turned "on." If, however, the space signal from the subscriber resulted from the transmission of a "break" from the station, this circuit replaces the space sent to the master office by "ringing" for the remainder of the "break" signal received from the subscriber, remaining at the same time in the half duplex transmission condition. At the conclusion of the break this circuit transmits a "mark" to the master office.

(10) When a prolonged space signal is received from the master office this circuit continues to send a space signal to the subscriber. After two-thirds of a second has elapsed, followed by the reception of "ringing" from the master office, this circuit remains in the half duplex transmission condition and continues to send "space" to the subscriber. After five and a half seconds of space to the subscriber this circuit sends periodic mark and space signals to the subscriber as long as the reception of "ringing" from the central office continues. When a mark is received from the central office at the end of the "ringing" period this circuit sends a mark signal to the subscriber.

(11) Under the condition of paragraph 10, above. if a continuous space is not followed by "ringing" the circuit acts exactly as described under paragraph 10 provided the subscriber's disconnect has not been registered in the trunk. If a subscriber's disconnect has already been registered, the reception of a space signal of one second duration from the master office causes this circuit to order the link to disconnect the subscriber's line from the trunk, returning the circuit to normal.

(12) When the trunk circuit is seized at the distant end for an inward call this circuit receives a mark signal which after one-half second has elapsed results in ordering the sequence circuit to connect a director to the trunk, at the same time marking the trunk busy to outward calls and lighting the trunk busy lamp.

(13) If the attached director fails to get ready to receive teledirecting pulses the miscellaneous alarm circuit after an interval orders the sequence circuit to manufacture a characteristic trouble signal and transmit it to the trunk for retransmission to the manual office, removing the director and extinguishing the trunk busy lamp.

(14) When a director is attached and ready to receive teledirecting pulses it orders this circuit to send a continuous mark signal to the master office.

(15) With the director attached, if a prolonged space signal is received from the master office as a result of the operator's disconnect this circuit after one-third of a second orders the sequence circuit to dismiss the director and after one second returns to normal.

(16) Without the director attached, if a two-thirds of a second space signal followed by ringing is received as a break signal from the operator, this circuit orders the sequence circuit to release the director. If at the conclusion of ringing a mark signal is received the sequence circuit is again ordered to connect a director to the trunk but if at the conclusion of ringing a space signal is received the trunk circuit returns to normal.

(17) When the teledirecting pulses are received they are transmitted to the director which decodes the information and tests the called line, ordering the link circuit to connect it to the trunk circuit if the line is idle.

(18) If the called line is busy, out of order or unassigned, signals characteristic of these conditions are produced in the director, transmitted to the trunk and retransmitted to the manual office.

(19) When the called line is attached to the trunk the sequence circuit and the director circuit are dismissed and the trunk again sends a space signal to the manual office; at the same time automatic ringing of the subscriber's line is begun.

(20) When the subscriber answers at the called station this circuit during the silent interval disconnects the automatic ringing, sends a mark signal to the manual end and advances into the half duplex transmission stage in which it is capable of distinguishing between normal teletypewriter signals and break or disconnect signals from either end.

(21) If the called line is to be started on an unattended basis continuous ringing is received from the manual end, causing continuous ringing to be sent to the subscriber.

(22) After continuous ringing has exceeded nine seconds in an attempt to start an unattended station this circuit sends a permanent mark to the called station. If the station has been started this circuit sends a mark to the manual office and advances to the half duplex transmission stage. If the station has not started after nine seconds the circuit continues to send a space to the central office and a mark to the subscriber until appropriate action is taken by the manual operator.

(23) After a subscriber has disconnected, the operator can rering the subscriber by sending a short ringing signal from the manual office which again starts the automatic ringing of the subscriber's line.

(24) This circuit is provided with jacks (A) and (B) to permit manual connection of lines in case of failure of the automatic equipment.

(25) The jacks (A) (B), (send) and (receive) are provided to permit the testing of the trunk circuit.

*Description of operation*

Hereafter at various points in the description the terms outward path and inward path will be used. The outward path means the path over which telegraph code pulses from the subscriber's station are transmitted and the inward path means the path over which telegraph code pulses to the subscriber's station are transmitted. By way of example, the outward path from a toll subscriber's station includes the single conductor from such toll subscriber's station where it operates the relay 501. Relay 501 vibrates its armature between ground and positive battery and finds a path through the upper winding of send relay 502 over the tip conductor and eventually through the lower winding of relays 1100 and 1101. Relay 1100 responds and vibrates its armature between ground and negative battery to effect the outward path over the send leg 1300.

The inward path may be traced, in general, from the receive leg 1301 to the winding of the receive relay 1302. Relay 1302 vibrates its armature between ground and positive battery and finds a path through the lower windings of relays 1101 and 1100, thence over the tip conductor and eventually through the upper winding of the send relay 502. Relay 502 vibrates its armature between ground and positive battery and controls a path through the upper windings of relays 501 and 500 to the single conductor leading to the toll subscriber's station. Thus teledirecting pulses from the subscriber's station pass out over outward conductor 1300 and teledirecting pulses coming in over the inward path 1301 are transmitted to the subscriber's station.

This circuit shown in Figs. 11 and 13 is the termination at the concentration unit end of a two-way trunk to a master office. It is designed for installation in offices equipped with regular testboards or with the hub type serviceboard and for use on subscribers' lines operating on a 0 to 20 milliampere transmission basis. This circuit has full automatic supervision facilities capable of differentiating between telegraph signals, breaks and disconnect signals from either end. In general, a disconnect signal is a continuous space and a break is a limited space space signal followed by a 20-cycle ringing signal for the remainder of the break. Due to the 0 to 20 milliampere subscriber loop transmission the condition at the subscriber station cannot be ascertained during the transmission of a space to the subscriber. This circuit recognizes this impossibility and orders a periodic mark signal sent to the subscriber during which it can determine the conditions at the station. In the normal condition of the circuit both send and receive leads to the master office are spacing and battery drain is removed from the loop repeater and the vacuum tubes.

*The subscriber originates an outward call*

When the subscriber originates an outward call by operating his power switch to the "on position" the line circuit orders the sequence circuit to preselect a trunk circuit. The sequence circuit places a ground on the start lead 1102, causing the operation of the start relay 1103. Relay 1103 in operating (1) causes the relays 1100 and 1101 of the repeater to go "marking," (2) operates the off-normal relay 1104, (3) locks to lead 1105, (4) lights the trunk busy lamp 1106, and (5) after relay 1104 operates places a ground on the trunk lead 1108 to the miscellaneous alarm circuit to warm it that verification ringing has been requested from the manual end. Relay 1103 causes the relays 1100 and 1101 to go marking by placing a ground through its armature 4, through resistance 1107 on the tip conductor 1109 leading through the lower windings of relays 1100 and 1101. Relay 1103 operates the off-normal relay 1104 through a circuit from ground and its armature 7 to conductor 1110 leading, among other places, to the winding of relay 1104. Relay 1103 finds ground on conductor 1105 for locking purposes through the back contact and inner upper armature of relay 1200. The trunk busy lamp 1106 is lighted in a circuit from ground, lamp 1106, armature 6 and front contact of start relay 1103, conductor 1111 and thence through the back contact and lower armature of relay 1201 in the sequence circuit to battery. Ground is placed on the trunk lead 1108 through the front contact and armature 1 of relay 1103, back contact and armature 5 of relay 1112, back contact and lower outer armature of relay 1113, armature 5 and front contact of off-normal relay 1104 to ground.

The operation of the off-normal relay 1104 energizes the filaments of the tubes 1303, 1304, 1305, 1306 and 1307 from ground, armature 7 and front contact of relay 1104, resistance 1308 and the filaments of tubes 1303 to 1307, inclusive, resistance 1309, conductor 1310, resistance 1311 to battery. The off-normal relay 1104 connects power to the loop repeater by connecting ground through its front contact and armature 6 to the spacing contact of receive relay 1302 and by connecting ground through its armature 3 to the marking contact of loop relay 1100. The off-normal relay 1104 also connects ground through its armature 2 and front contact to the armature of polarized relay 1114 and to the winding of relay 1115. Off-normal relay 1104 also transmits the mark signal created by the send relay 1100 through its front contact and armature 4 to the manual master office over the outward path including conductor 1300.

The reception of a mark signal operates at the manual master office as a calling-in signal and causes that end to function to send to the concentration unit a 20-cycle ringing signal which is received over the incoming path including conductor 1301 and 1302. The connection of relay 1312 to conductor 1301 is obvious. The connection to relay 1302 may be traced through the back contact and upper outer armature of relay 1313, through the upper winding of relay 1302 to negative battery. The vibration of the armature of relay 1312 has no effect upon the tube circuits but the vibration of the armature of relay 1302 causes the operation of relay 1116 in a circuit from ground, winding of relay 1116, condenser 1117, conductor 1118, conductor 1318, back contact and inner lower armature of relay 1314, armature of relay 1302 and thence between its marking and spacing contacts. On its spacing contact will be found a ground on armature 6 of the off-normal relay 1104 and on its marking contact will be found positive battery through resistance 1315. The operation of relay 1116 establishes a connection from ground, armature 3 and front contact of relay 1103, armature and front contact of relay 1116, winding of relay 1112 to battery. Relay 1112 in operating removes ground from the trunk lead 1108 extending to the miscellaneous alarm circuit in Fig. 23 as an indication that verification ringing has been received.

Upon the operation of relay 1112 a circuit is established from ground, front contact and armature 5 of relay 1104, lower outer armature and back contact of relay 1113, armature 5 and front contact of relay 1112, normally closed auxiliary contacts of the B jack 1119, winding of relay 1120 to battery. Relay 1120 in operating causes all of the selecting magnets associated with this trunk to operate. By way of example, a connection is extended from battery through the outermost armature and front contact of relay 1120, conductor 1121 and thence to selecting magnet 900. These selecting magnets in conjunction with a slow acting relay 2300 in the miscellaneous alarm circuit orders the sequence circuit to operate the calling subscriber's hold magnet of the cross-bar switch. By way of example, hold magnet 800 may thus be operated. The operation of the hold magnet connects the subscriber's line to the trunk circuit, the hold magnet locking in series with the relay 1115. This circuit may be traced from battery, winding of hold relay 903, conductor 923 through the appropriate contacts of the set 901, conductor 1122, winding of relay 1115, front contact and armature 2 of the off-normal relay 1104 to ground. The operation of relay 1115 causes the operation of relay 1113 in a circuit from battery, the winding of relay 1113, upper armature and front contact of relay 1115 to ground. Relay 1115 also places a ground on conductor 1123 which is known as the hold chain lead. Relay 1113 in operating causes the release of relay 1120 and this in turn causes the release of the selecting magnets.

Meanwhile battery potential on the R lead 1124 which may be traced, for instance, to the positive battery connected through resistance 518 to the ring lead 526 in the toll subscriber's line circuit (Fig. 5) causes the operation of relay 1114 and in turn the operation of relay 1125. Relay 1125 in operating causes the operation of relay 1126 which thereupon locks under control of relay 1127 to ground on conductor 1110, preventing the starting of automatic ringing of the subscriber. Relay 1125 also furnishes an additional ground for holding the off-normal relay 1104 operated by placing ground on conductor 1110 through its front contact and armature 4. Relay 1125 further causes a reversal of current in the lower winding of relay 1114 through the movement of armature 1 of relay 1125. With armature 1 of relay 1125 in its normal position a ground is extended from the front contact and armature 6 of relay 1104 through the lower armature and back contact of relay 1128, armature 1 and back contact of relay 1125 to that lead of the lower winding of relay 1125 connected to resistance 1129. When relay 1125 becomes energized then this direct ground is transferred to that lead of the lower winding of relay 1114 connected to the resistance 1130, which results in a reversal of the current flow in the lower winding of this relay. This is for the purpose of holding relay 1114 operated.

In the meantime the operation of the hold magnet, say magnet 803, has caused the release of the subscriber line circuit and the sequence circuit. The latter circuit in releasing places a ground at relay 1607 on conductor 1131 which by means of the front contact and armature 8 of the operated relay 1103 is connected back to the sequence circuit over the conductor 1132, resulting in the operation of the "advance chain" relays, such as 1202. It will be noted that upon the operation of relay 1202 that relay 1200 is operated whereupon ground is removed from conductor 1105 which allows the start relay 1103 to release. The advance chain relays lock to ground furnished over conductor 1123 at the lower armature and front contact of relay 1115. The energized condition of relays 1200 and 1202 in the sequence circuit makes this particular trunk test busy to other calling subscribers in addition to furnishing battery from the innermost lower armature and back contact of relay 1201 through the front contact and outer lower armature of relay 1202 to lead 1133 to maintain the busy lamp 1106 energized.

The circuit now awaits the operator's answer. At this stage the following relays are operated: 1116, 1112, 1115, 1113, 1114, 1125, and relays 1100 and 1101 are held on their marking contacts under control of the subscriber's loop. Relays 1312 and 1302 are following ringing which is being received from the manual end while a steady mark is being sent to the manual end.

Failure of the return of verification ringing

As indicated hereinbefore, the trunk circuit continues to keep ground on the trunk lead 1108 until ringing is registered in the trunk. If, due to any failure of the trunk lines or terminal equipment at either end, ringing is not received within a specified period the miscellaneous alarm circuit grounds lead 1134 which by means of the start relay 1103 causes the grounding of lead 1135 extending to lead 1235 of the sequence circuit where it causes the operation of relay 1203. The sequence circuit operates the chain relays which cause the release of relay 1103 while meanwhile a ground is placed on conductor 1110 through the operation of relay 1201, thus keeping the off-normal relay 1104 operated and power on the loop repeater while battery is removed from conductors 1111 and 1133 extinguishing the trunk busy lamp 1106. The sequence circuit generates a characteristic trouble signal at interrupter 1623 which, connected to conductor 1136, is transmitted through resistance 1107 to the lower windings of relays 1100 and 1101 whereby this characteristic signal is further transmitted over the outward path to the manual office where if the outward path is satisfactory it will flash the line lamp in a characteristic manner. The seqeunce circuit at the same time preselects the next idle trunk for the calling subscriber.

Subscriber flashes before operator answers

The subscriber can flash the operator by slowly turning his power switch off and on. When the switch is turned off relays 1100 and 1101 return to spacing. Relay 1100 transmits this spacing signal over the outward path to the master office. Relay 1101 removes ground from the grid of the subscriber break tube 1305 by moving its armature from its marking to its spacing contact.

On reoperation of the power switch this circuit again sends a mark to the manual end and grounds the grid of the subscriber break tube 1305. When the ground has been removed from the grid of tube 1305 this grid finds a connection over conductor 1137 through resistance 1138, resistance 1139, conductor 1140, through resistance 1311 to positive battery. Due, however, to the presence of condenser 1141 connected to conductor 1137 the grid of the tube 1305 does not become sufficiently positive in a predetermined period to cause the effective operation of tube 1305. On very slow flashes, in approximately three seconds the charge on condenser 1141 and therefore on the grid of this tube has gone sufficiently positive to cause a plate current to flow to operate relay 1316 which in turn operates relay 1128. Relay 1128 again causes spacing bias current to flow in the lower winding of relay 1114, causing it to release since the subscriber's line is now opened. Relay 1114 releases relay 1125 which again grounds the grid of the subscriber break tube 1305 by placing a ground on conductor 1137 through the back contact and armature 7 of relay 1125. This causes the release of relays 1316 and 1128. In the meantime a continuous space has been sent to the master office over the outward path. When the switch is again turned on relay 1100 sends a mark to the central office and at the same time relay 1101 applies ground to the subscriber break tube 1305 which releases relays 1316 and 1128 if they have not already released or prevents them from operating if they have not operated. The potential on the ring lead 1124 again operates relay 1114 and in turn relay 1125 which again permits marking bias in the lower winding of relay 1114 to keep it operated. The space and mark signals sent to the manual end are used to flash the line lamp at the switchboard.

Subscriber abandons a call before operator answers

If a subscriber abandons an outward call before the operator answers, the circuit functions as described above during the "off" position of the switch. After a space of approximately four seconds has reached the manual office the distant end of the trunk acts to discontinue the ringing which in this trunk drives relays 1312 and 1302 to spacing, causing the release of relays 1116 and 1112. Relay 1112 releases the off-normal relay 1104 which removes battery drain from the tubes and loop repeater and in removing ground causes the release of relay 1115 and the hold magnet locked in series with it, thus disconnecting the subscriber's line from the trunk. The sleeve relay 1115 releases relay 1113 and the two together return the circuit to normal, releasing the chain relays of the sequence circuit thus removing the busy condition and extinguishing the trunk busy lamp 1106.

Operator answers an outward call

When the operator answers an outward call the distant end acts to discontinue ringing and sends a steady marking signal which causes the relays 1312 and 1302 to go marking. The relay 1302 therefore causes the release of relays 1116 and 1112. After the armature of relay 1312 has remained off the spacing contact for approximately one-half of a second the cut-through tube 1304 functions. With relays 1312 on its spacing contact a ground may be traced from the armature of relay 1312, its spacing contact, the back contact and outer upper armature of relay 1317, resistance 1319 to the grid of tube 1304. Branching off this circuit is condenser 1144 through a companion resistance to ground. With ground removed from condenser 1144 it becomes charged in a circuit through resistance 1142, resistance 1143, conductor 1140, resistance 1311 to positive battery. When the condenser 1144 has been charged sufficiently, plate current will flow in tube 1304 to cause the operation of relay 1320. The operation of relay 1320 results in the operation of relay 1317 and this in turn operates relay 1145 which locks through its armature 8 and front contact. The operation of relay 1317 removes control of the cut-through tube 1304 from relay 1312 but the tube continues to function by reason of a circuit now established from the grid of tube 1304, resistance 1319, front contact and armature 5 of relay 1145, resistance 1143, conductor 1140, resistance 1311 to positive battery.

Relay 1145 in operating locks under control of relay 1321. When, as will later appear, relay 1321 becomes operated, the resistance 1334 will be connected to ground at the back contact and lower outer armature of relay 1314 to cause the short circuit and release of relay 1145. Relay 1145 also furnishes an additional ground through its front contact and armature 4 to maintain the off-normal relay 1104 operated. Further, relay 1145 permits relay 1314 to become energized in a circuit from battery, the winding of relay 1314, front contact and armature 3 of relay 1145, back contact and armature 3 of relay 1112, spacing contact and armature of relay 1114, front contact and armature 2 of relay 1104 to ground. Relay 1145 also removes ground from conductor 1146 extending into the sequence circuit. Relay 1314 in operating arranges the loop repeater to operate on a half duplex transmission basis, a condition that remains throughout the transmitting period. Regular telegraph transmission, break and disconnect signals are monitored by means of relay 1101 when originated by the subscriber and by means of relay 1312 when received from the manual office, that is, relay 1101 monitors the outward path and relay 1312 monitors the inward path. Both relays 1101 and 1312 control tubes which do not function on signals of less than one-third of a second and, therefore, regular transmission of telegraph signals does not affect the circuit supervision. Breaks or disconnect signals from either end will be discussed under separate paragraphs.

*Reception of prolonged space signal from the concentration unit subscriber*

If a space signal is received from the subscriber it is of course retransmitted over the outward path to the manual office by relay 1100. Relay 1101 removes ground from the subscriber break tube 1305 which with relay 1145 operated now requires two-thirds of a second to reach the point where sufficient plate current will flow to result, as hereinbefore described, in the operation of relays 1316 and 1128 and the application of spacing bias to the lower winding of relay 1114. From this point on the circuit acts differently if the space was the result of a subscriber sending a break, flash or disconnect signal and the three will be discussed separately.

*Space signal as a result of transmitting a break*

In this case relay 1114, on account of a small amount of current in the line, remains operated, keeping relay 1125 operated. The operation of relay 1128, which operated as previously described, therefore causes the operation of relay 1147 in a circuit from battery, winding of relay 1167, inner lower armature and front contact of relay 1128 to ground on the marking contact of relay 1114. The operation of relay 1147 supplants the space signal sent over the outward path to the manual office by a ringing signal. This may be traced from conductor 1148 connected to a source of continuous ringing current of 20 cycles per second, through resistance 1149, the front contact and middle upper armature of relay 1147, the upper armature and front contact of relay 1129 and thence over the outward path including conductor 1300. The reception of a limited space followed by ringing at the distant end is interpreted as the transmission of a break signal. The transmission of ringing to the manual end continues as long as the subscriber's break signal continues. When the subscriber's break is terminated by a mark signal relays 1100 and 1101 go marking, resulting in the application of ground to the grid of the subscriber break tube 1305 and in the consequent release of relays 1316, 1128 and 1147. The release of relay 1128 and finally the release of relay 1147 again completes the outward path to the armature of relay 1100 and sends a mark signal to the manual office, thus returning the trunk to the condition it was in before the reception of the break signal from the subscriber.

*Space signal as a result of the subscriber disconnecting*

The circuit in this case acts as outlined in the paragraph under the heading "Reception of prolonged space signal from the concentration unit subscriber," but the relay 1114 goes spacing, allowing the relay 1125 to release which in turn causes the release of relay 1314 and the application of ground to the subscriber break tube 1305. The action of the tube releases the relays 1316 and 1128. Relay 1314 released returns the circuit to effective full duplex transmission. The trunk sends a continuous space signal to the manual office where it is interpreted as a disconnect signal and the circuit awaits appropriate action of the outward operator.

*Space signal as a result of the subscriber flashing*

In this case the circuit functions as outlined in the paragraph under the heading "Reception of prolonged space signal from the concentration unit subscriber" and the paragraph under the heading "Space signal as a result of the subscriber disconnecting" during the interval the switch is in the "off position". When the switch is again turned on, relays 1100, 1101 go marking, sending a marking signal over the outward path to the manual end while meanwhile the relays 1316 and 1128 release if they have not already done so and relays 1114 and 1125 reoperate. Relay 1125 again causes marking current to flow in the lower winding of relay 1114, holding it marking and at the same time again operating relay 1314. The flash, in the form of a continuous space followed by a mark, is transmitted to the manual end and the circuit returns to its half duplex transmitting condition.

*Reception of a break signal from the manual exchange*

A break transmitted from the manual end is in the form of a limited space signal followed by a ringing signal. Immediately the relays 1312 and 1302 go spacing, the latter transmitting the space to the concentration unit subscriber. The removal of ground from the grid of the operator's break tube 1303 causes, after approximately one-third of a second, a plate current to flow which effectively discharges condenser 1144 associated with the grid of the cut-through tube, resulting in the release of the relays 1320 and 1317. While relay 1312 is on its marking contact ground is connected through such marking contact directly to the grid of tube 1303 through resistance 1322. When relay 1312 therefore goes spacing, a positive battery connection to the grid of tube 1303 may be traced through resistance 1322, resistance 1323, resistance 1311 to positive battery. It is not, however, until condenser 1324, now connected through resistance 1325 and the front contact and armature 7 of relay 1104 to ground, has become sufficiently charged that the operator's break tube 1303 will operate, thereby effectively discharging tube 1304. Relay 1317 released again puts the grid of the cut-through tube 1304 under control of relay 1312 and at the same time results in the operation of relay 1313 in a circuit from battery, the winding of relay 1313, the back contact and lower outer armature of relay 1317, the front contact and armature 8 of relay 1145 to ground. Relay 1313 removes ground from the grid of the break limiting tube 1306, this ground being normally supplied over armature 2 of relay 1112 and its back contact and thence over the lower armature and back contact of relay 1313. Relay 1313 also places the line winding of relay 1302 under control of relay 1150 which, being operated, continues to keep relay 1302 spacing. After two-thirds of a second space, ringing is received from the manual office in time to prevent the operation of the disconnect tube 1307 and still keep the cut-through tube 1304 from operating, all of which results from the vibration of the armature of relay 1312 under the influence of the received ringing current. A space therefore is continuously sent to the subscriber. Since the condition at this subscriber's station cannot be determined while a space is being sent, the break must be limited. Therefore, after approximately five seconds the break limiting tube 1306 which lost ground on its grid because relay 1313 operated, functions to operate relay 1326 and relay 1150. Upon the operation of relay 1313 the grid of tube 1306 may be traced through the resistance 1327, resistance 1328, resistance 1311 to positive battery. A circuit may also be traced from the grid of tube 1306, resistance 1327 through condenser 1329, resistance 1330 to ground. The values of condenser 1329 and these various resistances limit the rise of positive potential on the tube 1306 to a period of five seconds before the tube 1306 becomes effective. The operation of relay 1326 places relay 1150 under the control of interrupter 1151 in a circuit which may be traced from battery, winding of relay 1150, front contact and armature of relay 1126, armature 6 and front contact of relay 1125 to interrupter 1151 and thence to ground. Reoperation of relay 1150 causes a mark to be sent to the subscriber, at which time a subscriber's break, flash or disconnect signal will cause the circuit to act as outlined hereinbefore. At the conclusion of the break the ringing received from the manual office is replaced by a continuous mark signal which in approximately five-hundredths of a second causes the cut-through tube 1304 to operate relays 1320 and 1317, thus causing the release of relay 1313 and again restoring the inward transmission path. If the break limiting tube has functioned relay 1313 again connects ground to its grid, causing the release of relays 1326 and 1150. With the inward transmission path established, steady mark is again sent to the subscriber and the circuit has returned to the regular half duplex transmission condition.

*Operator sends a disconnect signal*

If the operator disconnects from the trunk on an uncompleted inward call or after the subscriber has disconnected, the circuit receives a steady space signal from the manual end. As outlined under the preceding heading, the circuit after one-third of a second allows the operator break tube 1303 to function to ground the grid of the cut-through tube 1304, resulting in the release of the relays 1320 and 1317 and the operation of relay 1313. Though the relay 1302 goes spacing it has no effect upon the subscriber line. After another two-thirds of a second has elapsed the disconnect tube 1307 functions to operate the relay 1321 which in turn causes the release of relay 1145. The disconnect tube 1307 is also controlled by the condenser 1324.

The release of relay 1145 releases relay 1313 and the off-normal relay 1104. The release of the off-normal relay 1104 removes battery from the tubes and the loop repeater, releasing relay 1321 and removing ground from the sleeve relay 1115, causing it and the hold magnet locked in series with it to release. The release of the hold magnet removes the subscriber line from the trunk. The release of the sleeve relay 1115 causes the release of relay 1113 and removes ground from the hold chain lead 1123, thus releasing the chain relay of the sequence circuit resulting in the removing of the trunk busy condition to other calling subscribers and extinguishing the trunk busy lamp 1106, returning the circuit to normal.

*Operator originates an inward call*

When an operator seizes the trunk at the manual end to originate an inward call this circuit receives a continuous mark signal, causing the relay 1312 to go marking. After approximately one-half second the cut-through tube 1304 functions, causing the operation of relays 1320 and 1317 and in turn relay 1145. Relay 1317 removes the control of relay 1312 over the grid of the cut-through tube 1304, thus keeping the tube and its dependent relays 1320 and 1317 operated. Relay 1317 extends a connection from ground, its front contact and lower inner armature over the lower inner armature and back contact of relay 1113 to conductor 1152, leading to the sequence circuit, where it results in the operation of relay 1204. Relay 1145 in operating (1) operates the off-normal relay 1104 which places ground on the winding of the sleeve relay 1115, (2) removes ground from lead 1146, (3) locks under control of relay 1321, and (4) changes the timing of the cut-through tube 1304 by short-circuiting resistance 1142 through its armature 5. The off-normal relay 1104 in operating places ground on the chain lead 1132 through its armature 5 and armature 8 of relay 1103, thus operating the chain relays 1202 and 1200 of the sequence circuit to make this trunk test busy to calling subscribers and also to light the trunk busy lamp 1106. Ground on the lead 1152 orders the sequence circuit to connect a director circuit to the trunk for the purpose of receiving the teledirecting pulses. Lead 1152 is included in a circuit traceable from ground at the front contact and inner lower armature of relay 1317, inner lower armature and contact of relay 1113, lead 1152, winding of relay 1204, back contact and inner lower armature of relay 1201 to grounded battery. Relay 1204 operates and (1) connects at its outermost upper armature and contact ground to a circuit extending through busy lamp 1213, leads 1224, 1424 and 1636, winding 1612 to grounded battery to light busy lamp 1213 and operate relay 1612; (2) connects, at its middle upper armature and contact, ground to a circuit extending over leads 1219, 1419, 1637 and 1719, inner right armature and back contact of relay 1701, leads 1720 and 1859 to the outer right armature of relay 1804 which at the time is in an unoperated condition; (3) closes at its lower armature and contact a circuit extending from ground at the lower armature of relay 2305, contact and innermost upper armature of relay 2300, leads 2330, 2130, 1730, 1630, 1430, 1230, lower armature and front contact of relay 1204, winding of relay 1206, leads 1231, 1431 and 1631, left-hand armatures and back contacts of relay 1640, back contact and right-hand armature of relay 1641, conductors 1642, 1432, 1232 and 1021, back contacts and upper armatures, in series, of relays 1005, 1003 and 1001, conductors 1022, 1237, 1433, 1643, back contacts and left armatures of relay 1641, left armatures and back contacts of relay 1644, conductors 1645, 1731, 2131, 2347, back contacts and armatures of relay 2303 to grounded battery.

Relay 1206 operates and locks to ground at the innermost upper armature and contact of relay 1204. Relay 1206 upon operating closes at its lower armature and front contact an operating circuit for relay 1207 which operates. Relay 1207, upon operating, (1) closes at its outermost upper armature and contact an operating circuit for relay 1800 and relay 1800 operates; (2) closes at its innermost lower armature and contact an operating circuit for relay 1120; and (3) connects at its middle and its innermost upper armature and contact the inward and the outward leads 1124 and 1136 of the two trunks to the director circuit. The sequence circuit when it attaches a director, grounds lead 1153 which extends through the auxiliary contacts of the B jack 1119 to the winding of the relay 1120 which in turn and as before described causes the operation of the selecting magnets 900 in the link circuit of the crossbar switch or switches connected with this trunk.

Failure of director

When a director is attached relay 1800 is operated, which when operated cause to operate, in turn, relays 1804, 1806 and 1814. The director is thus prepared to receive the telegraph code pulses. If it discovers a trouble internally or in the leads connected to the trunk, the miscellaneous alarm circuit orders the sequence circuit to generate a characteristic signal and send it over the lead 1136 whereupon relay 1100 responds and transmits this characteristic signal over the outward path. The sequence circuit also grounds the off-normal lead 1110 to hold the off-normal relay 1104 operated. Simultaneously the sequence circuit releases the director and extinguishes the busy lamp 1106.

Director ready signal

If an attached director is prepared to receive the teledirecting pulses it connects a ground to lead 1136 which drives relays 1100 and 1101 to marking. Relay 1100 therefore sends a continuous marking signal over the outward path to the manual end as an indication that the attached director is ready to receive pulses.

Reception of a break or disconnect signal from the manual end while a director is attached If a continuous space signal is received from the manual end the circuit functions as described under the paragraph headed "operator sends a disconnect signal." After one-third of a second relays 1320 and 1317 release, permitting the operation of relay 1313. Relay 1317 in releasing removes ground from lead 1152, ordering the sequence circuit to release the director. The director upon being released removes ground from lead 1136 which causes relays 1100 and 1101 to go spacing, sending a space signal to the manual end. After another two-thirds of a second of space the disconnect relay 1321 operates, thereby releasing relay 1145 which in turn releases relay 1313 and the off-normal relay 1104, returning the circuit to normal. If ringing is received after two-thirds of a second the disconnect relay 1321 does not operate. When ringing is replaced by a mark signal, as indicated in the paragraph under "Reception of a break signal from the manual end," relays 1320 and 1317 again operate, releasing relay 1313. Relay 1317 grounds lead 1152, causing the sequence circuit to again attach a director.

Reception of teledirecting pulses and connection to an idle line

When the director ready signal is received at the manual end the operator types the number of the called line sending the teledirecting pulses to this circuit, which transmits them to the director over lead 1118. The director decodes this information and makes a test of the called line. If the line is idle the director orders the link circuit to connect the idle line to the trunk circuit and when the hold magnet of the link circuit operates it locks in series with the sleeve relay 1115 which operates, operating in turn relay 1113.

Call for a busy, out-of-order, or unassigned line

If the director on testing the called line finds it busy, out of order or unassigned it generates signals characteristic of these conditions and sends them over lead 1136 to the trunk where they are retransmitted to the manual end over the outward path. Upon the reception of these signals the operator sends either a break or disconnect signal, causing the circuit to act as described hereinbefore. If either of these signals is not received in ten seconds the miscellaneous alarm circuit orders the sequence circuit to dismiss the director and to generate a characteristic trouble signal which, sent over conductor 1136, is retransmitted over the outward path to the manual end. The sequence circuit grounds the off-normal lead 1110 and extinguishes the trunk busy lamp 1106.

Automatic ringing of subscriber line

When the called line is attached to the trunk the sleeve relay 1115 and relay 1113 become operated. Relay 1113 in operating (1) opens lead 1152 to the sequence circuit, causing the sequence circuit to dismiss the director, and (2) permits relay 1127 to operate under the influence of the interrupter 1151. This circuit may be traced from the winding of relay 1127 through the back contact and armature 2 of relay 1125, the back contact and lower armature of relay 1150, the armature 4 and back contact of relay 1112, the upper armature and front contact of relay 1113, the upper armature and back contact of relay 1126, the front contact and armature 7 of relay 1145 to interrupter 1151. The removal of the director again permits relay 1100 to send a space signal to the manual end. Relay 1127 in operating (1) places ringing current connected to conductor 1148 to the tip conductor 1109 leading to the subscriber line, (2) operates relay 1147 in a circuit from the winding of relay 1147, the inner lower armature and back contact of relay 1128, the front contact and lower outer armature of relay 1127 to ground on off-normal conductor 1110, and (3) grounds the ring lead 1124 through its inner lower armature and front contact thereby short-circuiting the upper winding of relay 1114. Relay 1127 operating and releasing under the influence of the interrupter 1151 therefore connects automatic ringing to the subscriber line. Each time relay 1127 releases it again sends a steady mark to the subscriber and causes the slow-releasing relay 1147 to release, resulting in the removal of the short-circuiting ground from about the line winding of relay 1114.

Called subscriber answers

When the called subscriber answers, relay 1114 operates in the first silent interval, operating in turn relay 1125 and relay 1314. Relays 1100 and 1101 meanwhile go marking, transmitting a marking signal over the outward path to the manual end as an indication that the called subscriber has answered. A ground is also placed on the subscriber break tube 1305. The operation of relay 1125 (1) operates relay 1126, permitting it to lock under control of relay 1127, (2) reverses the current in the lower winding of relay 1114 to keep it marking, (3) furnishes an additional operating path for the off-normal relay 1104, (4) puts the grid of the subscriber break tube 1305 under the sole control of the relay 1101, and (5) prevents further ringing of the subscriber line. Relay 1314 in operating effectively arranges the loop repeater to operate on a half duplex basis. The circuit is now in the transmitting condition and continues to function as described hereinbefore.

*Call to a line operating on an unattended basis*

When an operator desires to start the motor at a called unattended station continuous ringing is sent from the manual end over the inward path, causing continuous ringing to be sent from this circuit to the subscriber line. The operation of relay 1112 having removed ground from the grid of the break limiting tube 1306 after nine seconds causes the relays 1326 and 1150 to operate. Relay 1150 operated opens the ringing to the subscriber, permitting the subscriber to receive a mark signal. If the station motor has started, potential on the ring lead causes relays 1114 and 1125 to operate, meanwhile sending a mark signal over the outward path to the manual end where the ringing is discontinued and replaced by a mark signal. The reception of a mark signal makes relays 1312 and 1302 go marking, releasing relays 1116 and 1112. Relay 1112 in releasing permits relay 1314 to operate and lets the break limiting tube 1306 release the relays 1326 and 1150. Relay 1314 changes the circuit to permit half duplex transmission and thereafter the circuit functions as described hereinbefore. If the station motor failed to start, relay 1114 would not operate and the circuit would continue to send a space to the manual end and a mark to the subscriber until appropriate action was taken by the manual operator.

*Rering of a disconnected subscriber*

When a subscriber disconnects after a completed call, as hereinbefore described, his line remains connected to the trunk until the registration of the operator's disconnect signal. The operator to rering a disconnected subscriber need only send ringing current which will result in the operation of relays 1116, 1112 and 1127. Relay 1127 releases relay 1126 which will again permit automatic ringing unless masked by ringing received from the manual end. When the subscriber answers, the circuit again functions as outlined under the heading "Called subscriber answers."

*Jacks for testing and emergency manual operation*

The concentration unit is provided with a test circuit which connected to the send and receive jacks, 1331 and 1332, respectively, will permit a complete test of all the features of this trunk on either an inward or an outward call. The A and B jacks 1154 and 1119, respectively, of this trunk are used for emergency manual operation in case the automatic equipment fails. By means of the A and B jacks a subscriber line and a trunk can be patched together. When the double plug is inserted into these jacks select magnets associated with the trunk are prevented from operating through the opening of the auxiliary contacts on the B jack 1119 and the off-normal relay 1104 is operated from ground placed on the armature of relay 1114 by the auxiliary contacts of the A jack 1154. Since relay 1114, and consequently relay 1125, operates a ground is placed on off-normal conductor 1110 through armature 4 and front contact of relay 1125. When the concentration unit has returned to automatic operation the subscriber line remains busy until the patch is removed. Similarly, the trunk is prevented from associating with a director circuit. A busy key 1155 is also provided to make the trunk busy to outward calls. When testing with the test set provided at the concentration unit this circuit furnishes the test circuit with a "link sleeve" indication over lead 1333 in addition to a busy lamp. At the serviceboard or testboard a busy lamp is furnished in addition to an arrangement to make this trunk test busy to outward calls.

*Terminal telegraph repeaters*

The outward path from the two-way trunk termination at the concentration unit is extended over conductor 1500 into a terminal telegraph transmitter generally designated by the numeral 1502. The inward path from this terminal telegraph transmitter extends over conductor 1501 to the concentration unit termination of this trunk. In a similar manner, a terminal telegraph transmitter at the distant central office is generally designated by the numeral 1503 from which the inward path extends over conductor 1506 to the central office termination. The outward path over which telegraph signals are transmitted from the concentration unit to the central office extends from the terminal transmitter 1503 over conductor 1507 to the central office termination.

These terminal telegraph transmitters 1502 and 1503 are well known and will only be generally described in the following manner:

Telegraph signals from the concentration unit are received by relays 1508 and 1509 and transmitted over the conductors 1504 and 1505 where they are relayed by the relay 1510 to the outward path 1507. In a similar manner, telegraph signals from the central office end are received by relays 1511 and 1512 transmitted over the conductors 1504 and 1505 where they are relayed by the relay 1513 to the inward path 1501.

One difference in these terminal telegraph transmitters should be noted. Since the arrangement in Figs. 11 and 13 comprises what is known as a closed or balanced loop type circuit, the connections to the spacing and marking contacts of relay 1513 are different from the connections to the spacing and marking contacts of relay 1510 which works into an inverse neutral type of circuit in the termination in Fig. 19.

Attention is directed to the arrangement of jacks 1514, 1515 and 1516. These jacks, as well as the various other testing jacks hereinbefore described, are placed in a testboard where an attendant may make various tests of the circuit arrangements. By means of jack 1514, connections to the outward and inward path may be made for testing and monitoring purposes in a manner such, for instance, as that shown in the application Serial No. 330,686, filed April 20, 1940, by J. R. Wilkerson. By means of jack 1515, a test of the conductors toward the concentration unit may be made while the terminal reepater 1502 is cut off. Jack 1516 is known as a "make busy" jack. By means of a plug 1518, the attendant may make a busy test of the trunk by placing the tip of this plug against the sleeve of the jack 1516. If the trunk is idle, no indication will be given but if the trunk is busy then a click will be heard in the receiver 1520. The sleeve of jack 1516 extends over conductor 1340 to the lower active contact of key 1155 which extends to armature 8 of the off-normal relay 1104. If the trunk is idle, then relay 1104 will not be operated and, consequently, there will be neither ground nor battery connection to conductor 1340. If, however, the off-normal relay 1104 is operated signifying that the trunk is busy then the connection will be extended through armature 8 of relay 1104 and its front contact, thence through resistance 1156 to battery. This battery connection will close a circuit through the upper winding of retardation coil 1519 resulting in a click in the receiver 1520 of the attendant's telephone set.

If, for some reason, the attendant wishes to make the trunk busy, then he operates the key 1155 which, besides putting ground on conductor 1132 extending over conductor 1333 to the tip contact of jack 1516, also extends conductor 1340 through the lower active contact of key 1155 through resistance 1156 to ground, which places battery on the sleeve of jack 1516.

This trunk may also be made busy by inserting the plug 1521 in jack 1516. Plug 1521 is a dummy plug and merely results in the closing of the auxiliary contacts of jack 1516 whereby ground is placed on conductor 1333 which, extending over conductor 1132, will operate the advance chain relays 1200 and 1202 in the sequence circuit.

Figure 15:
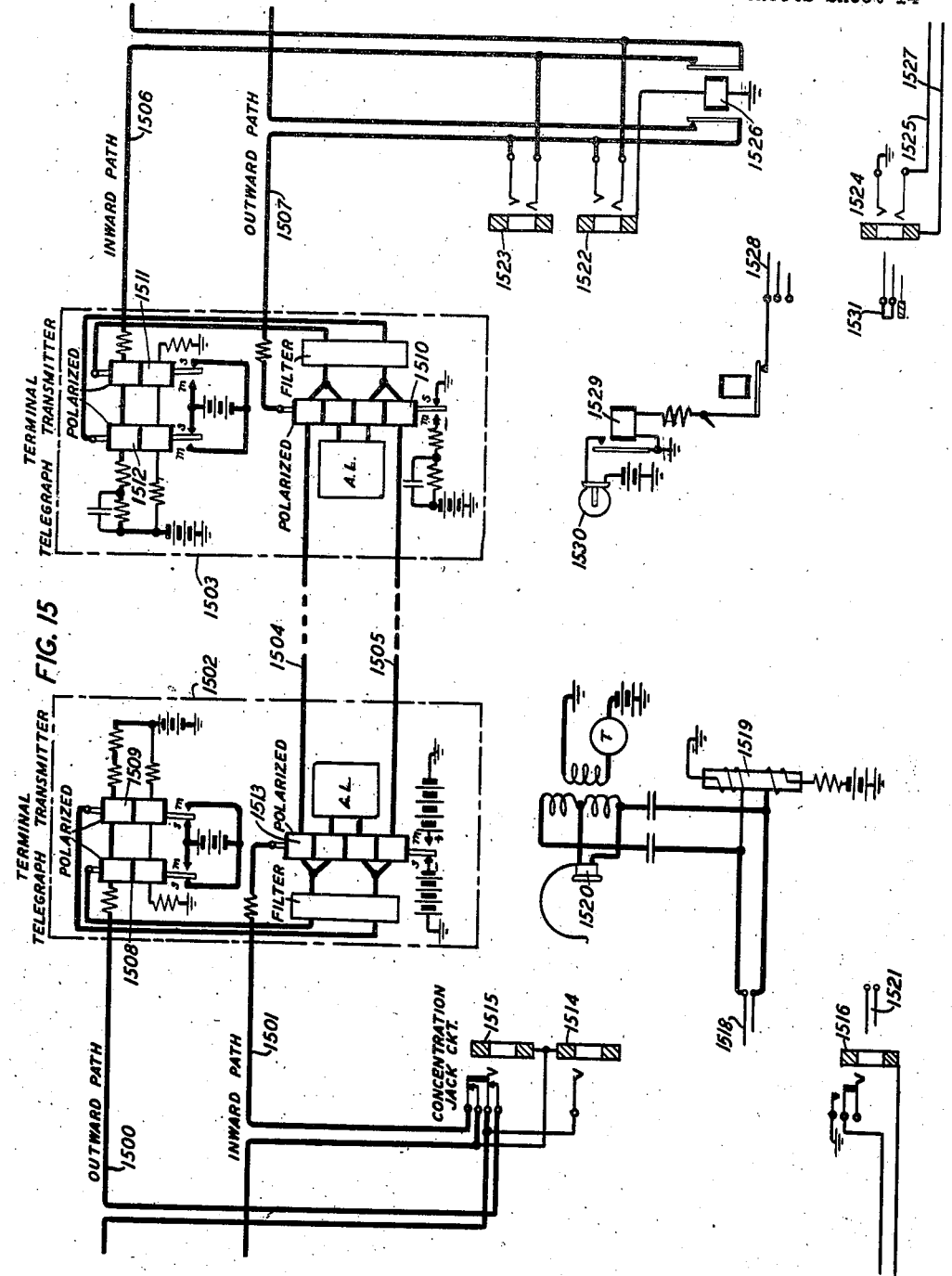
Fig. 15 shows the terminal telegraph repeater at each end of the trunk line between the concentration unit and the master office as well as the patching and testing jack arrangements.
Figure 17:
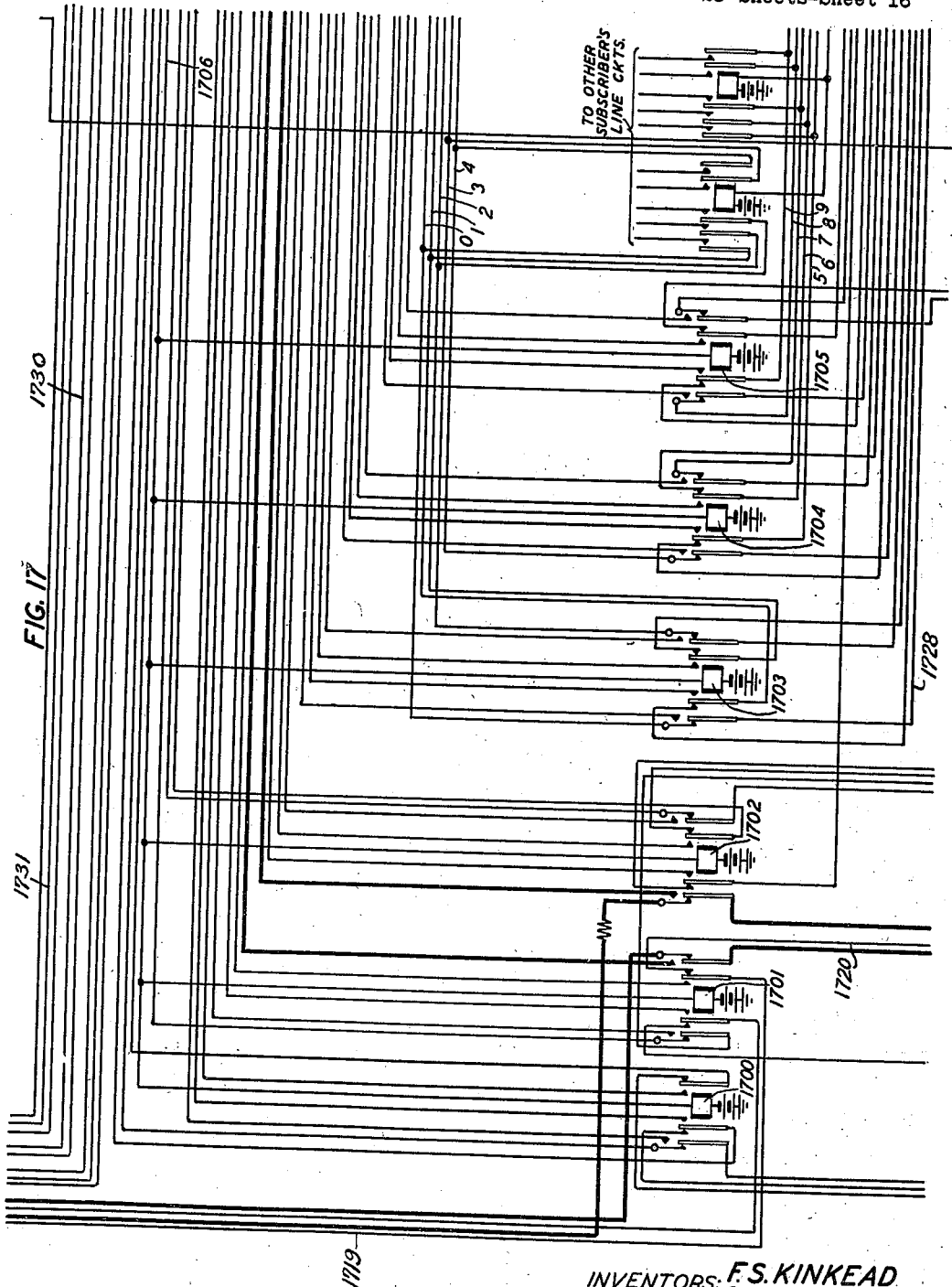
Figure 18:
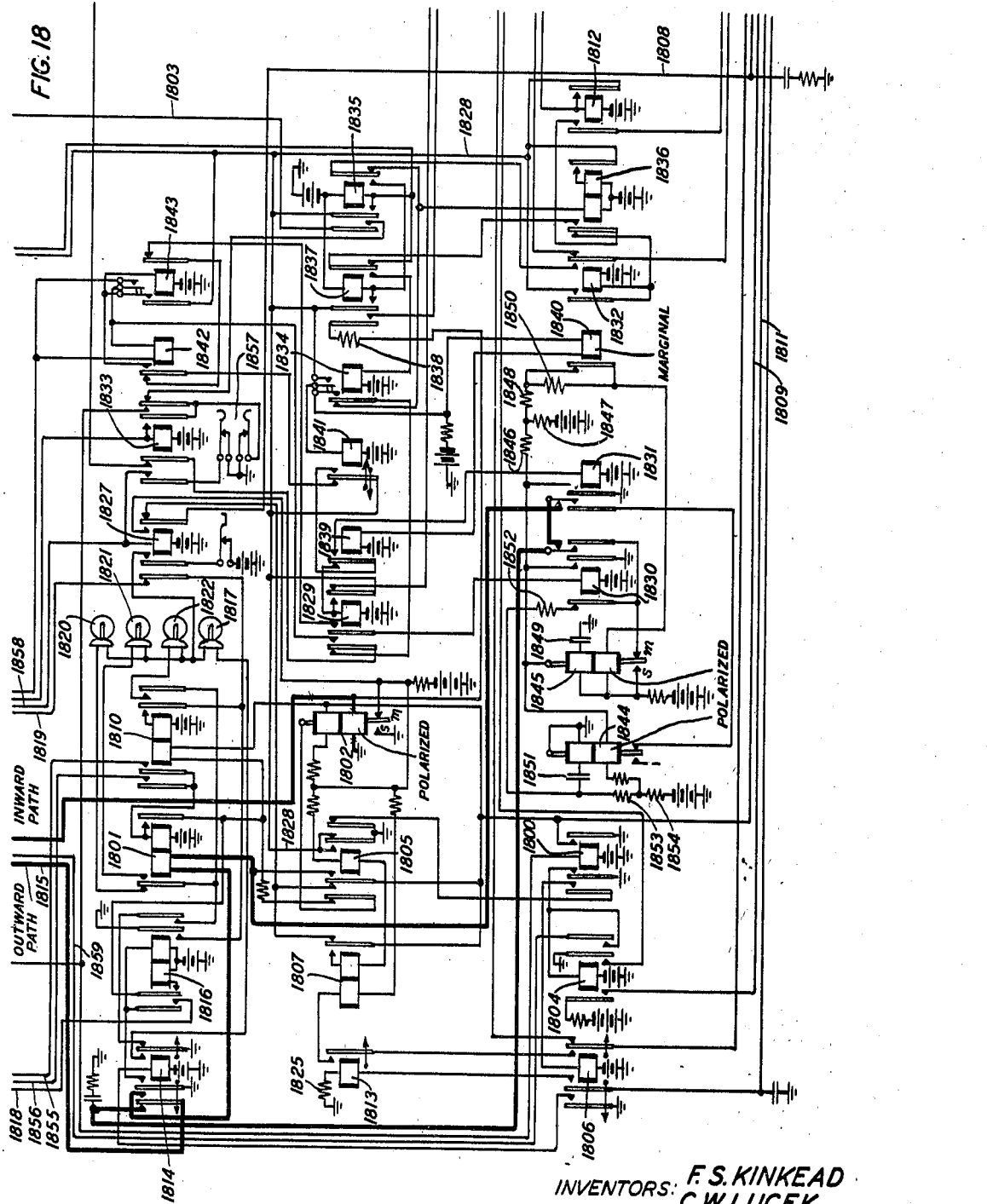

The right-hand portion of Fig. 15 illustrates arrangements at the central office end. Jacks 1522, 1523 and 1524 appear on a test position at the central office. By means of jack 1523, a monitoring operation may be carried out and by means of jack 1522 a testing operation toward the central office end may be carried out by employing a plug whose sleeve is connected to battery whereby relay 1526 may be operated. Jack 1524 is a "make busy" jack. As will be more fully described hereinafter, conductor 1527 connecting to the sleeve of jack 1524 will be without battery or ground connection when the trunk is idle and therefore if the tip of plug 1528 is brought into connection with the sleeve of jack 1524, no indication will be given. However, if the trunk is busy, then battery connection will be found on the sleeve of jack 1524 and this battery connection, extending over the tip of plug 1528 and through the winding of relay 1529 to ground, will cause the operation of relay 1529 and the consequent lighting of lamp 1530.

Figure 19:
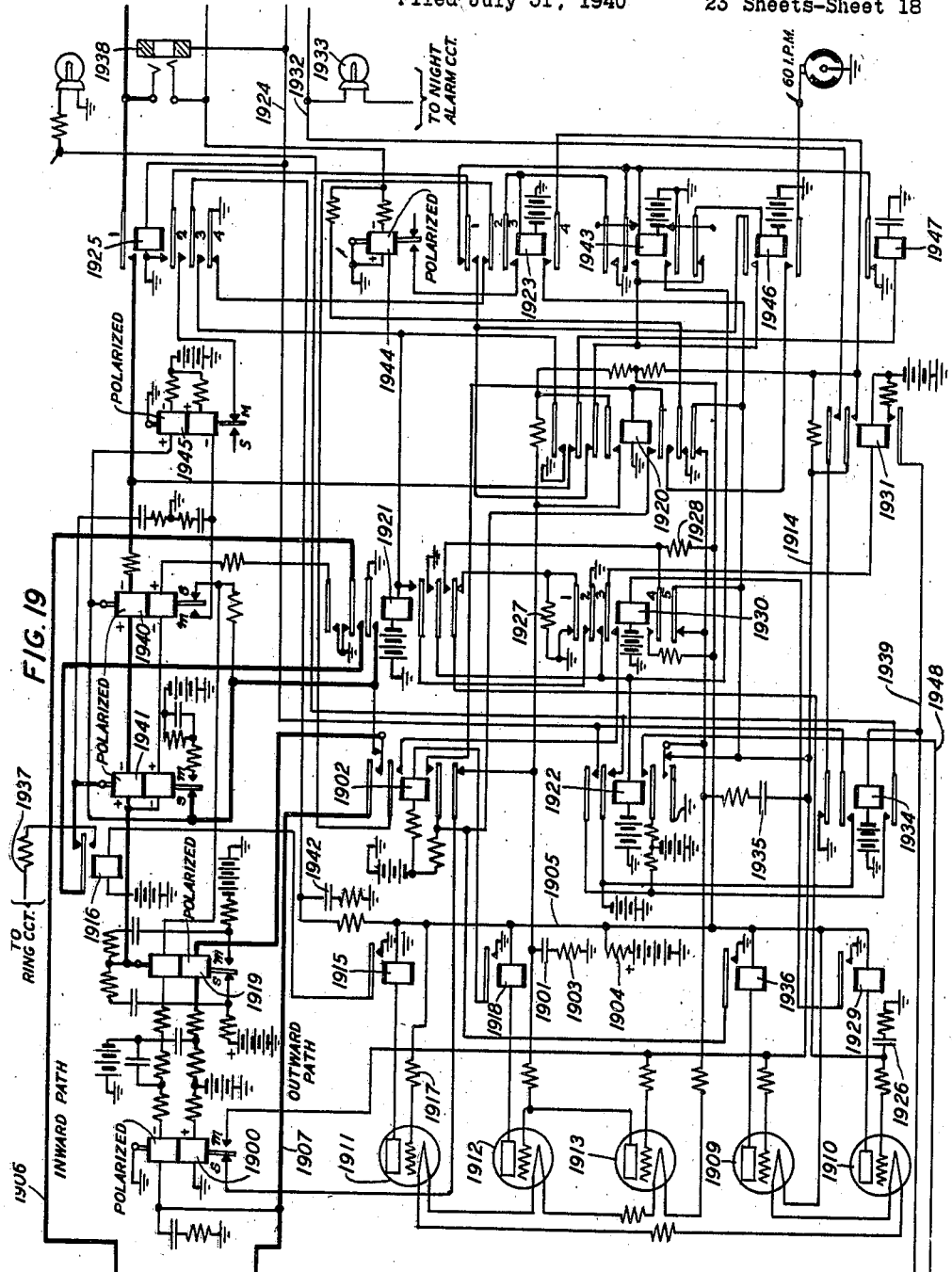
Fig. 19 shows the termination of the two-way trunk of Figs. 11 and 13 at the master office.

If the trunk of Fig. 19 is to be made busy, then a dummy plug 1531 is inserted in jack 1524. This plug will interconnect the tip and ring springs and thus place a ground on conductor 1525. Conductor 1525 will render the central office termination of the trunk busy.

*Automatic signaling concentration unit trunk circuit*

The circuit shown in Fig. 19 is the central office terminating circuit of a trunk extending to a concentration unit. This trunk has automatic signaling supervisory features at central office teletypewriter switchboards and is arranged to operate with 0 to 20 milliampere local lines. The functions of this circuit are as follows:

1. In the idle condition both the inward and outward transmission paths are spacing.
2. A call from the concentration unit will be received as a marking signal on the outward path. This action will be followed in 1 second second by the lighting of the busy lamps, application of a busy test potential to the sleeve multiple and the application of 20-cycle dot signals to the inward path. After ½ second additional time, the line lamps will light marking signals of less than 1 second duration will not be registered as calls.
3. In the call-before-answer period, if the subscriber recalls, the disconnect intervals will return the outward path to spacing and will extinguish the line lamps. Resumption of the call will relight the line lamps.
4. If the subscriber abandons the call before the operator has answered, the outward path will return permanently to spacing and the line lamp will be extinguished. The 20-cycle dot signals will be removed from the inward path after 4 seconds and the busy condition will be removed after an additional 1½ seconds.
5. When the operator answers the call, the line lamp will be extinguished and a marking condition will supplant the 20-cycle dot signals on the inward path; the busy lamps will remain lighted.
6. During communication, signals from the subscriber toward the master office will be transmitted over the outward path. Signals from the master office to the subscriber will be transmitted over the inward path. Between the full and half duplex inverting repeater and the connected cord circuit, signals in both directions will be transmitted over the tip circuit. No supervisory action will take place as a result of teletypewriter signaling. The ring or supervisory lead to the cord will therefore remain open during communication.
7. A break from the cord circuit will be repeated to the inward path as a spacing signal which will be supplanted by 20-cycle dot signals after a delay of ⅔ second. At the end of the break, the circuit will return to marking. A break from the subscriber will appear as a spacing condition on the outward path followed in ⅔ second by 20-cycle dot signals. Throughout the entire break interval, however, a spacing condition will be applied toward the cord circuit. No supervisory action will result from break signals in either direction.
8. A disconnect from the subscriber will return the outward path to spacing. After 1 second, ground will be applied to the ring of the cord to light the supervisory lamp.
9. A recall from the subscriber is the same as a disconnect followed by a new call. When the outward path returns to marking as a result of the new call, 60-cycle I. P. M. ground will be applied to the ring to flash the supervisory lamp. The 60-cycle I. P. M. ground will be removed when the sleeve is opened or grounded.
10. When the operator connects to the trunk to originate a call, a marking condition will supplant the idle or spacing condition of the inward path. Ground applied to the ring circuit will light the supervisory lamp of the cord.
11. The action of remotely controlling the directing of a call to a desired line through the agency of the operator's teletypewriter and the director circuit at the concentration unit will be referred to hereafter as "teledirection." When the distant unit is prepared to receive the call directing characters, the outward path will become marking. This will result in removal of ground from the ring to extinguish the supervisory lamp.

12. After the operator has sent the teledirecting pulses, and the desired subscriberline has been selected, or as defined in the paragraph above, the operator has teledirected, the outward path will return to the spacing condition to relight the supervisory lamp.

13. When the called subscriber answers, the outward path will again become marking to extinguish the supervisory lamp. Thereafter the circuit will be conditioned to perform the functions outlined in paragraphs 6 to 9, inclusive.

14. If the desired subscriberline is busy, out-of-order busy, or unassigned, the concentration unit will transmit distinctive teletypewriter signals to indicate which of these three conditions exists.

15. When the operator abandons the call, after receiving the busy, out-of-order busy, or unassigned signal by disconnecting from the trunk, the equivalent of a break signal will be sent to dismiss the concentration unit call directing equipment. When this equipment has been dismissed, the outward path will be returned to spacing and this will, after five seconds, cause a spacing condition to supplant the 20-cycle dot signals applied to the inward path. After 1½ additional seconds, the busy condition will be removed from the trunk.

16. If the operator disconnects the cord circuit in error during communication, the circuit will revert to the call-before-answer condition, as in paragraph 3, which may be abandoned by the subscriber, as in paragraph 4, if the operator fails to reestablish the connection.

17. When the operator disconnects from the trunk at the end of a communication, following the subscriber's disconnect, the inward path will return to the idle or spacing condition. After a delay of 1½ seconds, the busy condition will be removed.

*Description of operation—Idle condition*

In the idle condition both the inward and outward transmission paths are spacing. No relays or tubes are energized except relay 1900 which is held to spacing because of the spacing condition of the outward path. Relay 1900 will keep condenser 1901 discharged during the idle condition through a connection from ground, spacing contact of relay 1900, the lower outer armature and back contact of relay 1902, condenser 1901, resistance 1903 to ground.

*Call from the concentration unit*

Relay 1900 will follow all signals received from the outward transmission path. During the idle condition, relay 1900 keeps condenser 1901 discharged. Marking signals permit condenser 1901 to charge and also will energize the tube filament circuit. The circuit may be traced from battery to resistance 1904, conductor 1905, and thence in series through the filaments of tubes 1909, 1910, 1911, 1912 and 1913, thence over various multiple paths to conductor 1914, leading to the marking contact of relay 1900 where a connection to ground will be found on the armature of this relay. The tube 1911 will become conductive, causing the operation of relay 1915, and in turn relay 1916. The positive battery connection to conductor 1905 may be traced through the resistance 1917 to the grid of tube 1911 thus causing the tube 1911 to become conductive. When a marking signal in excess of ½ second is received as a result of a call, condenser 1901 will charge sufficiently to cause tube 1912 to draw plate current and operate relay 1918 which in turn will cause the operation of relay 1902. Relay 1902 (1) will open the spacing contact circuit of relay 1900 so that tube 1912 will remain conductive, (2) condition relay 1919 so as to follow signals from the outward path, and (3) operate relay 1920. Relay 1920, in operating, will lock and operate the off-normal relay 1921 which applies power to the repeater and operates relay 1922. Relay 1922 will light the busy lamps, energize the vacuum tube filaments independently of the marking contact of relay 1900 and apply a busy test potential to the sleeve 1924. Meanwhile the tube filaments being energized, tube 1911 functions and prior to the operation of the off-normal relay 1921 will have operated relays 1915 and 1916 so that the 20-cycle supply from the conductor 1937 will be connected to the inward path 1906 when the off-normal relay 1921 becomes operated. The off-normal relay 1921 also locks to relay 1939 and transfers condenser 1926 from ground to a high resistance charging path. The ground connection for condenser 1926 may be traced from armature 6 of off-normal relay 1921 through resistance 1927 to ground. The high resistance charging path for condenser 1926 may be traced from armature 6 of off-normal relay 1921 and its front contact through resistances 1928 and 1904 to battery. When condenser 1926 has charged for a period of ½ second, tube 1910 will operate relay 1929 which in turn will operate relay 1930. Relay 1930 will close the operating path of relay 1931 which will place ground on conductor 1932 and light the line lamp 1933. The circuit for the operation of relay 1931 may be traced from battery to winding of relay 1931, through armature 3 and its front contact of relay 1930, front contact and armature 2 of relay 1902, armature 2 and its back contact of relay 1923, back contact and armature 4 of sleeve relay 1925 to ground. The ground connection for conductor 1932 may be traced from the ground on the back contact and outer upper armature of relay 1934, through the front contact and outer upper armature of relay 1931.

If the subscriber abandons the call before the operator answers, the outward path will be returned to spacing. The removal of ground from condenser 1935 resulting from the relay 1900 moving to its spacing contact and thereby removing ground from conductor 1914 will permit this condenser 1935 to charge. After the condenser has charged for ½ second, tube 1913 will become conductive and carry the grid of tube 1912 to a potential which is negative with respect to the filament so as to make tube 1912 non-conductive. Relays 1918, 1902 and 1931 will release and thus extinguish the line lamps represented by 1933. After the release of relay 1931, condenser 1935 will be charged at a slower rate. After four seconds, tube 1909 will operate and cause relay 1936 to operate which in turn will short-circuit relay 1920. Relay 1920 will release, releasing the off-normal relay 1921 which will return the inward path to spacing and remove power from the repeater. The off-normal relay 1921 will also transfer condenser 1926 to a discharging path. After 1½ seconds, tube 1910 will release causing in turn the release of relays 1929, 1930 and 1922 and the circuit will thus be returned to normal or idle condition.

The four-second delay in the removal of 20-cycle dots by the connection of conductor 1937 to the inward path after the subscriber abandons a call, is utilized at the concentration unit to hold the connection in case the subscriber recalls before the operator answers the call.

When the operator answers a call by connecting a cord to the line jack 1938, the sleeve relay 1925 will operate. The sleeve relay 1925 will operate relay 1943 which in turn will operate relay 1923. Relay 1923 will lock to the contacts of relay 1944 which will be operated by battery from the ring circuit which is supplied through the supervisory relays in the cord circuit. Relay 1923 will open the operating path of relay 1931 to extinguish the line lamps and change the timing of tube 1909 so that it will operate relay 1936 on subsequent spacing conditions of the outward path of one-second duration.

*Transmission*

With the receiving relay of the repeater on its marking contact, thus causing the operation of the off-normal relay 1921, a biasing current will flow in the lower windings of relays 1940 and 1941. Relays 1940 and 1941 will follow all signals sent from the cord circuit. Relay 1941 will repeat the signals to the inward transmission path and relay 1940 will cause the operation of relay 1945 which in turn will apply ground to discharge condenser 1942 during all marking periods. When relay 1919 is operated to spacing by the outward path, the spacing signal will be repeated over the upper windings of relays 1941 and 1940 to the cord, and biasing current of relays 1940 and 1941 will be reversed to hold the relays to marking.

In the marking condition of the inverse neutral outward path no current will flow. Relay 1919 will be held to marking of local holding current flowing in its upper winding. In the spacing condition of the outward path the current in the lower winding will operate relay 1919 to spacing against the local holding current provided the relay 1940 is marking. If relay 1940 is spacing, however, the local holding current of relay 1919 will be increased to a value sufficient to hold relay 1919 to marking regardless of the condition on the outward path. This action provides the break feature.

*Break signals*

When a break signal is sent from the cord circuit relay 1940 will allow condenser 1942 to charge. After ⅔ second, tube 1911 will become conductive and will operate relay 1915 and in turn relay 1916. Relay 1916 will supplant the spacing condition which has been placed on the inward path at the beginning of the break by a 20-cycle ringing supply connected to conductor 1937. This will cause the terminal repeater 1503 to transmit dot signals at 20-cycle frequency to the concentration unit. When the break is ended, relay 1940 will cause tube 1911 to release relays 1915 and 1916 to return the inward path to the repeater.

A break signal from the subscriber will be converted to 20-cycle dots after ⅔ second at the concentration unit by a tube and system of relays whose action is similar to that described in the paragraph above. At the beginning of the break, relay 1900 will be operated to spacing to allow condenser 1935 to charge. After ⅓ second, tube 1913 becomes conductive and will carry the grid of tube 1912 to a potential negative with respect to the filament of the tube 1912. This will cause the release of relays 1918 and 1902. Relay 1902 will return the control of tube 1912 to the network of the spacing contact of relay 1900. When the 20-cycle dots are received, condenser 1935 will be discharged so that the tube 1909 will not become conductive. The marking intervals in the 20-cycle dot signals are not of sufficient duration to make tube 1912 conductive. At the end of the break when the outward path returns to marking, condenser 1901 will charge sufficiently to cause tube 1912 to operate relays 1918 and 1902. During the time that the 20-cycle dot signals are being received, relay 1902 will be released and since this relay, when released, forces relay 1919 to spacing regardless of the line condition, the 20-cycle dots will not be repeated to the cord circuit.

*Disconnect*

A disconnect from the subscriber will cause the outward path to return to the idle or spacing condition permanently. After ⅓ second, tube 1913 will act as hereinbefore described to release relays 1918 and 1902, and one second after the beginning of the disconnect the tube 1909 will operate relay 1936 to short-circuit and therefore release relay 1920. Relay 1920 will apply ground to the ring circuit of the cord to light the supervisory lamp. Relay 1946 will operate at this time.

The operator may dismiss the connection at this time by disconnecting the cord from the jack 1938. If this is done the sleeve relay 1925 will release releasing the off-normal relay 1921 to apply spacing to the inward path and connect condenser 1926 to its discharging path. After 1½ seconds, tube 1910 will release relays 1929, 1930 and 1922. The circuit will then be restored to the normal idle condition.

*Recall*

The disconnect portion of a recall signal will ground the ring lead of the cord as above described and the new call portion of the recall signal will operate relays 1918, 1902 and 1920 as hereinbefore described to remove the ground from the ring. The momentary grounding of the ring will light the cord supervisory lamp as long as relay 1920 is released. When relay 1920 is reoperated, however, relay 1946 will remain locked to apply 60 I. P. M. interrupted ground to the ring lead to flash the cord supervisory lamp. The operator may dismiss the flashing by the operation of a key in the position circuit which will shunt down the sleeve relay 1925 to unlock relay 1946. Relay 1923, however, will remain locked to relay 1944.

*Call from the master office*

The master office operator will originate a call by connecting a cord to the line jack 1938. The sleeve relay 1925 will operate, operating the off-normal relay 1921, to send a marking condition on the inward path to prepare the concentration unit circuits for teledirection. Ground will be present on the ring to light the cord supervisory lamp until a marking condition is placed on the outward path by the concentration unit as an indication that it is prepared for teledirection. The marking condition on the outward path will result in the operation of the relay 1920 to extinguish the cord supervisory lamp to indicate the condition to the operator who will then transmit the teledirecting characters. If the number called is busy, out-of-order busy, or unassigned, distinctive teletypewriter signals will be returned by the concentration unit to indicate the condition to the operator. If the line is idle, connection will be established to it by the concentration unit termination of the trunk. Since in this case the called line is idle, the equivalent of a disconnect condition will exist and the outward path will return to spacing to relight the cord supervisory lamp by the release of relay 1920 during the time a subscriber is being rung. When the subscriber answers, the outward path will again be changed to marking and the resultant extinguishing of the supervisory lamp will indicate the answer of the call to the operator. It is necessary to have relay 1946 released prior to the time that relay 1920 operates to indicate that the concentration unit is prepared for teledirection and prior to the time relay 1920 operates to indicate the subscriber's answer to the original call. At these times relay 1946 is held released by relay 1943. In this case relay 1943 is operated by relay 1947 as a result of the operator ringing the subscriber.

If the called line is busy, unassigned or out-of-order busy, the operator will abandon the connection by removing the cord from the trunk. Since relay 1920 will hold the off-normal relay 1921 operated after the relay 1925 is released, the removal of the cord will send a space signal to the concentration unit. The receipt of the space signal will return the concentration unit to normal and cause it to return the outward path to spacing. The same action will take place as in the abandonment of the trunk in the call-before-answer period hereinbefore described. After four seconds, tube 1909 will release relay 1936 which in turn will release relays 1920 and 1921 to return the inward path to spacing and after an additional 1½ seconds tube 1910 will release causing in turn the release of relays 1929, 1930 and 1922, thus returning the trunk to the idle condition.

Ringing

Ringing current applied to the tip circuit from the cord will cause the repeater to transmit 20-cycle dots to the concentration unit to ring the subscriber. The concentration unit may be arranged to apply machine ringing at the time a trunk circuit is connected to the called line in which case it will be unnecessary for the operator to ring and establish a connection. It will be necessary, however, for an operator to operate the ringing key once in order to operate relay 1943 so that the subscriber's answer will not cause the supervisory lamp to flash.

To start an unattended subscriber station the operator will ring continuously until the station has started. The trip indication will be given by the extinguishing of the cord supervisory lamp when the station has started.

Testing

Connections are provided to facilitate testing of the trunk circuit from the test board. Ground applied to conductor 1939 by the testing circuit will operate relay 1934. With relay 1934 operated the relay 1931 when operated because of a call from the concentration unit, will not light the line lamp or energize the night alarm but will indicate the calling condition to the testing circuit by applying battery to conductor 1939. Relay 1934 will perform the functions of relay 1922 in making the trunk appear busy at the switchboard. When relay 1922 is operated as a circuit function, battery will be applied to conductor 1948 to indicate the condition of the testing circuit.

Sequence circuit

This circuit is designed as a subscriber and trunk sequence circuit so arranged as to permit the routing of only one call in any direction through the line concentration unit at any one time. This circuit is shown in Figs. 10, 12, 14 and 16. Fig. 10 indicates the subscriber line sequence arrangements. There are indicated three groups of subscribers' lines, that controlled by relays 1000 and 1001, that controlled by relays 1002 and 1003, and that controlled by relays 1004 and 1005. Each group has a pair of relays, such as 1006 and 1007, for each line of the group. Thus, the drawings show the group relays for the first, an intermediate and the last group of subscribers' lines and the individual relays for the first, an intermediate and the last subscriber's line in the first group.

Fig. 12 is a trunk sequence arrangement for the group of trunks terminating in Fig. 9 and Fig. 14 is a sequence circuit arrangement for the group of trunks terminating in Fig. 8. In both these figures there is a set of seven relays per trunk and here again the first, an intermediate and the last trunk of the group is illustrated. Fig. 16 shows some general circuit arrangements for controlling the sequence circuit arrangements of Figs. 10, 12 and 14.

The functions of the sequence circuit as a whole may be listed as follows:

1. This circuit is arranged to permit only one subscriber at any one time the privilege of routing and establishment of a call through the line concentration unit, provided a call is not being received from the distant office over one of the trunks of Figs. 11 and 13, hereinafter referred to shortly as the distant TWX office.

2. This circuit is arranged to permit only one call at any one time from a manual TWX office to seize a director circuit and to be routed and established through the line concentration unit, provided the routing privilege has not been seized by a subscriber calling the TWX office.

3. In the case of trouble on an outward call attributed after a two-second interval by the alarm circuit in general to the subscriber line terminating circuit, the link circuit or to any part of this circuit used on an outward call, this circuit is arranged (1) to attempt to free the sequence circuit, (2) to remove and lock out of future outward service under control of the release key the particular subscriber and the particular subgroup of subscribers containing the calling subscriber, and (3) to light a lamp indicating the subgroup placed out of outward service.

4. In case of trouble on an outward call in the trunk conductors or parts of the repeaters or trunk relay equipment at the line concentration unit or the TWX office, as indicated by the alarm circuit after a two-second interval, this circuit is arranged (1) to attempt to free the sequence circuit, (2) to remove and hold the trunk out of outward service under control of a release key, (3) to flash a lamp indicating the trunk removed from outward service and (4) to send to the TWX office a characteristic out-of-order signal. If the outward path to the TWX office is not faulty, this will indicate a trunk in trouble at the manual office end. In this case, the subscriber is connected to the next idle satisfactory trunk available.

5. This circuit is arranged to allot in a predetermined order idle trunks to subscribers calling the distant manual TWX office regardless of whether the trunks are in one or more trunk groups to one or more distant central offices. When more than one trunk group exists in an office, the circuit is arranged to pick an idle trunk in the particular trunk group to which the subscriber is predeterminedly connected before proceeding to select any trunk in the other subgroup or to hunt through both subgroups of trunks before connecting to the all-trunks-busy circuit.

6. When the subscriber's line is arranged for key selection of outlets, this circuit, in conjunction with the subscriber's line circuit, is arranged to select an idle trunk in the trunk group selected by the subscriber before proceeding to select an idle trunk in the other trunk group.

7. This circuit causes the call lamp associated with the subscriber's line to light when a subscriber originates an outward call and during the time the particular call is being routed through the unit.

8. When the subscriber's line is arranged for key selection of outlets, this circuit, in conjunction with the subscriber's line circuit, is arranged to steadily light the call lamp during the routing of the outward call when the subscriber selects his first choice outlet and to flash the call lamp during the same period if the subscriber selects his second choice outlet.

9. This circuit is arranged to cause the selected trunk to repeat a calling signal to the manual TWX office when seized by the calling subscriber.

10. In case all trunks of a group are busy, this circuit is arranged to cause the all-trunks-busy circuit to measure the length of time this condition persists.

11. In case a subscriber places an outward call when all trunks of both groups are busy, this circuit is arranged to connect the subscriber to the all-trunks-busy circuit which thereupon transmits an all-trunks-busy signal to the subscriber station.

12. This circuit is arranged to advance the trunk chain of Fig. 12 or Fig. 14 to the next idle trunk immediately after each subscriber calling the TWX office has obtained a routing through the line concentration unit and before the sequence circuit is permitted to handle the next call in either direction.

13. This circuit is arranged to prevent the release of any link equipment set up for an established call during the interval the link circuit is actually being used to establish a routing through the line concentration unit in either direction.

14. This circuit is arranged to keep the trunk chain of Figs. 12 and 14 in a fixed condition during the entire period that the sequence circuit is attempting to route an outward call through the unit.

15. This circuit is arranged to permit the miscellaneous alarm circuit to function to time the duration required for routing an inward call through the line concentration unit.

16. In the case of a failure to complete the routing of an inward call where it has been determined that trouble may be in the trunk or trunk sequence circuit, the miscellaneous alarm circuit causes this circuit to function (1) to remove or hold the trunk out of service under control of a key at the same time flashing a lamp associated with the trunk circuit, (2) to attempt to free the sequence circuit and (3) to send the characteristic out-of-order signal to the distant end.

17. In case of a failure to complete the routing of an inward call when it has been determined that the trunk or trunk sequence circuit has not caused failure, the miscellaneous alarm circuit causes the sequence circuit to act as described in the paragraph just preceding except that the trunk is removed temporarily under control of a marking signal from the central office.

18. If one or more trunk calls from the TWX office are awaiting service, this circuit is arranged to start and keep the distributor motor of the director "in speed."

19. This circuit is arranged to operate on a manual basis outward to the central office if the outward central office key 1602 is operated and if an idle trunk is selected by means of its associated call key, such as key 1205.

20. This circuit is arranged to operate on a manual basis for inward calls from central office if the inward central office key 1603 is operated. A local attendant's station is connected to the trunk by means of the call key, such as 1205, and busy-test circuit to obtain information concerning the inward call after which the local attendant's station is released and the called station is connected by the same means.

21. This circuit is provided with a night alarm buzzer primarily for use during periods of manual operation to indicate the reception of inward or outward calls.

DESCRIPTION OF OPERATION

*General*

Each subscriber line terminating equipment is equipped with a pair of relays 1006 and 1007 and each subgroup of subscribers is equipped with a set of four relays 1000, 1001, 1008 and 1009. All these relays are used in routing through an outward call except the last, 1009, which is used to remove the subgroup from outward service. In general, subscribers of a subgroup seek the privilege of the use of its subgroup sequence circuit. The subscriber obtaining the privilege has permission to use the subscriber subgroup sequence circuit and, if permission by the latter circuit and the trunk sequence circuit is given, to route the call through the line concentration unit. Each trunk to the distant central office is provided with a group of relays, such as 1200, 1202, 1204, 1206, 1207, 1201 and 1203 and a contact on a relay such as 1604 of Fig. 16, which holds the trunks and line circuits in a "fixed" condition while a call is being routed through the unit. In general, the trunk circuit receives normal preference in the sequence circuit chain. When a trunk call obtains permission to be routed through the line concentration unit, the trunk circuit is connected to a director circuit which translates the pulses received from the distant TWX operator into the number of the desired line. As common office equipment, this circuit provides the equipment shown in the broken line rectangle generally designated 1606 which is the originating source of the characteristic trunk trouble signal. In addition, the equipment provided consists of a pair of relays 1607 and 1608 as a common start circuit for the group of trunks, such as that terminating in Fig. 9. Relays 1609, 1610 and 1611 are supplied for the other trunk group, such as that having trunks terminating in Fig. 8. The transfer relay 1611 is designed to change the order of the trunk chain and advance circuit in such a manner that all trunks in the selected group are tested for busy before a trunk is selected in the other group existing in the office and all trunks of both groups are made available to a calling subscriber.

*Routing of a call originated by a subscriber*

When a subscriber originates a call, the start lead from his circuit is grounded. As hereinbefore described, conductor 622 is grounded and since this conductor is traced to the winding of relay 1006 it causes this start relay to operate.

With the start relay 1006 operated, the chain ground coming from the inner lower armature and back contact of relay 1008 is disconnected from all the higher numbered start relays. That is, the circuit connected to the armatures of relay 1006 is interrupted so that this ground will not extend to the corresponding armatures of relay 1010. If relay 1008 is normal and no other start relay preceding relay 1006, such as relay 1011, is operated, then this ground will be extended to the winding of relay 1007 and this relay operates from battery, providing no other corresponding relay, such as 1013, is operated. Relay 1007 locks under control of its associated relay 1006, the circuit extending from ground, front contact and innermost upper armature of relay 1007, the front contact and lower armature of relay 1006, the upper armature and front contact of relay 1006 to the winding of relay 1007. The operation of relay 1007 removes the chain battery from all lower numbered corresponding relays, such as 1012. Thus, when relays 1006 and 1007 associated with the calling subscriber's line are operated, ground and battery chain circuits of the subgroup sequence circuit have been broken, preventing the operation of any other relay corresponding to the relay 1007 in that group. Relay 1007 operated, in addition to locking under control of its associated start relay 1006, connects battery to the start lead of the associated sub-group and causes the operation of relay 1000, providing this particular subgroup has not been removed from service by the operation of relay 1009. Relay 1007 also connects certain common leads through to the subscriber's line circuit through its upper middle and outer armatures and its lower outer armature. Here, also, if no other relay, such as 1000, 1002 or 1004 is operated or if the particular relay 1000 is in a preferential position and if no relay, such as 1001, 1003, 1005, in either this subscriber group sequence circuit or the trunk sequence circuit is in an operated position, the associated relays 1000 and 1001 will function in a manner similar to that described for the corresponding relays 1006 and 1007 of the subscriber line set. The relays, such as 1000, 1002, 1004, control a chain ground extending from the back contacts of a relay 2305 in the miscellaneous alarm circuit and extending in a chain through the lower armatures and back contacts of the various trunk relays first in Fig. 14 and then in Fig. 12, such as relays 1204, thence to the lower and upper outer armatures of relay 1004 and, in order, the corresponding points on relays 1002 and 1000. The relays, such as 1001, 1003, 1005, control a chain starting from battery on the back contact of relay 2303 in the miscellaneous alarm circuit, thence to the winding and upper armature of relay 1001, the back contact of this upper armature to the winding and upper armature of relay 1003, the back contact of this armature and thence to the winding and upper armature of relay 1005. From here the chain circuit extends through certain relay contacts, in the miscellaneous alarm circuit, Fig. 16, and thence goes on through the armatures of the relays, such as 1206, finally ending in the winding of relay 2304 in the miscellaneous alarm circuit.

When the relays 1000 and 1001 of the particular subgroup associated with the calling subscriber's line have operated, permission to route the outward call through the line concentration unit has been received. The relay 1001 operated causes the operation of relay 1008 and places battery from the chain circuit through its upper armature and front contact, thence through the lower outer armature and front contact of relay 1007 to conductor 1021 and thence to conductor 621. This battery will then be extended through armature 5 and either the back or front contact of relay 617. Let us assume that relay 617 is not energized. Therefore, the battery on conductor 621 will be extended to conductor 600, thence over conductor 1600 to the winding of relay 1607. Relay 1607 is energized in this circuit.

The operation of relay 1008 removes ground from the ground chain of the particular subscriber's subgroup sequence circuit and connects the lead 1014, known as the busy out lead, to the winding of relay 1009 for purposes which will be hereinafter described. Relay 1008 also connects leads 1015 and 1016 to leads 1017 and 1018, respectively, which in turn are connected through two armatures of relay 1007 to conductors 623 and 624, respectively. Conductor 1015 now connected through conductors 1017 and 623 completes a circuit from the front contacts of relay 2300 in a miscellaneous alarm circuit to conductor 923 and thence through the winding of holding relay 903 so that when the relay 2300 operates, as will be hereinafter described, the holding relay 903 will be operated. The conductor 1016 now connected through conductors 1018 and 624 establishes a connection from the upper armature of relay 2011 to the winding of relay 619 so that if the relay 2011 becomes operated, as will be hereinafter described, the busy back relay 614 will be operated.

Meanwhile the battery furnished by relay 1001 connected through the lower outer armature and front contact of relay 1007 to the winding of relay 1607, as hereinbefore described, causes the operation of relay 1607. This relay places ground on conductor 1615 to cause the operation of relays 1604, 1613 and 1614. These relays, in turn, place individual grounds on the trunk chain and advance circuits composed of relays 1200 and 1202, for instance, of Fig. 12 holding such circuits in a fixed condition during the entire interval that an outward call is being routed through the unit. This anti-release feature is necessary to prevent snagging of two sets of cross-bar fingers. As is fully explained in the prior art hereinbefore set forth, the operation of the cross-bar switches shown in Figs. 8 and 9 consists first in the energization of a selecting magnet such as 801 which moves a selecting finger in place so that when the magnet such as 803 is operated, the selecting finger will be instrumental in closing the contacts of the set 805. There is one finger for each of the sets 805, 802, etc., in a horizontal row and it is necessary, due to the resiliency of such fingers, that the operation be completed before another operation takes place. Hence the "hold chain" circuit is provided through the contacts of such relays as 1604, 1613 and 1614.

In addition, where relay 1609 is associated with a second trunk group in the concentration unit the operation of this relay will cause the operation of an associated transfer relay 1611. The transfer relay is designed to alter the chain circuit to permit the selection of trunks first in the second trunk group and to seek selection of trunks in the first group only if all trunks in the second group are busy. Therefore, not only is the trunk chain circuit placed in a fixed condition by the operation of relay 1604, but if the order of selection was to have been changed relay 1611 had accomplished this function before the start lead to the trunk chain and advance circuits was called into use.

The operation of relay 1604 permits the operation of relay 1608 through a circuit extending from ground, the front contact and inner right-hand armature of relay 1604, right-hand armature and front contact of relay 1607, winding of relay 1608 to battery. Relay 1608 extends this ground through its front contact and inner left-hand armature to conductor 1616 which may be traced through Figs. 14 and 12 to the inner lower armature of relay 1202. Assuming this relay to be non-operated, denoting that the trunk of Fig. 11 is idle, then this ground would be extended over conductor 1102 to the winding of start relay 1103. If the particular trunk shown in Fig. 11 were busy, then both relays 1200 and 1202 would be operated and the ground on the lower armature of relay 1202 would now be extended over the lower armature and front contact of relay 1200 to the inner lower armature of relay 1208 of the next trunk corresponding to relay 1202. If all trunks in this group were busy then such ground would be extended to conductor 1209 and from there through the right-hand armature and back contact of relay 1611 to conductor 1617 which leads to the inner lower armature of relay 1402 of the first trunk in the other group. It should be noted further that if all trunks in this group are busy then the ground is extended to conductor 1400 and from there through the left-hand armature and back contact of relay 1611 to conductor 1620 leading to the all-trunks-busy circuit.

The operation of relay 1608 places battery on conductor 1618 which may be traced to the winding of start relay 2306 and since this relay has the other side of its winding grounded, it will become operated. Relay 2306 through its upper inner armature and front contact places a ground on common start relay 2305 and causes its operation. Relay 1608 through its outer left-hand armature and front contact places ground on the inner left-hand armature of relay 1604 to provide a locking circuit for this relay to be sure to keep the trunk chain and advance circuits in fixed condition until the routing of the call has been completed. The common start relay 2305 removes the main chain ground from both the trunk sequence and subscriber's sequence circuits.

*Establishing connections of a subscriber originated call*

The operation of relay 1608, as described, places ground on the start lead of the trunk at such a place in this trunk chain as to permit selection of the first idle trunk in the trunk group desired. This ground will be connected by means of the back contact of the first relay such as 1202 to the associated idle trunk circuit, causing this circuit to function. A signal will be sent to the TWX office and an automatic signal will be returned from the TWX office to make a preliminary test for conductor failure. Thereafter the trunk circuit will function in conjunction with the link circuit and miscellaneous alarm circuit. When selecting magnet 900 has been energized as hereinbefore described, ground will be placed on conductor 902 which will be extended to conductor 2302 and thence to the winding of relay 2300. Relay 2300 through its inner lower armature and front contact and in parallel therewith through its middle upper armature and front contact places a ground on the winding of relay 2307, thence through normal contacts of relay 2310 and in parallel therewith through resistance 2311 to the hold lead 2312. This lead may be traced to conductor 1015, thence to conductor 1017, through conductor 623, conductor 923 to the winding of relay 903, causing this latter relay to operate. This relay in turn causes the operation of holding magnet 800. Upon the operation of magnet 800 the subscriber's line terminating circuit of Fig. 6 will be disconnected. This opens the start lead 622 which results in the release of relays 1006 and 1007 and this in turn results in the release of relays 1000 and 1001. The release of relay 1007 causes the release of relay 1607 and the release of relay 1008. The release of relay 1008 disconnects the holding and busy-back leads from the common circuits, while the release of relay 1607 causes the release of the associated transfer relay 1611, if used, returning the trunk chain to its originally predetermined order, at the same time closing the chain circuit on its back contact to place ground on the advance lead 1619 to all of the trunk circuits. In only one of these trunk circuits is this ground effective and that is the trunk circuit which has just been selected by the calling subscriber. Ground on this lead in this trunk circuit causes the operation of relay 1202 and in turn the operation of relay 1200. This circuit may be traced from ground, the left-hand armature and back contact of relay 1607, the left-hand armature and back contact and in parallel therewith the inner right-hand armature and back contact of relay 1609, conductor 1619, conductor 1131, the front contact and armature 8 of the start relay 1103, conductor 1132, the winding of relay 1202 to battery and ground. Relay 1202 is operated in this circuit and through the additional contact of the upper armature of relay 1202 extends the ground for operating relay 1202 to the winding of relay 1200. Relay 1200 now extends the chain circuit from the inner lower armature of relay 1202 through the lower armature of relay 1200 to the inner lower armature of the next relay 1208. Relays 1200 and 1202 are thereafter held energized over conductor 1123 by ground on the lower outer armature of relay 1115. As hereinbefore described, these relays are held temporarily by such relays as 1604 to prevent the release of such advance chain relays during another operation. The operation of relay 1200 through the movement of its inner upper armature removes ground from conductor 1105 which was used as a locking ground for the start relay 1103. Relay 1200 also closes a ground to conductor 1210 which starts the establishment of a circuit which will be completed when all of the relays in a group corresponding to relay 1200 are energized. If this chain is completely closed, ground is connected to the all-trunks-busy circuit, causing the latter circuit to time the interval that such condition persists.

The operation of relay 1202 removes the holding ground from relay 1608 supplied over conductor 1616 in the sequence circuit, causing this relay to release. Relay 1608, releasing, allows relays such as 1604 to return to normal. The release of relay 1604 and its companion relays removes the individual holding grounds to the relays such as 1202 of all trunk circuits, thus permitting any relay such as 1202 that was in a position to do so to release, removing the "fixed" condition of the trunk chain circuit which had been in force throughout the entire routing of the call. The release of relay 1607 also causes the release of the common start relay 2305 of the miscellaneous alarm circuit which in turn replaces ground on the entire office chain. The trunk sequence and subscriber sequence circuits have thus been returned to normal and to a condition that will permit the routing of another call in either direction. Upon the completion of the thus established call, the locking ground that holds the relays 1200 and 1202 operated will be removed, permitting their release provided an auxiliary path is not being temporarily furnished by relay 1604. Upon the removal of any such temporary holding path, relays 1200 and 1202 release, returning the entire circuit to normal.

In case the relays 1200 and 1202 of all the trunks in the office are operated, ground connected to conductor 1616 by relays 1604, 1607 and 1608 is connected by means of the trunk chain circuit to the all-trunks-busy lead 1620. This conductor extends to the all-trunks-busy circuit and causes such circuit to function to produce a special telegraph character and to arrange to connect to the line circuit of the particular subscriber calling, transmitting this character to the teletypewriter at his station. The line circuit meanwhile operates to disconnect ground from the start lead leading to relay 1006, causing the release of the subgroup sequence circuit, the group sequence circuit and all other relays that were operated as a result of this call. The all-trunks-busy circuit meanwhile continues to produce and continues to be connected to the subscriber's line circuit until the subscriber releases.

*Routing of a call originated at a distant TWX office*

When a trunk is seized at the distant TWX office, the associated trunk in the line concentration unit functions as hereinbefore described (a) to place a ground on the start lead 1152, causing the operation of relay 1204, and (b) to place a ground on conductor 1132, causing the operation of relays 1202 and 1200 in the manner described. The trunk chain circuit is, therefore, immediately advanced and if this causes the completion of the chain circuit leading from the upper outer armature of relay 1200, ground is sent to the all-trunks-busy circuit which operates relay 2001 and causes it to time the interval that this "all-trunks-busy" condition persists. The operation of the relay 1204 places a ground on the lead 1219 connected to the front contact of the middle upper armature of relay 1204 leading to the director circuit which is used to keep in speed the distributor motor associated with the director distributor circuit, lights the call lamp 1213 associated with the selected trunk through its outer upper armature, and if no other corresponding relay of the sequence circuit is operated or if the particular relay 1204 associated with this trunk circuit is in preferential position, ground on the lower armature of relay 1204 coming from the back contact of the common start relay 2305 in the miscellaneous alarm circuit will permit the operation of relay 1206, provided also that no other relay corresponding to relay 1206 is in an operated position. If these conditions are not met, the particular relay 1206 will be delayed in operating until it has received a preference accorded it by the sequence circuit. When relay 1206 is operated it locks under control of its associated relay 1204 through a circuit extending from ground, the inner upper armature and front contact of relay 1204, the inner upper armature and front contact of relay 1206, the winding of relay 1206 to battery at the back contact of relay 2303 in the miscellaneous alarm circuit. Relay 1206 causes the operation of relay 1207 by extending a battery connection through its lower armature and front contact to the winding of relay 1207. Relay 1206, in operating, extends the battery also through its upper outer armature and front contact to conductor 1211 which extends to the winding of relay 2306 in the miscellaneous alarm circuit. This relay becomes energized and through its inner upper armature and front contact causes the operation of the common start relay 2305. The operation of relay 1207 places ground on conductor 1212 which extends through the contacts of director transfer relay 1701 to the winding of relay 1800 in the director circuit, as a start signal for the director. Relay 1207 also (1) extends a connection from the windings of relays 1100 and 1101, conductor 1136, to conductor 1214 leading through the contacts of director transfer relay 1701 to the left-hand winding of relay 1801, (2) extends a connection from the armature of relay 1302, conductor 1118 to conductor 1215 leading through the contacts of director transfer relay 1702 to the lower winding of relay 1802, (3) grounds conductor 1216, causing the energization of relay 1120 and in turn selecting magnet 900 of the cross-bar switch, (4) connects relay 1201 to conductor 1217, leading to the miscellaneous alarm circuit, and (5) connects relay 1203 to conductor 1218, also leading to the miscellaneous alarm circuit. The operation of the common start relay 2305 following the operation of relay 2306 by the application of battery to conductor 1211 removes ground from the ground chain passing through the lower armatures of all relays corresponding to relay 1204 in the entire office sequence circuit chain.

*Establishing connections for a call originated at the distant TWX office*

After the conductor 1212 leading to relay 1800 in the director circuit has been grounded by the operation of relay 1207 the associated director circuit functions, sends a "director ready" signal to the distant TWX office which is followed by the reception from the operator of the desired called subscriber's number. The director circuit proceeds to translate this number and designate the particular desired line, causing the link circuit to function and to connect the subscriber line terminating circuit of the called subscriber to the trunk selected at the distant office. Immediately after the last digit is received by the director circuit, conductor 1803 in the director circuit, connecting with conductor 1615, is grounded, causing the operation of relays 1604, 1613 and 1614 which, as described previously, fixes the conditions preventing the release of the link circuit used in an established call. The fixation of the trunk chain circuit has no useful function at this time. After the link circuit has functioned, the trunk circuit removes battery from relay 1204, causing the release of this relay, relay 1206 and relay 1207, and extinguishing the call lamp 1213. The release of relay 1204 removes ground from conductor 1219, heretofore described as extending to the director circuit and used for the purpose of keeping the motor in speed, whereby the director circuit is returned to its non-operating condition providing no other relay corresponding to 1204 is placing a ground on this conductor. The release of relay 1207 (a) removes ground from conductor 1212 to the director circuit, permitting the director circuit to return to normal, (b) opens the two transmission conductors 1214 and 1215, disconnecting the trunk circuit from the director circuit, and (c) removes relays 1201 and 1203 from the leads 1217 and 1218. The release of relay 1206 removes battery from conductor 1211, leading to the miscellaneous alarm circuit. The common start relay 2305 of the alarm circuit does not release until the director circuit has returned to normal but upon its release, reconnects ground to the chain ground circuit connected, as before described, to the inner lower armature of relay 1202 thus enabling the sequence circuit to handle a new call. The director in returning to normal removes ground from the lead 1803, permitting the release of relays 1604, 1613 and 1614, which in turn permits any other link equipment on an established call in a position to release to return to normal. Upon the completion of a call the trunk circuit functions to permit the release of relays 1209 and 1202 which, if relays such as 1604 are not operated, release and return to normal. If the chain is held in a fixed condition by the operated relay 1604 the particular relay pair 1200 and 1202 will remain operated until the fixed condition is removed and then return this circuit to normal.

*Removal of equipment because of trouble detected in routing a call through the office*

As described hereinbefore during the routing of a call established by the subscriber or one established by the distant TWX, a relay is operated in the miscellaneous alarm circuit. The interval used in routing the call is timed to see that it does not exceed a certain specified limit and thus prevent the permanent disabling of the trunk and the subscriber's group circuit. In case of an outward call, the miscellaneous alarm circuit times out in two seconds and a ground is placed on conductor 1014 if the indication is that the trunk is not in trouble. Since relay 1008 associated with the particular subscriber subgroup containing the calling subscriber line is operated, ground on conductor 1014 will cause the operation of relay 1009 which, in turn, will lock under control of its associated key 1019. The operation of relay 1099 will cause the release of the associated relays 1000 and 1008 and light lamp 1020, indicating which particular subscriber's subgroup is in trouble. The operation of relay 1009 prevents any subscriber of that particular subgroup from entering the subscriber's subgroup sequence circuit, thus removing that particular subgroup of subscribers from outward service. The release of relay 1000 permits the release of the associated relay 1001. Relay 1001 released causes the relay 1607 or 1609, as the case may be, to release so that ground is removed from the trunk advance chain and the companion relay 1610 or 1608, as the case may be, is released. If the trunk has not been connected to the calling line, the "advance" is not locked up. The release of relay 1608 causes the release of relays 1604, 1613 and 1614, as described before. The common start relay 2305 of the miscellaneous alarm circuit is meanwhile held operated for approximately one second longer to permit all this action to take place and, upon release, connects ground to the entire office ground chain. This reconnection of ground permits all of the outward calls, except those originated by the subscriber in the group out of service, to be routed through the unit. An appropriate alarm is sounded by the miscellaneous alarm circuit and, together with the lamp indicating the subgroup in trouble, gives an indication to the attendant of the existing type of trouble. The subgroup subscribers remain out of service until the attendant has remedied the trouble and then operated the release key 1019 associated with the illuminated lamp 1020. The operation of this key causes the release of relay 1009 returning the busying-out feature to normal, extinguishing the trouble indicating lamp and permitting the particular subscriber subgroup access to the subscriber sequence circuit and, in turn, to calling service.

If the miscellaneous alarm circuit times out in two seconds on an outward call and the indications are that the trunk conductors or some part of the trunk relay equipment is at fault, ground is not placed on lead 1014 or 1217 but connected rather to conductor 1134 leading in multiple to all the trunk circuits. The particular trunk circuit preselected at the time by the outward call is the only trunk circuit that is in position to utilize this ground. This trunk circuit, therefore, transmits the same ground through the front contact and armature 2 of relay 1103, conductor 1135, front contact and lower outer armature of relay 1207, to conductor 1218 and at the same time causes the operation of relay 1203. Relay 1203 operated locks under control of the associated trunk release key 1221, causing, in turn, the operation of relay 1201. Relay 1201, in operating, (1) places ground on the chain lead 1132, causing the operation of relay 1202 and, in turn, relay 1200, (2) connects conductor 1136 to conductor 1222, (3) connects battery to conductor 1223 which extends to the circuit in rectangle 1606 and causes it to function, (4) removes battery from conductor 1111 and 1133 where it is instrumental in bringing the trunk to normal and (5) locks under control of any mark signal from the distant manual office. The operation of relay 1203 also causes the associated lamp 1220 to flash under control of interrupter 1603 as an indication that the trunk is in trouble. The operation of the chain advance relays 1200 and 1202 removes the possibility of using the particular trunk on a particular outward call but permits this outward call to be connected to the next idle trunk. Under this condition, therefore, the subscriber will receive service even though the connection to the distant manual operator is delayed shortly.

The operation of relay 1622 on first closure of the 60 I. P. M. interrupter 1623 connects ground to conductor 1222 through the left-hand armature and back contact of relay 1621 and at the same time causes the operation of relay 1624. On the first following open period of interrupter 1623, relay 1622 releases and relay 1625 then operates. Relays 1624 and 1625 operated permit relay 1626 to operate. On the second closure of the interrupter 1623, relay 1622 again operates, connecting ground to conductor 1222 of the trunk, but this time it causes the release of relay 1624. Relay 1624, in releasing, permits relay 1627 to operate. On the second open period relay 1622 again releases, removing ground from lead 1222 and permitting relay 1625 to release. On the third closure of interrupter 1623, relay 1622 again operates, connecting ground to lead 1222 and causing relay 1624 to operate. Relay 1627 being operated, the operation of relay 1624 causes relay 1621 to operate which, in turn, removes ground from conductor 1222. On the third open period of the interrupter 1623, relay 1625 operates and, together with relay 1624, causes the release of relay 1626. On the fourth closure of the interrupter 1623, relay 1624 again operates but relay 1621 being locked to relay 1625 prevents connection of ground to lead 1222. Relay 1624, however, is released, causing the release of relay 1627. On the fourth open period, relays 1622, 1625 and 1621 release, and on the fifth closure of the interrupter 1623, the four-second cycle starts all over again.

Ground on the lead 1222 to the trunk circuit causes the latter circuit to send a mark signal to the central office end. The apparatus generally denoted 1606, therefore, causes the production of the following signal: one-half second mark; one-half second space; one-half second mark; one-half second space; approximately fifty mil second mark at the beginning of the next half second followed by space approximately 1,950 seconds. This characteristic signal is sent to the distant office as a trunk trouble indicator. If the operator has not answered the calling-in signal, the characteristic signal will cause a lamp to flash in a peculiar way. If the operator had, however, already answered the call lamp, this characteristic signal will appear on her teletypewriter. If the path to the distant manual office is in trouble, obviously no signal can be sent to it and trouble of such a nature will become apparent when the distant operator selects the trunk to originate an inward call. The miscellaneous alarm has, therefore, effectively removed the trunk from service and has given a trouble indication to the operator at the distant manual office. When the trouble is cleared by the attendant, the trunk may be put back into service by momentarily operating the key, such as 1225, associated with the flashing lamp 1220. This causes the release of relay 1203 which removes ground from the secondary winding of relay 1201 and at the same time changes the flashing lamp to a steady lamp. Relay 1201 will, however, remain operated under control of a mark signal that might be received from the distant manual office. After connection of this mark signal, relay 1201 releases and thereby causes (a) the release of the trunk advance relays 1200 and 1202 so as to readmit the trunk to the trunk advance chain making it available to the subscriber originating outward calls and (b) the removal of the characteristic trouble signal from the trunk which removes the trouble indication at the distant central office, thus returning the circuit to normal.

On an inward call, the miscellaneous alarm circuit permits three separate timing intervals, two seconds being allowed to place the director circuit in an off-normal condition, a total of four seconds being allowed for the director circuit to prove itself in a position to receive the telegraph characters typed by the distant manual operator and ten seconds in which to completely fulfill its functions. When the miscellaneous alarm circuit times out at the conclusion of the two-four-ten second interval, it places ground on the conductors 1217 and 1218, if it has been determined that the trouble causing the failure of the inward call to be routed through the office might possibly exist in the trunk sequence or trunk circuits, but grounds only conductor 1217 if it has been determined that a trouble does not exist in either of these two circuits. If both conductors 1217 and 1218 are grounded, relays 1201 and 1203 operate and become locked under control of both the release key 1225 and any mark signal that may be received from the distant manual office causing the associated trunk lamp 1220 to flash and connecting the output circuit 1606 to lead 1222 and placing a ground on the trunk advance relays 1200 and 1202, causing the operation of both. In addition, the operation of relay 1201 removes battery from conductor 1111 to the two-way trunk circuit, returning the trunk to normal and causing the release of relays 1204 and 1207. The release of relay 1204 removes ground from conductor 1219 to the director circuit and causes the release of relay 1206 which, in turn, releases relay 1207. The release of relay 1207 opens the operating winding of relays 1201 and 1203, disconnects the trunk circuit from the director circuit, removes the starting ground from the conductor 1212 to the director circuit and removes ground from conductor 1216 to the trunk circuit. The release of relay 1206 removes battery from conductor 1211 leading to the start relay 2306 of the miscellaneous alarm circuit, permitting that relay to release, if it is not held operated from some other source, and reconnects ground to the main chain ground of the sequence circuit, thus permitting the sequence circuit to handle a new call in either direction. The operation of the chain advance relays 1200 and 1202 removes the trunk circuit from the trunk chain as far as an outward call is concerned. The apparatus, generally designated 1606, operates as hereinbefore described and the characteristic trouble signal is connected to conductor 1222 and thence to conductor 1136 of the trunk taken out of service and, if the path to the distant central office is complete, this signal appears at the distant manual operator's position as a trouble indication. In this case, after the trouble has been remedied, the attendant restores the trunk to service by momentarily operating the key 1225 associated with the flashing lamp 1220 and, as indicated heretofore, relay 1201 will still remain operated until any mark signal that might be received at the distant manual end is terminated. At the conclusion of any such mark, the trunk circuit is restored to service. If, however, it has been determined that neither the trunk sequence circuit nor the trunk circuit is in any way responsible for the routing of the inward call, then conductor 1217 alone is grounded, causing the operation of relay 1201 which, as described before, takes the trunk out of service temporarily as long as a mark signal is received from the distant manual end. At the conclusion of such a mark signal, the trunk is restored to service.

*Emergency manual service for outward calls*

In case of an emergency, such as the failure of the sequence circuit, in which the automatic features of the unit are in trouble, the outward calls are routed to the central office by the following semiautomatic method of operation. A call lamp, such as 616, associated with the subscriber line will, of course, indicate a calling subscriber. Failure of the sequence circuit would call for the operation of the inward key 1603 and outward key 1602, the former making the trunk sequence portion of the sequence so ineffective that a director can not be attached to a trunk, while the latter prevents the subscriber portion of the sequence circuit from completing its task of automatically selecting an idle, satisfactory trunk and connecting the subscriber to it. The operation of either or both of these keys or, incidentally, the insertion of a double plug into the jacks 1628 and 1629 of the busy test circuit causes the red manual service lamp 1630 to flash. The operation of either of these keys safeguards the battery and ground chain of the sequence circuit, making it possible for manual operation to proceed in one direction while calls are handled automatically in the other direction.

The attendant renders service on an outward call by depressing a call key, such as 1205, associated with an idle trunk which does not have a call lamp, such as 1213, a trunk lamp, such as 1220, or a busy lamp, such as 1106, illuminated. If the line is arranged for key selection, the attendant tries to select an idle trunk to the outlet desired by the subscriber. This action places ground obtained from the back contact and armature 1 of relay 1145 and extended over conductor 1146 to the upper contacts of key 1205 to conductor 1102 in the trunk circuit, causing the trunk to send out a calling-in signal and receive back ringing, which positions a selector magnet, such as magnet 900, of the link circuit and, in turn, results in the illumination of lamp 2315 in the miscellaneous alarm circuit. If lamp 2315 does not light, it is possible that the idle trunk was in trouble and another trunk should be selected. Should the second trunk fail to light the lamp 2315, the attendant proceeds to handle the call on a full manual basis unless he discovers the trouble in the lamp itself. At the illumination of lamp 2315, the attendant patches between jacks 1628 and 1629 of the busy test circuit and jacks 611 and 610 of the calling line. This causes the hold magnet of the link to function and connect the subscriber to the selected trunk, lighting the busy lamp 1106. The attendant then releases the call key 1205 and pulls out the patch at the line circuit jacks 611 and 610. The call does not require any further attention. In case the busy lamp 1106 fails to light, the trouble may be in the link circuit and the attendant proceeds as indicated hereinafter. The double plug patching cord is patched between the jacks 1119 and 1154 of the idle trunk and the jacks 611 and 610 of the calling line. This last resort will, of course, require a manual disconnect of the patching cord at the completion of the call.

*Emergency manual service for inward calls*

The inward calls can be handled manually if the inward key 1603 is operated. If outward calls are also to be handled manually, the outward key 1602 is also operated. The inward call appears as a lighted call lamp 1213 associated with the trunk. The attendant patches a double plug patching cord into the busy test circuit jacks 1628 and 1629, next operates the attendant's answering and teletypewriter keys of the test set (not shown), then holds the calling key 1205 associated with the lighted lamp depressed while he observes that the lamp 2315 of the miscellaneous alarm circuit lights, and then plugs the other end of the patching cord into the jacks of that line circuit which is used for the attendant's set. The operation of the key 1205 causes the selector magnets of the link to be positioned, the double plug in the busy test circuit secures the sequence preference and plugging into the jacks, such as 611 and 610, of the attendant's line causes the hold magnet to operate and to associate the attendant's line with the calling trunk. The call key 1205 is released as soon as the busy lamp 1106 is lighted and then the plug is removed from the line jacks 611 and 610.

If outward calls are being handled on an automatic basis, the plug is also removed from the busy test circuit to permit outward calls to be routed through, otherwise it may remain in the busy test jacks 1628 and 1629. The operator under this condition receives a permanent mark signal, the first portion of which is used as a "director ready" signal. Her typing, however, appears on the attendant's teletypewriter. The attendant again plugs into the busy test circuit jacks to capture the busy test sequence if he has removed the plug, then makes a busy test of the called subscriber's line by patching into the jacks 611 and 610 of the called line. If the line is busy, the red lamp 1631 of the busy test circuit lights. The attendant then manually sends "K" signals on the attendant's teletypewriter. If the line is idle, the attendant momentarily operates an attendant's line release key associated with the hold magnet of his line. This releases the attendant's line from the trunk, extinguishing the green busy lamp 1106. The attendant waits for the trunk call lamp 1213 to light again and then connects the called line to the trunk by means of the call key 1205 and a patching cord between the busy test circuit jacks 1628 and 1629 and the line circuit jacks 611 and 610 of the called line just as he connected the attendant's line to the trunk. The busy lamp 1106 of the trunk again lights when the called subscriber's line is attached to the trunk. Should the link circuit fail to attach either the attendant's line or the called line to the trunk, manual patching must be resorted to and, of course, a manual disconnect of the patching must take place at the conclusion of the call.

*Night alarm circuit*

During manual or semiautomatic operation, the night alarm cut-off key 1632 is released if it is desired to receive an audible, as well as a visual, indication of the reception of inward and outward calls. The ground placed on any subscriber's or trunk call lamp 616 or 1213 also causes the operation of relay 1612 which, in turn, causes the operation of relay 1633, causing the buzzer 1634 to sound as an audible indication of a call requiring attention and giving a night alarm lamp signal through the illumination of lamp 1635.

*Director circuit*

The circuit shown in Figs. 17, 18, 21 and 22 is designed to receive the telegraph pulses sent by the distant operator's teletypewriter and to decipher these pulses, thereby causing the selection of the called subscriber's line. The functions of this circuit may be summarized as follows:

(1) Upon the receipt of an inward call from the manual central office, the sequence circuit will connect the director circuit to the trunk circuit on which the call is waiting. The distributor motor is then started and after it has attained proper speed a "director ready" signal will be transmitted to the distant end to indicate to the manual operator that the call may be routed through the line concentration unit.

(2) The distributor motor will be stopped after the director has been dismissed unless there is another incoming call awaiting completion. In the latter case, the motor will be kept running but the other parts of the circuit will be restored to normal awaiting a new call.

(3) The start magnet is held operated while the distributor motor is coming up to speed, to reduce clutch drag.

(4) A "figures" teletypewriter character received from the distant manual office will indicate that the operator has recognized the "director ready" signal and will cause the director to accept the next two characters transmitted from the distant end as the called subscriber's number.

(5) The next two teletypewriter characters received from the distant office are separated into dot elements by the receiving distributor, causing the proper selection relays to be operated.

(6) Upon receipt of the first digit of the call directing teletypewriter pulses, the director circuit will select the group of ten lines which contain the desired subscriber's line.

(7) Upon receipt of the second digit of the call directing pulses, the director circuit will select and test the desired subscriber's line and disregard any additional characters sent to the director.

(8) If the called subscriber's line has been made out of order, a series of "Q" teletypewriter signals will be transmitted as an indication of this condition to the distant manual operator.

(9) If the called subscriber's line is busy because of a previously established call or because of busy condition placed on it by the test circuit, a series of "K" signals will be transmitted to the distant manual operator.

(10) If the manual operator has transmitted first and second digits for which no subscriber line is assigned, or has transmitted an impossible combination of digits, a series of "I" signals will be returned to the manual operator.

(11) If the subscriber line is idle, the director circuit will cause the link circuit to connect the called subscriber line to the trunk circuit. The director will then be released and restored to the idle condition in preparation for the routing of the next inward call.

(12) The miscellaneous alarm circuit is arranged to allow two seconds for the director to become off-normal, four seconds to complete a self-imposed preliminary test and give satisfactory evidence to the alarm circuit, and a total of ten seconds for the director to complete its task in any event.

(13) If the director is not off-normal in two seconds, the miscellaneous alarm circuit removes the calling trunk from service but puts the director back into service.

(14) If the director becomes off-normal but the distributor motor fails to get up to speed in four seconds, the director is removed from service and the trunk is taken out temporarily. A signal lamp of the distributor circuit lights and a minor alarm is sounded.

(15) If the "director ready" signal fails to reach the associated loop repeater or a mark signal from the trunk circuit is not registered in the director circuit, both director and trunk circuits are removed from service. In this case a minor alarm is sounded and appropriate telltale lamps are lighted.

(16) In a line concentration unit containing two director circuits, in the case of the condition described in the two previous paragraphs, the miscellaneous alarm circuit, after freeing the distributor circuit in trouble from the sequence circuit, causes the transfer portion of the director circuit to function, removing the director circuit placed in the stuck condition from service and replacing it by a spare available director circuit.

*Origination of "director ready" signal*

When an operator seizes the trunk to the line concentration unit at the distant manual board, the associated trunk at the line concentration unit functions to cause the sequence circuit to attempt connection to the director circuit in use. When the two-way trunk at the line concentration unit receives permission to route the call through the office, the sequence circuit connects this director circuit to the particular trunk. The inward transmission path from the two-way trunk circuit is in a marking condition and is connected to the lead to the lower winding of relay 1802. The sequence circuit also upon seizing a director circuit places ground on the lead connected to the winding of relay 1800. The operation of relay 1800 (1) operates relay 1804, (2) extends a ground from the right-hand outer armature of relay 1805 through the outer left-hand armature of relay 1800 to cause the operation of relay 1806, (3) applies ground through its right-hand armature (a) through the back contacts of relays 1807 and 1827 over conductor 1808 and conductor 2208 to the receiving contacts 2200 and causes the operation of start magnet 2201 which permits rapid acceleration of the motor by eliminating clutch drag, (b) extends ground to the upper winding of the receiving relay 1802 which biases this relay to spacing, (c) extends ground over conductor 1809 to the stop pulse contact of the distributor 2202, (d) extends ground to the left-hand winding of relay 1810, causing this relay to operate providing the receiving relay 1802 is on its right-hand contact due to a marking signal being received from the loop repeater over the lead connected to the lower winding of relay 1802, (e) extends ground over conductor 1809 to the potentiometer formed by resistances 2203 and 2204, which potentiometer is later used in operating the polar relays 2205, 2206, 2207, 2209 and 2210, (f) extends ground to the upper winding of relay 2211 which biases this relay to spacing (as shown), and (g) extends ground to the inner left-hand armature of relay 1805 which is later used to start the "director ready" signal.

Relay 1804 places battery on conductor 1811 and starts the distributor motor 2212, the return circuit being through current limiting resistance 2213 and the governor contacts which are closed while the motor is coming up to speed. Relay 1804 locks to ground on the conductor leading from the relays, such as 1204 and designated in Fig. 12 as conductor 1219. Therefore, the motor is kept running under control of the sequence circuit as long as an incoming call is awaiting completion. Relay 1804 also supplies ground to the armatures of the polar relays 2205 to 2210 over its outer right armature and front contact and this ground connection permits these relays to lock in either direction until they may be operated. While the motor is attaining speed, the distributor cams are successively operating, causing brief closures of each receiving contact in turn. The polar relays will, therefore, operate and lock in the spacing direction due to these closures to ground.

The spacing locking paths of the polar relays 2205, 2206, 2209 and 2210 are through such resistances as 2214 and the winding of relay 2215. Polar relay 2207 has a spacing locking path independent of the winding of relay 2215 for a purpose which will be hereinafter described. Therefore, relay 2215 will operate as soon as any one of relays 2205, 2206, 2209 or 2210 operates to spacing. The operation of relay 2215 opens the operating path of relay 1812 to prevent its premature operation.

Meanwhile, relay 1806, in operating, has in effect placed a sensitive relay 1813 across the governor contacts and has prepared in advance a path for operating the fast-operating relay 1807. The operation of relay 1806 has also resulted in the operation of relay 1814 in a circuit from the outer left-hand armature of relay 1806. Relay 1814, in operating, prepares a path for sending the director ready signal out over lead 1815, operates relay 1816 and prepares a path for lighting lamp 1817 in case the director is timed out in this condition. Relay 1816, in operating, grounds leads 1818 and 1819 leading to the miscellaneous alarm circuit as an indication that the director has been moved off normal. Lead 1818 furnishes the miscellaneous alarm circuit with information about the apparent condition of the associated trunk circuit. Relay 1816 also prepares to lock to ground at the contacts of relay 1805, prepares a path toward lamps 1820, 1821 and 1822 and provides a locking circuit for relay 1810.

Relay 1810, being operated at this time, prepares to ground leads 1855 and 1856 as soon as the director ready signal has operated relay 1801. Relay 1810 also prepares to light lamp 1822, in case of trouble, to indicate that the incoming marking signal has been registered.

While the motor 2212 is accelerating, relays 1800, 1804, 1806, 1814 and 1816 are operated. When full speed is reached, the governor contacts open momentarily, removing the short circuit from resistance 2216 and allowing relay 1813 to operate through resistances 1825 and 2217. Relay 1813 is slow-releasing and, with the help of condenser 1826, holds over during momentary governor contact closures operating relay 1807 as soon as the stop pulse contacts 2202 close.

Relay 1807, in operating, removes ground from the receiving contacts and start magnet 2201, latching the clutch and preventing further operation of the contacts. Relay 1807 locks through the winding of and operates relay 1805 which, in operating, applies ground to start the director ready signal out over lead 1815 to the loop repeater. The director ready signal consists of the connection from ground, right-hand armature and front contact of relay 1800, inner left-hand armature and front contact of relay 1805, left-hand winding of relay 1801, front contact and outer left-hand armature of relay 1814, to conductor 1815. This operates relay 1801 through its left-hand winding, provided the lead 1815 is not in trouble. Relay 1805, in operating, also (1) transfers the armature of relay 1802 from the left-hand winding of relay 1810 to a circuit extending through the back contact and right-hand armature of relay 1827 to conductor 1808 leading to the start magnet 2201 and the contact 2200 preparatory to receiving pulses from the loop repeater, (2) releases relay 1806 and (3) provides off-normal ground on conductor 1828 to a large part of the director circuit, including locking ground for relay 1816 and ground on the armature of relay 2211 through the back contact and right-hand armature of relay 1829. Relay 1801, in operating, (1) closes a path to light lamp 1821 instead of lamp 1820, in case of trouble, to indicate that the director ready signal has been sent, (2) locks to ground on conductor 1828 and (3) connects ground to conductors 1855 and 1856 to the miscellaneous alarm circuit to indicate that, in case of trouble, the director should not be taken out of service. Relay 1806, in releasing, disconnects relay 1813 from the governor contacts, releases relay 1814 and transfers the stop pulse contacts 2202 from relay 1807 to the operating winding of relay 2211 preparatory to receiving pulses from the loop repeater. Relay 1814, in releasing, (1) continues the director ready signal over an alternate path through the back contact of its outer left-hand armature and prepares a path to contacts of relays 1830 and 1831 for sending signals to indicate busy, out-of-order or unassigned lines, (2) opens the operating path of relay 1816 which nevertheless remains locked through its left-hand winding and (3) transfers ground from the path to light lamp 1817 to a path to light lamps 1821 and 1822. After the director ready signal is sent, the following relays are held operated: 1800, 1804, 1810, 1816, 1807, 1805, 1801, 1802, (on its marking contact) 2215, and the polar relays 2211, 2205, 2206, 2207, 2209 and 2210 (all on their spacing contacts). The circuit is now prepared to receive pulses from the distant TWX office.

*Reception of figures character*

Telegraph pulses over the inward path are repeated by relay 1802 which is normally held to its marking contact. The distributor motor is running but the receiving contacts of the distributor are not operating because the start magnet 2201 is released, latching the clutch. As soon as a character is received, the start pulse of the character sends relay 1802 to spacing, which operates magnet 2201, allowing the cams to successively operate the receiving contacts. The motor speed and receiving contacts are adjusted so that, at the time the first selecting pulse of the character is received, the secondary winding of relay 2210 is momentarily connected to the armature of relay 1802. If the first pulse is marking, relay 2210 will operate and lock to its marking contact. Similarly, the other polarized relays 2209, 2207, 2206 and 2205 will, in turn, be left either spacing or marking, depending on the character of the following pulses. The reception of the "Figures" character then proceeds as follows:

| Code elements | Relay 1802 | Register relays | Fan relays operated |
| --- | --- | --- | --- |
| 1 | Marking | 2210 marking | 2222 and 2224 |
| 2 | ...do | 2209 marking | 2221 and 2223 |
| 3 | Spacing | 2207 spacing | |
| 4 | Marking | 2206 marking | 2219 |
| 5 | ...do | 2205 marking | 2218 |

With the polarized register relays operated as above, it will be noted that none of the locking paths of these relays pass through the winding of relay 2215. If any one is operated in the reversed direction, relay 2215 will be energized. Relay 2215 will, therefore, release only when a figures character is received. The succeeding stop pulse is marking which causes magnet 2201 to release. A momentary closure of ground by the stop pulse distributor contacts causes relay 2211 to operate to its marking contact, overcoming the effect of its bias to its spacing contact. The timing condenser 2225 causes relay 2211 to remain on its marking contact for .030 second after the stop pulse distributor contacts open. This allows time for the operation of relay 1812, which operates if relay 2215 is at this time released and which locks to ground on conductor 1828 and prepares a path for operating relay 1832 when relay 2211 returns to its spacing contact. In this way relay 1832 operates and locks to ground on conductor 1828 and transfers the marking contact of relay 2211 along to succeeding counting relays in preparation for the registration of the next two digits. The reception of "figures" has, therefore, set up a combination of register relays locking direct to batteery instead of through the winding of relay 2215, thereby unlocking relay 2215 and allowing the next two characters to be registered. Hits or short interruptions like the spacing signals on the line are harmless until the operator has sent preliminary "figures." After the "figures" character has been received, the following relays are operated: 1800, 1804, 1810, 1816, 1807, 1805, 1801, 2218, 2219, 2221, 2222, 2223, 2224, 1812, 1832, 1802 (to marking), 2210 (to marking), 2209 (to marking), 2207 (to spacing), 2206 (to marking), 2205 (to marking) and 2211 (to spacing). The operation of relays 2218, 2219, 2221, 2222, 2223 and 2224 performs no useful function at this time since the path from conductor 2226 is not closed to any of the 0 to 9 conductors.

*Reception and deciphering of the first digit*

The first digit of the subscriber's number will be repeated by relay 1802, broken up pulse by pulse by the distributor contacts and recorded by the register relays in much the same way as the "figures" character was received. The polarized register relays will be operated in accordance with the position of relay 1802 during the reception of the corresponding pulses. In each case, the operating winding of such polarized relays can quickly overcome the holding winding but otherwise the relays hold in whichever direction they are operated under control of the off-normal ground on conductor 1828. The following table indicates the condition of the register relay resulting from the transmission of numerical characters. "M" indicates marking, "S," spacing.

| Character | | Relay condition | | | | |
|---|---|---|---|---|---|---|
| Lower case | Upper case | R2210 | R2209 | R2207 | R2206 | R2205 |
| Figures | Figures | M | M | S | M | M |
| P | 0 | S | M | M | M | M |
| Q | 1 | M | M | S | S | M |
| W | 2 | M | M | S | S | M |
| E | 3 | M | S | S | S | S |
| R | 4 | S | M | S | M | S |
| T | 5 | S | S | S | S | M |
| Y | 6 | M | S | M | S | M |
| U | 7 | M | M | M | S | S |
| I | 8 | S | M | M | S | S |
| O | 9 | S | S | M | M | M |

It will be noted that when relay 2210 is on its marking contact that fanning relays 2222 and 2224 are operated. Similarly, the other fanning relays are operated when their associated register relays are on their marking contacts. Also, relay 2215 will be operated during the reception of the first digit but performs no useful function after the "figures" character has been received. At the conclusion of the dot elements of the particular character sent, relay 2211 again operates to marking and is again held to an additional period of .030 second.

Let it be assumed that the call is being extended to the subscriber's station shown in Fig. 4, known as station No. 90. The first digit, therefore, will be the digit 9 having three successive spacing signals followed by two successive marking signals. This will result in the operation of relays 2210, 2209, 2207 to their spacing contacts and relays 2206 and 2205 to their marking contacts. As a result, relay 2218 is operated by relay 2205 and relay 2219 is operated by relay 2206. Therefore, a connection can be traced from conductor 2226 through the left-hand armature and front contact of relay 2218, the right-hand armature and front contact of relay 2219, the inner left-hand armature and back contact of relay 2220, the outer left-hand armature and back contact of relay 2223, the outer right-hand armature and back contact of relay 2224 to conductor 2227. This latter conductor can be traced through the back contact and inner left-hand armature of relay 1705, thence through the back contact and outer right-hand armature of relay 2100, the left-hand winding of relay 2101, the back contact and left-hand armature of relay 2102 to battery. In the other direction this battery connection will be extended over conductor 2226 through the back contact and inner left-hand armature of relay 1833, the outer left-hand armature and back contact of relay 1829, the left-hand armature and back contact of relay 1834, the back contact and right-hand armature of relay 1835, the front contact and right-hand armature of relay 1832 to the marking contact of relay 2211. When the stop contact 2202 is closed relay 2211 operates to its marking contact and extends ground from the front contacts and right-hand armatures of relay 1805 over conductor 1828 and the right-hand armature and back contact of relay 1829 and eventually over the right-hand armature and front contact of relay 1832 to cause the operation of relays 1836 and 2101. Relay 2101, which corresponds to the tens group of the particular called subscriber's line, in operating locks in series with relay 2102 to a ground which may be traced from the winding of relay 2102 over the back contact and outer right-hand armature of transfer relay 1705 to ground on conductor 1828. Relay 2102, in operating, (1) removes battery from the operating windings of all other relays corresponding to relay 2101, preventing the operation of another such relay on this call (2) causes the operation of relay 2100 and its companion relay 2103 which definitely remove any one of the relays, such as relay 2101, from their associated 0 to 9 fanning-out leads and (3) closes a connection to conductor 2114 which later supplies ground to operate the hold magnet of the link circuit in case the line is idle. Relay 1836, in operating, prepares a path for the operation of relay 1835. When the polarized relay 2211 returns to its spacing contact after .030 second, relay 1835 will operate and ground will be supplied to a contact on relay 2101, in a circuit from the ground supplied for the operation of relay 1835 over the back contact and inner right-hand armature of relay 1705, front contact and left-hand armature of relay 2101 to the windings of relays 2105 and 2106 associated with the particular tens group of the called subscriber's line. Relays 2105 and 2106, in operating, connect the fanning-out leads 0 to 9 to the 0 to 9 leads of the particular tens groups of subscribers' lines. The relay 1835, in operating (1) locks to ground on conductor 1828, (2) opens the operating paths of relays 1836 and 2101 and prepares a path for the operation of relay 1837, (3) connects ground to lead 1803 to the sequence circuit where it is instrumental in fixing the trunk advance chain and preventing the release of any link circuit in use on an established call. After the first digit has been received, the following relays are operated: 1800, 1804, 1810, 1816, 1807, 1805, 1801, 1812, 1832, 1836, 1835, 2101, 2102, 2100, 2103, 2105 and 2106. Relay 1802 is marking, relay 2211 is spacing and, in the particular case described, relays 2210, 2209, and 2207 are spacing and relays 2206 and 2205 are marking and relays 2218 and 2219 are operated.

*Reception and deciphering of the second digit*

The second digit of the called subscriber's number is received, registered and made to operate the fanning-out relays in the same way as the first digit. In this particular case, we are assuming that the second digit is 0. Therefore, relay 2210 will be spacing, relays 2209 and 2207 will be marking, relay 2206 will be spacing and relay 2205 will be marking. With the register relays so effected, fanning-out relays 2218, 2220, 2221 and 2223 will be operated. Therefore, a connection can be traced from conductor 2226 through the left-hand armature and front contact of relay 2218, the back contact and right-hand armature of relay 2219, the outer right-hand armature and front contact of relay 2220, the right-hand armature and front contact of relay 2221, the outer left-hand armature and back contact of relay 2222 to conductor 2228. This conductor may be traced through the outer left-hand armature and back contact of relay 1703 and thence to the outer left-hand armature of relay 2105.

Relay 2211 operates to its marking contact while the stop segment is grounded and thereby causes the operation of relay 1837. Relay 1837, in operating, (1) establishes a connection from ground, the lower winding of relay 1802, resistance 1838, the front contact and outer left-hand armature of relay 1837, resistance 2229 to battery to prevent any additional incoming impulses from being registered, (2) locks to ground on conductor 1828 and (3) opens the original operating paths of relays 1835, 2105 and 2106 and prepares a path for the operation of relay 1834.

When the polarized relay 2211 after .030 second returns to its spacing contact, it causes the operation of relay 1834. This relay, in operating, (1) connects battery through the windings of relays 1839 and 1840 in series, thence through the front contact and left-hand armature of relay 1834, the back contact and outer left-hand armature of relay 1829, the inner left-hand armature and back contact of relay 1833 to conductor 2226 which may be traced to conductor 2190 and thence to conductor 690 individual to the called subscriber's line and (2) causes the operating of the slow-acting relay 1841. It will be noted that, as usual, the polarized registration relays remain locked in the direction in which they were last operated.

*Testing subscriber's line*

The connection of battery through the relays 1839 and 1840 to the particular called subscriber's line enables these two relays to determine if the individual lead 690 to the subscriber's line is terminated in a direct ground which causes the operation of both relays 1839 and 1840 or a high resistance ground which results in the operation of relay 1839 only and denotes an out-of-order condition. In case no ground is available, neither relay 1839 nor 1840 operates. This test takes place during the slow-operating time of relay 1841 which begins to operate when relay 1834 operates. As soon as relay 1841 operates, off-normal ground on conductor 1828 is connected to the armature of relay 1839.

Assuming the subscriber's line idle, in which case ground is not connected to the lead passing through relays 1839 and 1840, neither of these relays will be operated and ground connected to the armature of relay 1841 will cause the operation of relay 1829. Relay 1829, in operating, (1) removes relays 1839 and 1840 from connection to the subscriber line lead, in this case conductor 690, and replaces such relays by relay 1842, (2) causes the release of relay 1834 by opening the connection to the armature of polarized relay 2211, (3) prepares a path for the operation of relay 1830, and (4) locks to ground on conductor 1828. The release of relay 1834 allows relay 1841 to release, but since this latter relay is slow in releasing there will be a short interval during which relay 1834 is released and relay 1841 is operated, giving relay 1842 an opportunity to determine which of relays 1843 and 1830 shall be operated. During this time ground is connected through the winding of relay 2307 in the miscellaneous alarm circuit, through conductor 2312, conductor 2114, the front contact and right-hand armature of relay 2102, the inner left-hand armature and back contact of relay 1702, winding of relay 1842, the front contact and outer left-hand armature of relay 1829, the inner left-hand armature and back contact of relay 1833 and thus over a path previously traced to the subscriber's individual lead 690. Under the assumed condition of the subscriber's line being idle, battery on the winding of relay 903 of the cross-bar switch permits relay 1842 to operate, but due to the high resistance of the circuit relay 903 remains unoperated. Relay 1842, in operating, opens the operating path of relay 1830 and closes a path to operate relay 1843. When relay 1841 releases, ground supplied over conductor 1828 is connected to the armature of relay 1842 through the back contact of relay 1841 so that now the circuit for the operation of relay 1843 is completed and this relay operates. Relay 1843, in operating, (1) locks to ground on conductor 1828, (2) short-circuits the winding of relay 1842, and (3) holds open the operating path of relay 1830. With the winding of relay 1842 short-circuited, ground supplied by the miscellaneous alarm circuit connected through the fanning-out relays of the director circuit and thence over conductor 690 will cause the operation in the link circuit of relay 903.

The subscriber will, therefore, be connected to the trunk circuit which will function to release the sequence circuit. The sequence circuit in turn will function to remove the ground on the conductor leading to relay 1800. Relay 1800 therefore releases, (1) removing off-normal ground from various parts of the circuit including relays 1807 and 1805, and (2) releasing relay 1804 unless conductor 1219 leading to the inner right-hand armature of relay 1804 is held grounded, indicating that another inward call is awaiting completion. Relay 1805, in releasing, removes off-normal locking ground from a considerable part of the circuit. If relay 1804 releases, the motor 2212 will be stopped and all remaining parts of the circuit will be deenergized. If, however, relay 1804 is held operated, the motor is kept running and the polar relays 2205, 2206, 2207, 2209 and 2210 and the associated fanning-out relays 2218 to 2224 are locked in the condition in which they were operated by the last digit. When the next call comes in the operation will be as previously described except as follows: Relay 1813 now operates immediately, since the motor is running at full speed, and relays 1807 and 1805 follow at once upon receiving the closure of the stop pulse contacts 2202. Before this stop pulse is reached, the polar relays may be operated to spacing through the back contacts of the relay 1807, but in any case the circuit waits to receive "figures" before proceeding with the call. The operation then continues as hereinbefore described.

*Inward call to busy or out-of-order line*

The operation on this type of call is exactly the same as set forth above up to the point where the operation of relay 1834 connects relays 1839 and 1840 to the individual lead 690 of the subscriber's line circuit. Now, however, this lead terminates in direct ground or a high resistance ground (out-of-order busy). In either case relay 1839 quickly operates but relay 1840 is marginal and only operates on direct ground. Relay 1839, in operating, prevents relay 1829 from operating and therefore relay 1834 remains operated, keeping relays 1839 and 1840 connected to the lead 690. Relay 1839 therefore remains operated along with relays 1837, 1834 and 1841 and causes the operation of relay 1831. Relay 1831 (1) applies the ground to start the production of "K" or "Q" characters by polarized relays 1844 and 1845, and (2) connects the marking contact of relay 1844 to the outward transmission path which may be traced from the right-hand contact of relay 1844 through the outer left-hand armature and front contact of relay 1831, the normal contacts of the outer right-hand armature of relay 1830, the back contact and outer left-hand armature of relay 1814 to conductor 1815.

Relays 1844 and 1845 operate in condenser-timed circuits to generate "K" and "Q" signals as follows: When the ground is applied to one end of the potentiometer formed by resistances 1846 and 1847, relay 1845 will operate to its left-hand contact due to current in its lower winding, supplied through resistance 1848. When such left-hand contact is closed the current in this lower winding is reversed but the discharging of condenser 1849 through the upper winding holds relay 1845 to its left-hand contact until the discharge current is so reduced that the lower winding regains control and sends the armature to its right-hand contact. Here the process is repeated, the lower winding tending to make the armature return to its left-hand contact while the condenser in charging holds it to the right-hand contact until its effect is overcome. The condenser and potentiometer resistances are so proportioned that relay 1845 will pulse at about 9 cycles per second if resistance 1850 is in circuit or 11 cycles per second if resistance 1850 is short-circuited. As will be seen later, if the line is busy the relay 1840 being operated and therefore including resistance 1850 in circuit, will cause relay 1845 to pulse at about 9 cycles per second. If, on the other hand, relay 1840 is not energized resistance 1850 will not be included in the circuit and relay 1845 will pulse at about 11 cycles per second.

When ground is connected by relay 1831, relay 1844 will operate to its right-hand contact due to current in the lower winding. This sends a marking signal over the outward transmission path lead 1815. However, when relay 1845 reaches its right-hand contact condenser 1851 will discharge through the upper winding and resistance 1852 and cause the relay to leave its right-hand contact for one pulse length (approximately .022 second). Relay 1844 then returns to its right-hand contact and after relay 1845 opens its right-hand contact condenser 1851 is recharged through resistances 1853 and 1854. Since relay 1844 is pulsing continuously, relay 1844 will send out a spacing pulse of .022 second each time relay 1845 closes its right-hand contact. In this way relay 1845 drives relay 1844 at either 9 or 11 cycles per second, sending "K" signals if the line is busy and "Q" signals if the line is out of order. These characters are transmitted over the line and printed on the distant operator's teletypewriter.

*Connection to unassigned or impossible number*

If an unassigned number or non-numerical code is received and registered the circuit functions as hereinbefore described. When, however, the relay 1842 is applied to the individual lead of the called subscriber's line, as indicated heretofore, battery is not available on such lead and relay 1842 fails to operate. When, therefore, relay 1841 releases, off-normal ground will be connected to relay 1830, causing it to operate instead of relay 1843 as heretofore. With relay 1830 operated, ground is placed on relays 1844 and 1845 and their associated apparatus and relay 1830 transfers the right-hand contact of relay 1845 from resistance 1852 directly to the outward path over conductor 1815. Under these conditions, relay 1845 pulses at approximately 11 cycles per second, since relay 1840 is unoperated and the resistance 1850 is short-circuited. Resistances 1846 and 1847 are so proportioned that the right-hand contact of relay 1845 will be successively closed and opened at intervals of approximately .044 second. This causes an "I" signal to be sent to the distant operator as an indication that an unassigned or impossible number has been selected. The operator, upon receiving the unassigned signal, disconnects the calling cord plug from the trunk jack at the distant manual end. This causes the associated two-way trunk at the line concentration unit to function to return to normal and release the sequence circuit which in turn removes ground from the conductor leading to the winding of relay 1800. The circuit is then restored to normal as hereinbefore described.

*Failure of the director circuit—General*

When a trunk circuit on an inward call obtains the permission from the sequence circuit to route the call, the miscellaneous alarm circuit begins counting time. Ordinarily the alarm circuit will time out in two seconds but if the director circuit has grounded conductor 1819 indicating that it has moved off normal, the miscellaneous alarm circuit extends the timing out to four seconds. Then if the director ready signal is sent, as hereinbefore described, relay 1801 in operating grounds conductor 1855 causing the miscellaneous alarm circuit to extend the time allowed for handling the call to ten seconds.

Conductors 1818 and 1856 are used to indicate to the miscellaneous alarm circuit whether or not the trunk should be locked up in case of trouble. Ground on either of these leads prevents the removal of the trunk circuit from service.

*Failure to move a director off normal*

If after two seconds relay 1816 has not grounded conductor 1819, indicating that the trunk circuit has failed to start a director off normal, the alarm circuit removes the trunk from service. The removal of the trunk of course removes any connection from the director to that trunk, permitting the director to continue to handle calls.

*Failure of the director motor to attain speed*

In this case it is assumed that relay 1816 has operated and grounded conductor 1819 causing the miscellaneous alarm circuit to permit an elapsed time of four seconds but that relay 1805 has failed to operate either because the motor failed to attain speed or the relay arrangement designed to detect the speed failed to function. Relay 1814 in operating caused relay 1816 to operate and place a ground on conductor 1818. In this case the alarm circuit after four seconds places a ground on the conductor leading to relay 1833 thereby causing this relay to operate. Relay 1833 in operating (1) locks under control of the release key 1857, (2) operates relay 1827, (3) grounds lead 1858 to indicate to the miscellaneous alarm circuit that the director is locked, (4) connects ground to relay 1800 to hold the director in timed-out condition and (5) opens the fanning-out common lead 2226 to relay 2218.

Relay 1827 in operating (1) opens conductor 1819, (2) connects battery to lamps 1817, 1820, 1821 and 1822 which in this case causes lamp 1817 to light indicating the type of trouble and (3) places battery potential on magnet 2201 of the distributor to prevent the distributor from running open. Meanwhile, since conductor 1818 is grounded, the miscellaneous alarm circuit places the trunk back into service after removing it temporarily, disconnects the trunk from the director which of course has no effect on the stuck director and then if the sequence circuit has returned to normal places a ground on the transfer lead 1706 thereby operating transfer relays 1700 to 1705, inclusive, and thus rendering director No. 2, indicated by rectangle 2314, effective in place of the director shown in detail in Figs. 17, 18, 21 and 22. If director No. 2 was the director that was sent into the stuck condition the transfer lead 1706 would have already been grounded and in this case the alarm circuit removes the ground on the transfer lead placing director No. 1 into service. New inward calls are completed by the newly connected director.

*Failure of the director ready signal to reach associated loop repeater or failure of registration of mark signal sent by trunk circuit to distributor circuit*

In this case it is assumed that the distributor has attained speed and that relay 1805 has operated but the circuit by which the director ready signal was to be sent was opened somewhere before reaching the associated loop repeater or in any case the relay 1801 had failed to operate or if the incoming transmission lead to the distributor is open it is obvious that directing of the inward call by the connection will be impossible. Such condition would prevent relay 1810 from operating. These two troubles could occur on the same call. In any case, after four seconds the miscellaneous alarm operates relay 1832 and in turn relay 1827, as hereinbefore described, except that since neither conductor 1818 nor 1856 is grounded the alarm circuit proceeds to lock the trunk as well as the director out of service. Relay 1827 in operating causes telltale lamps to light as follows: Lamps 1820 and 1822 lighted indicate director ready signal failure, lamp 1821 lighted indicates failure to register the incoming mark and lamp 1820 alone lighted indicates a combination of both types of trouble. The alarm circuit meanwhile proceeds to place the other director into service.

*Returning "stuck" director to service*

After the trouble is cleared the director can be made available by momentarily operating release key 1857 which removes holding ground from relay 1800 and marking ground from relays 1827 and 1833 returning the circuit to normal.

*Miscellaneous alarm circuit*

The circuit shown in Figs. 23 and 24 is designed for use primarily to time the interval during which the sequence circuit is in use and is arranged to give appropriate alarms if a specified time limit is exceeded giving at the same time an indication of the possible circuits in trouble. The circuit is also arranged to give an alarm when the battery or grounded chain of the sequence remains open. The functions of the circuit may be summarized as follows:

1. On an outward call from the local subscriber the miscellaneous alarm circuit times the interval in which the sequence circuit is used to see that it does not exceed two seconds.

2. On an outward call when the sequence circuit is in use for more than two seconds the miscellaneous alarm circuit is arranged to indicate whether the trouble is in the trunk alone or in any of the other circuits called into use. In case the miscellaneous alarm circuit decides that the trunk is in trouble it is arranged to give a minor alarm flash on a trunk lamp and to cause the removal of a particular trunk circuit from service. In case the miscellaneous alarm circuit determines that any of the other circuits in use on the particular call are in trouble, the circuit is arranged to light a lamp 2309 and to give a minor alarm and to cause the removal of the subgroup of subscribers containing the calling subscriber from outward service.

3. After removing the particular trunk or the particular subgroup of subscribers from service, the miscellaneous alarm circuit is arranged to detect the ability of the sequence circuit to return to normal and to light a lamp 2400 and to bring in a major alarm if it fails to do so within a half second.

4. On an inward call to the local subscriber the miscellaneous alarm circuit begins timing as soon as the inward call has received preference from the sequence circuit, being arranged to time the interval required to obtain a director circuit and to give an alarm if this period exceeds two seconds. In this case the miscellaneous alarm circuit is arranged to cause the removal from service of the trunk in trouble, flash the lamp associated with the trunk and at the same time to light lamp 2309 and to bring in a minor alarm. The alarm circuit continues to function as indicated in paragraph 3 above.

5. When informed over conductor 1819 that the director circuit has moved off normal, the miscellaneous alarm circuit waits a total of four seconds for the director to place ground on conductor 1855. The director places ground on conductor 1855 if the distributor motor has attained speed, if the director ready signal reached the associated loop repeater and if a mark signal sent over the trunk from the central office has been registered in the distributor circuit.

6. If the miscellaneous alarm circuit times out before conductor 1855 is grounded but after conductor 1819 was grounded, the alarm circuit is arranged;

a. To cause the associated director circuit to lock in a "stuck" condition.

b. To bring in an audible and visible alarm associated with the director circuit.

c. After the director has been locked up in a "stuck" condition to remove the trunk circuit from service under control of a key and cause a lamp associated with this trunk to flash or if the conductors 1819 and 1856 are grounded when the alarm circuit times out to remove the trunk circuit from service temporarily under control of a mark signal sent from the central office causing a lamp associated with the trunk to light steadily.

d. After allowing approximately one-half second during which the director has been locked on a "stuck" condition, the miscellaneous alarm circuit is arranged to test for failure of the sequence circuit to release and to bring in an audible major alarm and light lamp 2400, if the sequence circuit fails to release.

e. If the sequence circuit has been released the miscellaneous alarm circuit is arranged to replace the "stuck" director with another spare director if one is available.

7. If the conductor 1855 is grounded the miscellaneous alarm circuit permits the director circuit ten seconds to complete all its functions.

8. If the miscellaneous alarm circuit times out after ten seconds the alarm circuit is arranged to function as follows:

a. Removes the trunk circuit used on the particular call from service under control of a mark signal received from the distant end lighting a lamp associated with this trunk but returns the director back to service.

b. After approximately one-half second test for failure of the sequence circuit to release and if the sequence circuit fails to release brings an audible major alarm and lights lamp 2400.

9. The alarm circuit in taking a director out of service will give a minor alarm provided a spare director is available and not in trouble. If the second director is in trouble the circuit will give a major alarm.

10. The circuit is arranged to permit manual transfer from one director to another at a time when the sequence circuit is not in use due to the routing of a call through the office and when the director transferred to is available and not in trouble.

11. The circuit is arranged to prevent the use of a sequence circuit on a new call for one-half second if the sequence has otherwise returned to normal after timing out.

12. The circuit is arranged to furnish a time delay between the operation of the selector magnet of the cross-bar switch and the application of ground for the operation of the holding magnet of the cross-bar switch.

13. The circuit is provided with keys associated with each type of trouble indicated to permit removal of the audible alarm leaving a lamp to indicate the trouble condition and with keys to release the locked-in trouble indication and also an alarm cut-off key which prevents the alarm circuit from timing out.

14. This circuit is arranged to light lamp 2315 as an indication that a selector magnet of the link circuit has operated.

15. This circuit is arranged to prevent the director from interfering with the miscellaneous alarm circuit when both directors fail.

16. If the battery or ground chain of the sequence circuit remains open for approximately forty-five seconds this circuit is arranged to give a major alarm and light either lamp 2316 or 2317 to indicate which chain is open.

17. This circuit is arranged to prevent the routing of a call if the selector magnet of a link circuit is falsely operated and to give an alarm if this condition persists for approximately forty-five seconds.

DESCRIPTION OF OPERATION

*Timing of the sequence circuit on an outward call*

When a subscriber originates an outward call and the sequence circuit is called into use, battery is placed on the conductor leading to relay 2306. Relay 2306 in operating (1) removes ground from the contact of key 2401 to prevent manual transfer from director 1 to director 2, (2) causes the operation of the common start relay 2305 and (3) furnishes ground to supplement one on the key 2401 to nullify the return to normal of that same key and to continue the particular director in use during the routing of the call in the office. The operation of the common start relay 2305 removes ground from the ground lead to the sequence circuit preventing further use of the sequence circuit on a new call, connects locking ground to the time measuring relays and connects a sixty-interruption per minute interrupter 2318 to relay 2402 which follows the one-half second open, the one-half second close interrupter.

The interrupter relay 2402 works three sets of counting relays, the first comprising relays 2403 and 2404, the second comprising relays 2405 and 2406 and the third comprising relays 2407 and 2408. The action of these relays is well known and therefore no detailed description will be given. The complete cycle of operations of the counting relays 2403 and 2404 start with one closure of the contact of relay 2404 and ends with the end of the second closure of this contact and thus occupies two full seconds. Since the connection of the interrupter 2318 to relay 2402 may take place at any time the completion of the operation of the first set of counting relays will therefore occur either exactly at the two-second interval or within one-half second either side thereof. Assuming hereafter, that the operation of the common start relay 2305 which connects the interrupter 2318 to the relay 2402 occurs exactly at such a time that the relay 2404 will be operated for a full one-half second, then it will be found that relay 2403 immediately operates at what may be termed zero time, relay 2404 operates at the end of one-half second, relay 2403 releases at exactly one second, relay 2404 releases at exactly one and one-half seconds and relay 2403 again operates at exactly two seconds.

Relay 2403 is therefore regularly operated for one second and released for one second and relay 2404 is also regularly operated for one second and released for one second. Relay 2405 will be operated at the end of one-half second and released at the end of two and one-half seconds, again operated at the end of four and one-half seconds and released at the end of six and one-half seconds. Relay 2406 will be operated at exactly one second and released at exactly three seconds, again operated at exactly five seconds and released at exactly seven seconds. Relay 2407 will be operated at exactly two and one-half seconds, released at six and one-half seconds and again operated at ten and one-half seconds and relay 2408 will be operated at exactly three seconds, released at exactly seven seconds and again operated at exactly eleven seconds and relay 2409 will come into operation at exactly six and one-half seconds.

Providing the relay 2306 and therefore the common start relay 2305 are still operated at the two-second point when relay 2403 again operates, a circuit may be traced from the winding of relay 2319, the inner upper armature and back contact of relay 2320, the back contact and outer upper armature of relay 2404, the front contact and outer upper armature of relay 2403, the front contact and upper outer armature of relay 2406, the back contact and lower armature of relay 2321, the back contact and outer upper armature of relay 2410 to conductor 2411 which is grounded through the front contacts and inner armatures of common start relay 2305. The operation of relay 2319 (1) closes the operating winding of relay 2412 through its front contact and inner upper armature and the inner upper armature and back contact of relay 2322, the outer upper armature and back contact of relay 2321 to ground, (2) connects ground available on the contact of the start relay 2306 through its inner lower armature and front contact through the inner lower armature of relay 2319 to hold relay 2301 operated and (3) opens at its lower outer armature and back contact a path which may extend through the inner upper armature of relay 2321 to the winding of transfer relay 2413. Relay 2322 and relay 2321 being unoperated at this time, relay 2412 operates immediately at this time and locks in a circuit through its lower winding, its front contact and inner lower armature, the lower armature and back contact of relay 2320, the front contact and upper outer armature of relay 2403, the front contact and upper outer armature of relay 2406, the back contact and lower armature of relay 2321, the back contact and outer upper armature of relay 2410 to ground on conductor 2411. Relay 2412 in operating through its front contact and outer lower armature places a supplemental ground on the winding of the common start relay 2305. Relay 2412 also prepares a path for testing the subsequent release of the sequence circuit and extends the ground from the contacts of relay 2306 through its middle upper armature and front contact to the lower armature of relay 2301.

During the routing of the outward call the trunk circuit sends the calling-in signal to the distant end and awaits the reception of ringing sent automatically from the distant end. If this calling-in signal is not received at the distant end due to a faulty conductor or if the calling-in signal fails to be registered at the distant end or if in any event the ringing fails to be received in the line concentrating unit, ground on lead 1108 would continue to keep relay 2301 operated causing it to lock the moment the relay 2319 operates. Therefore, the ground furnished by relay 2306 and directed to the contacts of relay 2301 by means of relays 2319 and 2412 can be applied to conductor 2334 leading to a contact on the start relay of all trunks. The ground will also be extended through the outer upper armature of relay 2301 to the upper winding of relay 2323. Relay 2323 operates and causes the minor alarm lamp 2324 to light and to lock in through the release key 2347. Ground on lead 2334 operates relay 2303 which releases the sequence circuit chain by opening the main sequence circuit ground chain at its contacts, thereby causing the removal of the particular trunk circuit from service. This will permit the subscriber's call to receive service over another trunk after the alarm circuit has tested and found the sequence circuit normal and when connected to the new trunk the sequence circuit will return to normal and remove battery from the lead to relay 2306 causing this relay to release and in turn release the common start relay 2305. The common start relay will release all counting relays operated at that time returning the circuit to normal except for the locked in alarm 2324.

If the selected trunk has operated satisfactorily and registered the received ringing, or if the trunk circuit was not even preselected, relay 2301 of the miscellaneous alarm circuit would be normal when relay 2319 operated and ground available at the contact of relay 2306 directed to the contacts of relay 2301 by means of relays 2319 and 2412 would be applied over the lower armature and back contact of relay 2301 to conductors 2326 and 2327, connecting respectively to conductors 1217 and 1218, for the operation of such relays as 1201 and 1203. This ground would also be extended over the upper outer armature and back contact of relay 2301 to the winding of relay 2328, causing this relay to operate and light the minor alarm lamp 2309 under control of release key 2329. Ground on conductor 2326 will extend through conductor 1217 to conductor 1014 where it will operate a relay such as 1009 to remove from outward service the particular subgroup of subscribers containing the calling subscriber. In either case, after a half second has elapsed, relay 2402 again releases, causing the operation of relay 2404 which in turn causes the release of relay 2319 and this relay in releasing applies the upper winding of relay 2414 through the back contact and upper outer armature of relay 2319 to the ground on the contact of the start relay 2306. If, therefore, in the half second that relay 2403 was operated alone and in which relays 2319 and 2412 function to apply ground to the contacts of relay 2301 and in which an attempt was made to free the sequence circuit, relay 2306 did not release ground on its front contact would cause the operation of relay 2414 as soon as relay 2319 released. Relay 2414 would lock under control of key 2415, light lamp 2400 and bring in a major alarm as an indication that the sequence circuit itself was in trouble. If, however, relay 2306 released during this interval, the miscellaneous alarm waits for another one-half second until relay 2403 releases, which permits the release of relay 2412. The release of this relay removes the ground from the winding of the common start relay 2305 which now, in releasing, removes the sixty interruption per minute interrupter 2318 from the winding of relay 2402, removes the locking ground from conductor 2411 to the time measuring relays and reconnects ground to conductor 2330, being the main ground in the sequence circuit chain, thus permitting the sequence circuit to handle a new call.

The removal of holding ground from the time measuring relay and the disconnection of sixty interruption per minute interrupter from the relay 2402 causes the release of relays 2402, 2403, and 2404, returning the miscellaneous alarm circuit to normal except for the locked-in trouble indication and thus permitting the alarm circuit to handle the timing of a new call. As indicated in this paragraph, relays 2328, 2323 and 2414 will remain operated depending upon the type of trouble the miscellaneous alarm circuit has discovered. The operation of the associated keys will permit the silencing of the audible alarm and will lock in the lamp indicating the trouble brought in. Each of these relays also has associated with it a release key such as key 2329 associated with relay 2328, the operation of which after the trouble has been cleared eliminates the locked-in trouble indication. Restoring the release key such as key 2331, extinguishes the trouble indicating lamp provided the locked-in trouble indicating relay has been released. With the trouble indicating lamp extinguished the circuit has returned to normal.

*Timing the interval used by the sequence circuit on an inward call if a director has not been seized*

When a trunk circuit on an inward call receives permission to use the sequence circuit, battery supplied to the conductor leading to start relay 2306 causes the operation of this relay which in turn results in the operation of the common start relay 2305. The operation of the common start relay permits relay 2402 to operate periodically and thereby cause the functioning of the counting relays 2403 to 2408. If after approximately two seconds when relay 2406 operates, relay 2321 should still be non-operated as a result of the failure of the sequence circuit to seize a director, relay 2319 will operate as indicated above, followed by the operation of relay 2412. If relay 2306 is still operated at this particular time ground on its contacts directed by means of relays 2319 and 2412 to relay 2301 will be applied to conductors 2326 and 2327 leading to conductors 1217 and 1218 of the sequence circuit. This will result in the removal of the particular trunk used in originating the call from service and at the same time permit the operation of relay 2328 as hereinbefore described. Thereafter the miscellaneous alarm circuit functions exactly as described above under the condition when it timed out a period in excess of two seconds on an outward call in which the trunk circuit called into use was found unsatisfactory. In this case, therefore, the trunk will be removed from service as indicated by a flashing red lamp 1220 energized by the sixty interruption per minute interrupter 1403 which, together with the lamp 2309 and minor alarm, will serve to indicate the type of trouble.

*Timing the interval used by the sequence circuit when conductor 1819 alone is grounded*

When the sequence circuit is seized, relay 2306 operates, causing in turn the operation of common start relay 2305. As described before, the common start relay connects interrupter 2318 to the counting relays for the purpose of counting the interval. Under the assumption that lead 1819 from the director circuit has been grounded, relay 2332 operates and (1) connects conductor 2333 extending from the winding of relay 1833 through the back contact and upper outer armature of relay 2322, thence through the front contact and middle upper armature of relay 2332 to the front contact of relay 2319, (2) connects a supplementary holding path to the operating winding of the common start relay, (3) locks under control of the start relay 2306, (4) connects the operating path of relays 2416 and 2417 to contacts of relay 2319, and (5) causes the operation of relay 2321. The operation of relay 2321 connects conductor 2325, which is an extension of conductor 1858 leading to relay 1827, to the contacts of relay 2319, partially prepares the path for operating relay 2413 and locks under control of ground from the common start relay, at the same time removing ground at the back contact of the outer upper armature of relay 2321. The operation of relay 2321 also permits the operation of relay 2320 which, among other things, places ground on the upper outer armature of relay 2408 of the third counting relay combination. Relays 2403 to 2406, inclusive, function and at the conclusion of the two-second interval, relay 2321 being operated, the miscellaneous alarm circuit does not cause the operation of relay 2319. At the conclusion of four and one-half seconds, however, relays 2408, 2404 and 2403 being operated, ground furnished by relay 2320 will cause the operation of relay 2319. The circuit for this may be traced from battery, the winding of relay 2319, the inner upper armature and front contact of relay 2320, the front contact and outer upper armature of relay 2404, the front contact and outer upper armature of relay 2403, the front contact and outer upper armature of relay 2408, the outer upper armature and front contact of relay 2320 to ground on the contacts of the common start relay 2305. Relay 2319, in operating, (1) connects ground to conductor 2330 leading to the director circuit where it causes the operation of relay 1833 which results in bringing the director into a "stuck" condition, (2) connects relay 2412 to conductor 2325, (3) causes the operation of either relay 2416 or 2417 depending upon the director in service, and (4) opens the operating path of relays 2413 and 2418. The operation of relay 2417, assuming director No. 1 to be in use, results in the locking of the relay operated under control of its associated release key and brings in an audible alarm and a lamp associated with the director in trouble, and prepares a path for either the operation of relays 2413, 2418 or 2410, the functions of which will be described later.

After the director circuit is locked in the "stuck" condition ground is placed on conductor 2325 which causes the operation of relay 2412. This relay, in operating, (1) locks under control of relay 2404, (2) places a supplementary ground on the winding of the common start relay to hold it operated, (3) connects ground under control of the start relay 2306 through the contacts of relays 2301 and 2319 to the leads 2326 and 2327 to the sequence circuit, and (4) helps prepare a path for the testing of the failure of the sequence circuit to release and for transferring the directors, both of which functions take place in the next one-half second. If, however, lead 1818 or 1856 from the director circuit had been grounded so as to cause the operation of relay 2335 at the moment that relay 2319 operated, relay 2336 would have operated and ground extended to conductor 2326 would now be also extended to conductor 2327. With both leads 2326 and 2327 to the sequence circuit grounded, the trunk circuit is taken out of service permanently under key control, but if the director circuit has so requested, the operation of relay 2336 will permit the grounding of only conductor 2326, in which case the trunk circuit will be removed from service temporarily under control of the mark signals received from the distant central office. In either case, however, the sequence circuit in taking the trunk out of service releases, removing battery from the conductor leading to start relay 2306 and causing the release of this relay. All this occurs within a half second and at the conclusion of this, relay 2403 releases, causing the release of relay 2319 but relay 2412 still remains locked up for an additional one-half second. With relay 2319 released, if for some reason or other relay 2306 is still operated, indicating, of course, that the sequence circuit has failed to release, ground furnished by the start relay 2306 through the back contacts of relay 2319 and the front contacts of relay 2412 causes relay 2414 to operate and lock under control of its associated release key and to bring in a major alarm in addition to a lamp indicating that the sequence circuit failed to release. With relay 2306 released, however, ground furnished by relay 2412 through back contacts of relays 2322, 2306 and 2319 and front contacts of relay 2321, which is still locked up under control of the common start relay, is connected to the upper outer armature and back contact of relay 2416 and thence through the lower operating winding of transfer relay 2413.

If relay 2416 is normal, indicating that director No. 2 is available, this ground causes the operation of the transfer relay 2413 which locks under control of relay 2417 and places a ground through its front contact and upper outer armature on the conductor leading therefrom to conductor 1706 where it is instrumental in causing the operation of the transfer relays 1700 to 1705, inclusive, thereby replacing director No. 1 by director No. 2. If relay 2416 is operated and relay 2417 is normal, indicating that director No. 1 is satisfactory and available, relay 2418 operates, causing the release of relay 2413 which removes ground from conductor 1706 and places director No. 1 in service instead of director No. 2. In transferring to the new director, all leads to the old director from the alarm circuit are opened, causing the release of relay 2332 and relays 2335 and 2336, if operated. If both the relays 2416 and 2417 are operated when conductor 2419 is grounded, indicating that both directors are in trouble and not available, ground on this conductor causes the operation of relay 2410 which locks under control of its associated release keys, brings in a major alarm and lights a lamp 2420. The operation of relay 2410 also removes holding ground from relay 2321 and the locking path of the common start relay which was prepared by relay 2332 while it prevents the "stuck" director from interfering with the placing and timing of outward calls. At the conclusion of the additional one-half second relay 2404 releases, causing the release of relay 2319 which in turn removes the additional holding ground from the common start relay. The common start relay 2305 in releasing (1) causes relays 2321 and 2320 to release, (2) opens the holding ground to the counting relays, (3) disconnects the interrupter 2318 from relay 2402, and (4) reconnects ground to conductor 2330, making the sequence circuit available.

*Extension of the timing interval if conductor 1855 is grounded*

If the director circuit places ground upon conductor 1855 relay 2313 operates and locks under control of ground furnished by the common start relay 2305. Relay 2313, in operating, causes the release of relay 2320 and this, in releasing, removes ground from the outer upper armature of relay 2408. The time counting circuit comprising relays 2403 to 2409, inclusive, therefore, continues to count time until ten seconds have elapsed, at which time relays 2409, 2406 and 2403 are operated, and ground furnished by relay 2409 through the contacts of the others causes the operation of relay 2319. Therefore, if the miscellaneous alarm circuit is off normal the absence of ground on conductor 1819 causes it to time out and operate the relay 2319 in two seconds. The presence of ground on conductor 1819 causes the alarm circuit to time out in four seconds, the additional presence of ground on conductor 1855, causing the release of relay 2320, permits the miscellaneous alarm circuit an interval of ten seconds before it operates relay 2319.

*Timing out after an interval of ten seconds*

As indicated in the previous paragraphs, the alarm circuit continues to count time as long as the sequence circuit is in use and until it receives notification that a certain time limit should not be exceeded. On an inward call the director makes a preliminary study of its own condition and if satisfied, places a ground on leads 1855 and 1856, causing the operation of relays 2313 and 2335.

Relay 2335 causes the operation of relay 2336 and relay 2313 operates relay 2322 and all lock under control of the common start relay 2305. Since relay 2322 opens conductor 2333 and since relay 2336 opens conductor 2327, the alarm circuit in case it does time out must return the director back to service and only remove the trunk temporarily from service. When, therefore, the miscellaneous alarm circuit has counted out an interval of ten seconds, relays 2409, 2406 and 2403 being operated, ground furnished by relay 2409 causes relay 2319 to operate. Relay 2319 causes the immediate operation of relay 2412 from ground on relay 2322. Relay 2412, operated, locks under control of relay 2403, places a supplementary ground on the winding of the common start relay 2305, prepares an operating path for relay 2414 and connects ground to conductor 2326. Ground on this conductor is used in the sequence circuit to disconnect the director from the trunk circuit, returning the director to normal, freeing the sequence circuit and removing battery from the conductor connected to the start relay 2306, while a characteristic out-of-order signal is connected to the trunk involved in addition to steady lighting of the red trunk lamp 1220. If the director returns to normal and battery is removed from the conductor leading to the start relay, both relays 2332 and 2306 return to normal. After one-half second has elapsed relay 2404 operates and relay 2319 releases. If the start relay 2306 has not released by the time the relay 2319 releases, the sequence alarm is given as indicated above. If, however, the start relay has released, the alarm waits for another one-half second until relay 2403 releases, causing the release of relay 2412 and in turn the release of the common start relay. The common start relay, released, causes relays 2321, 2313, 2336 and 2322 to release, disconnects the interrupter from relay 2402 and the holding ground from the time counting relays, releasing all of them and connecting ground to the chain lead thus returning the circuit to normal and in a position to permit the routing and timing of a new call.

Manual transfer of directors

The operation and release of key 2401 permits the manual transferring between the two directors placing either one in service. If director No. 1 is in service the operation of the key to its alternate position will place director No. 2 in service if director No. 2 is satisfactory and provided a call is not at the time being routed through the office. If director No. 2 is in service and it is desired to replace it by director No. 1 the release of key 2401 to the position shown will remove director No. 2 and replace it by director No. 1 provided director No. 1 is available and not in trouble and provided a call is not being routed through the office.

Delaying the operation of the hold magnet of the cross-bar switch

Due to the inherent design of the cross-bar switch the directing finger actuated by the selecting magnet "chatters" on being operated. To prevent the hold magnet, therefore, from snagging two sets of contacts while the directing finger is chattering, ground for the application of the hold magnet is delayed for a short period. The operating of the selecting magnets of the cross-bar link places a ground on conductor 902 which extends to conductor 2302 and thence to relay 2300. Relay 2300 is slow to operate but when it does move its armatures it extends ground to the winding of relay 2307, thence through normal contacts of relay 2310 to conductor 2312 which eventually operates a hold magnet after a time sufficient to permit the directing fingers permanently to come to rest. The operation of relay 2300 also causes the illumination of lamp 2315 as an indication that a selecting magnet has operated, and in addition it removes ground from conductor 2337 to a test circuit (not shown) to warn that circuit that a selecting magnet is operated. The application of ground to conductor 2312 causes both the hold magnet and relay 2307 to operate in series. Relay 2307, in operating, causes the slow operating relay 2310 to operate, locking to ground on the contact of relay 2307 and then increasing the resistance to ground in the lead 2312 by the resistance 2311. The hold magnet, therefore, has closed its locking contact and, therefore, locks in series with the sleeve relay of the trunk circuit. When the selecting magnets return to normal ground is removed from conductor 902, relay 2300 releases and this in turn releases relays 2307 and 2310, extinguishing the lamp 2315 and grounding conductor 2337, returning the circuit to normal.

Function of lamps and keys

The miscellaneous alarm circuit is equipped with an alarm cut-off key 2338 which upon being operated prevents the miscellaneous alarm circuit from timing out a call and at the same time flashes a lamp 2339. The circuit is also provided with a sequence busy lamp 2340 as an indication to the maintenance man whenever the sequence circuit is off normal. Relays 2328, 2323, 2414, 2417, 2416 and 2410 have associated with them a release alarm key which silences an audible alarm, permanently locking the lamp indicating the type of trouble. The illumination of lamp 2309 is an indication that the subscriber line circuit or subscriber line equipment on an outward call has failed or that on an inward call the sequence circuit failed to set a director off normal. The illumination of lamp 2324 is an indication that on an outward call the continuity of the two trunk conductors has been found in trouble. The operation of lamp 2400 is an indication that the sequence circuit failed and is in trouble. The operation of lamp 2421 or lamp 2422 indicates the particular director in trouble and the operation of lamp 2420 indicates that both directors are in trouble. After the maintenance man has cleared the trouble indicated, the miscellaneous alarm circuit is brought to normal as far as the alarm indications are concerned by the return of the release alarm key to normal if it had been operated to silence the audible alarm and the momentary operation of the release key associated with the particular alarm. This causes the release of such relays as 2328 and 2323 that were operated, removing both audible and visual alarms.

Sequence battery and ground chain alarm

Relay 2341 remains operated from ground supplied by the common start relay through the ground chain of the sequence circuit. Similarly, relay 2304 remains operated from battery supplied by relay 2303 through the battery chain of the sequence circuit. With both relays 2341 and 2304 operated, the plate and filament voltages for the vacuum tube 2342 remain unconnected while the grid remains grounded and condenser 2343 is in a discharged condition. However, with the sequence circuit in an idle condition if either the ground or battery chain circuit becomes open, relay 2341 or relay 2304 releases, depending upon the particular chain affected. With the sequence circuit in use during the routing of a call both of these relays also release. With ground removed from the grid terminal of the tube and filament and plate potential applied by the release of either or both of the relays 2341 and 2304, the grid immediately assumes a negative potential relative to the filament and no plate current flows. A positive charge leaking through resistance 2344 gradually raises the potential of the condenser 2343 and also continues to alter the potential of the grid. After approximately forty-five seconds the grid having reached a definite potential relative to the filament, a plate current of sufficient magnitude causes relay 2345 to operate and this in turn causes the operation of relay 2346. Relay 2346, in operating, locks to ground supplied by key 2415 and causes the operation of relay 2414 which acts as described above, giving a sequence failure alarm. Relay 2346 also causes the illumination of lamps 2316 and 2317 to indicate the chain in trouble. After the trouble is cleared, relays 2341 and 2304 operate, removing tube 2342 from circuit and releasing relay 2345. Relay 2346 releases when key 2415 is momentarily operated, returning the circuit to normal.

*Falsely operated selector magnet of the line circuit*

If a selector magnet is falsely operated relay 2300 of the miscellaneous alarm circuit operates due to ground available on conductor 902. Relay 2300, in operating, opens the main ground chain lead, preventing the routing of any call through the unit. If the condition persists for forty-five seconds the ground chain alarm operates, giving a major alarm and lighting the lamps 2316 and 2317 as described above. Lamp 2315 is also lighted and these indications reveal to the attendant the type of trouble.

*All-trunks-busy circuit*

The circuit shown in Fig. 20 is an originating source of "All-trunks-busy" signals and "K" signals sent the calling subscribers under certain conditions, at the same time providing all-trunks-busy time integrating registers in addition to subscribers' overflow registers. The functions of this circuit may be summarized as follows:

(1) When all trunks reaching a given outlet are busy this circuit is arranged to measure the length of time this condition persists.
(2) When all trunks in the entire unit are busy this circuit is designed to
  (a) Produce and send to each calling subscriber a "letters" all-trunks-busy signal connecting each new calling line in turn during the mark portion of the signal,
  (b) Register on the subscriber's overflow register the number of attempts subscribers make during the all-trunks-busy period,
  (c) Measure the continuous duration of the production of these "letters" signals, giving an audible and visual alarm if the time exceeds a predetermined interval,
  (d) Continue to produce the "letters" signal as long as any subscriber keeps his loop closed.
(3) Whenever a trunk becomes idle this circuit is arranged to produce "K" signals at the rate of approximately nine characters per interval of two seconds and send these signals instead of the "letters" signals to the waiting subscribers.

DESCRIPTION OF OPERATION

*All trunks of a group busy*

When all of the trunks reaching a given outlet are busy the sequence circuit in the case of Fig. 12 extends a ground over the chain starting with the upper outer armature and front contact of relay 1200 and thence over conductor 1210 finally reaching conductor 2021 thereby energizing relay 2001 associated with this outlet. Relay 2001 connects interrupter 2004, giving interruptions at the rate of sixty interruptions per minute, to register 2005 which thereupon registers the number of seconds that all trunks of the group are busy. Relay 2001 also partially closes the circuit to relay 2006. In the same manner, if all the trunks associated with Fig. 14 are busy then a chain circuit from ground will be closed, resulting in the operation of relay 2007.

*All trunks of the unit busy*

When all trunks of the line concentration unit are busy, both relays 2007 and 2001 are energized, with the result that a circuit is closed for relay 2006 which thereupon becomes energized. This relay removes the connection between the right-hand contact of relay 2008 and condenser 2009 and establishes a connection between the condenser 2009 and the contacts of the interrupter relay 2010. This transfer, as will be described hereinafter, results in the production of "letters" signals once per second instead of "K" signals at the rate of about nine per second.

*Origination of call during all-trunks-busy period*

When a subscriber originates a call during the all-trunks-busy period described above, the sequence circuit places a ground on conductor 1620 extending to conductor 2020 and causing the operation of relay 2011. Relay 2011, operated, (a) connects ground to the busy-back conductor 2000 leading to conductors 1221 and 1016 and (b) closes a circuit for relay 2015 and register 2024. The ground on the busy-back lead 2000 is extended over conductor 624 and causes the operation of relay 619 and the busy-back relay 614, whereupon the lower winding of relay 607 is connected to conductor 603 leading to conductor 2003, and whereby conductor 613 is connected to conductor 602 leading to conductor 2002. Battery potential on lead 2003 causes the operation of relay 2012. This in turn causes the operation of relay 2014. Relay 2014 connects ground to armature 2 of relay 2006 leading to the winding of relay 2025. Relay 2014 also connects the winding of relay 2026 to the interrupter 2027. The interrupter 2027 is arranged to give a closed circuit of two seconds and an open circuit of four seconds. The relay 2026 operates in accordance with pulses obtained from interrupter 2027 and on operating (1) places a direct ground on conductor 2003, (2) permits relay 2028 to operate, and (3) holds relay 2014 operated. Relay 2028, in operating, produces a ground to step the selector during the all-trunks-busy condition and removes the short circuit of the lower winding of relay 2013. Such short-circuit condition may be traced from the lower inner armature relay 2028, conductor 2029 lower winding of relay 2013, condenser 2009, resistance 2018, to the back contact of the inner armature of relay 2028. Meanwhile the connection of the subscriber line to conductors 2002 and 2003 has returned the sequence circuit to normal, removing ground from conductor 2020 and if the call has been registered on meter 2024 relay 2011 releases, as will now be described.

*Counting subscribers' calls during an all-trunks-busy period*

When a subscriber calls during the all-trunks-busy period, ground that is placed on conductor 2020 by the sequence circuit is continued through the operated contact of relay 2011 to the winding of relay 2015 causing it to operate. The relay 2015 in operating supplements this ground on its own front contact and insures the operation of register 2024. Register 2024 operated, locks to this ground on lead 2020 and causes the release of relay 2015. The register, therefore operates only once on any one single grounding of lead 2020 by the sequence circuit. The function of relay 2015 is to insure the application of ground for a sufficient period to enable the slow-acting message register to function. If the all-trunks busy circuit and the line circuit, and the sequence circuit function speedily and tend to remove the ground from lead 2020 before the message register is operated, the ground on the relay 2015 will insure the operation of the message register. In this particular case, this ground on relay 2015 will be continued back on the lead 2020 and prevent the sequence circuit from dealing with another call until relay 2015 has released and removed this ground or, in other words, until the message register has functioned. Therefore, as the signals are connected to each subscriber's line, the subscriber's call is registered on register 2024.

*Transmission of letters to the subscriber during the all-trunks-busy period*

When a subscriber is connected to the all-trunks-busy circuit, as indicated hereinbefore, relay 2010 follows the sixty interruptions per minute under control of interrupter 2004 and relay 2028 follows the interrupter 2027. With relay 2028 normal, the circuit of the lower winding of relay 2013 keeps relay 2013 on its marking contact transmitting a mark out on the lead 2002 and thence to those subscriber lines associated with the all-trunks-busy circuit at the time. When relay 2028 operates, it places ground on one side of the lower winding of relay 2013 causing condenser 2009 to charge through this lower winding, causing relay 2013 to operate to the spacing contact and to transmit a space signal over the lead 2002. When the charging current has decreased sufficiently, relay 2013 again returns to marking. If relay 2010 is operated, relay 2013 does not function until relay 2010 releases. On subsequent operation of relay 2010, condenser 2009 discharges but the current in this case holds relay 2013 marking. Each subsequent release of relay 2010 again causes a spacing signal to be transmitted to the subscriber. Therefore, a space signal of approximately 22 milliseconds once per second is registered during the active interval of the circuit of interrupter 2027 while the circuit originates a steady mark signal during the silent period.

*A trunk becomes idle while letters are being sent out to subscribers*

As soon as a trunk in the group involved becomes idle under this condition, ground is removed from either lead 2021 to relay 2001 or the lead to relay 2007, causing the release of such relay and in turn the release of relay 2006. The release of relay 2006 opens the contact and winding circuit of relay 2010, causing its release and at the same time connects battery to relay 2008. The connection of the battery to relay 2008 causes a current flow in both the upper and lower windings of this circuit, the current in the upper winding tending to operate the relay to its left-hand contact and that in the lower winding tending to keep the relay on its right-hand contact providing relay 2028 is operated. When the charging current for condenser 2030 flowing through the lower winding of relay 2008 has decreased sufficiently, relay 2008 operates on its upper winding. As soon as the left-hand contact closes, the current is reversed in the upper winding of relay 2008, tending to drive the armature to the right-hand contact. The charge on condenser 2030, however, causes a current to flow through the lower winding in a direction tending to hold relay 2008 on its left-hand contact. When this discharge current has been sufficiently dissipated, relay 2008 is driven to its right-hand contact under the influence of the reversed current in the upper winding. When the left-hand contact is opened the reverse current in the upper winding ceases and the current through the lower winding and the operating current through the upper winding again begin to flow, causing a repetition of the complete cycle. Relay 2008 therefore operates and releases at a rate of about nine cycles per second. The short circuit of the lower winding of relay 2013 occurs nine times per second instead of once per second. Space pulses of 22 milliseconds nine times per second create "K" characters on the subscriber's teletypewriter as a signal that a trunk is now available. These signals are only produced during the active period of interrupter 2027. The subscriber disconnects and tries again. If several subscribers have been waiting, only one will be given service over the available trunk and the others in turn will be again connected to the all-trunks-busy circuit which by that time will be producing letter signals.

*Timing the interval letters are being produced*

When relay 2014 operates during an all-trunks-busy period, relay 2025 operates since relay 2006 is at this time operated. Each time that interrupter 2027 extends ground to the winding of relay 2026, relay 2028 becomes operated and extends a connection from ground on the upper armature and front contact of relay 2028, the upper inner armature and front contact of relay 2025 to the winding of rotary magnet 2037. It will be noted that in the upper right-hand portion of this figure there are two switches, A and B, represented. The switch A comprises the wiper and bank 2038, a set of off-normal contacts 2043, the rotary magnet 2037, and the release magnet 2044. The switch B comprises the wiper and contacts 2036, the off-normal device 2045, the rotary magnet 2040, and the release magnet 2035. If the all-trunks-busy condition persists, each operation of relays 2026 and 2028 in response to the interrupter 2027 causes the rotary magnet 2037 to step the selector A one terminal. On the ninth terminal, ground is connected to rotary magnet 2040 of switch B causing it to step up one terminal. When selector A reaches terminal 10, relay 2039 becomes operated and energizes the release magnet 2044 whereupon the selector A is returned to normal and begins stepping around again. When selector B reaches a predetermined terminal, relay 2041 operates and locks, causing lamp 2046 to light and an audible signal to sound as an indication to the attendant that the all-trunks-busy condition has lasted too long. The attendant may, by operating key 2042, release relay 2041 to silence the audible alarm and extinguish the lamp signal. If at any time prior to the operation of relay 2041, a trunk becomes idle, relay 2006 releases causing the release of relay 2025. The release of relay 2025 places ground on the release magnets of both selectors, causing the switches to return to normal.

What is claimed is:

1. In a communication system, a station circuit, a trunk circuit for extending said station circuit to a distant point and supervisory means in said trunk circuit comprising a plurality of discharge tube and condenser timing circuits, means including a first timing circuit acting to report the initiation of a signal from said distant point, means including a second timing circuit acting to report one ending of said signal and means including a third timing circuit acting to report a different ending of said signal.

2. In a communication system, a station circuit, a trunk circuit for extending said station circuit to a distant point and supervisory means in said trunk circuit comprising a supervisory relay responsive to signals from said distant point, means including a plurality of space discharge tube and condenser timing circuits connected to the contacts of said relay for discriminating between disconnect and break signals to which said relay responds, and other apparatus selectively responsive thereto to produce a disconnect indication only in response to a disconnect signal.

3. In a communication system, a station circuit, a trunk circuit for extending said station circuit to a distant point and supervisory means in said trunk circuit comprising a supervisory relay responsive to signals from said distant point and a plurality of discharge tube and condenser timing circuits responsive to the said relay, means including a first of said timing circuits for reporting the initiation of a signal, means including a second of said timing circuits for reporting the ending of said signal in one manner and means including a third of said timing circuits for reporting the ending of said signal in another manner.

4. In a communication system, a station circuit, a trunk circuit for extending said station circuit to a distant point and supervisory means in said trunk circuit comprising a supervisory relay responsive to signals from said distant point and a plurality of discharge tube and condenser timing circuits responsive to the said relay, means including a first of said timing circuits for reporting the initiation of a signal, means including second of said timing circuits for reporting the ending of said signal in one manner, means including a third of said timing circuits for reporting the ending of said signal in another manner, and means including a fourth of said timing circuits for reporting the continuance of said signal beyond a predetermined length of time.

5. In a communication system, a trunk circuit extending between two points for establishing connections between subscribers' stations and operators' positions equipped with teletypewriters, a termination circuit for each end of said trunk, each said termination circuit including supervisory means responsive to signals transmitted over said trunk, said supervisory means including a relay and a plurality of tube and condenser timing circuits responsive to said relay, means including a first of said timing circuits for reporting the initiation of a signal, means including a second of said timing circuits for reporting the ending of said signal in one manner and means including a third of said timing circuits reporting the ending of said signal in another manner.

6. In a communication system, a trunk circuit extending between two points for establishing connections between subscribers' stations and operators' positions equipped with teletypewriters, a termination circuit for each end of said trunk, each said termination circuit including supervisory means responsive to signals transmitted over said trunk, said supervisory means including a relay and a plurality of tube and condenser timing circuits responsive to said relay, means including a first of said timing circuits for reporting the initiation of a signal, means including a second of said timing circuits for reporting the ending of said signal in one manner, means including a third of said timing circuits reporting the ending of said signal in another manner, and means including a fourth of said timing circuits for reporting the continuance of said signal beyond a predetermined time limit.

7. In a communication system, a trunk circuit extending between two points for establishing connections between stations equipped with teletypewriters, a termination circuit for each end of said trunk, means for communicating between two stations over an established connection including said trunk comprising means for transmitting communication signals directly from one station to the other, and means for sectionalizing said established connection in response to the transmission of supervisory signals, and translating said supervisory signals at the beginning of each section into signals of a type suitable for transmission over the succeeding section, said last means including in the said trunk termination circuit at the near end of said trunk a tube and condenser timing circuit for reporting the initiation of a supervisory signal, said last means also including in the said trunk termination circuit at the far end of said trunk a plurality of tube and condenser timing circuits, means including a first of said timing circuits for reporting the initiation of a supervisory signal, means including a second of said timing circuits for reporting one ending of said supervisory signal, and means including a third of said timing circuits for reporting another ending of said supervisory signal.

8. In a communication system, a trunk circuit extending between two points for establishing connections between stations equipped with teletypewriters, a termination circuit for each end of said trunk, means for communicating between two stations over an established connection including said trunk comprising means for transmitting communication signals directly from one station to the other, and means for sectionalizing said established connection in response to the transmission of supervisory signals, and translating said supervisory signals at the beginning of each section into signals of a type suitable for transmission over the succeeding section, said last means including in the said trunk termination circuit at the near end of said trunk a tube and condenser timing circuit for reporting the initiation of a supervisory signal, said last means also including in the said trunk termination circuit at the far end of said trunk a plurality of tube and condenser timing circuits, means including a first of said timing circuits for reporting the initiation of a supervisory signal, means including a second of said timing circuits for reporting one ending of said supervisory signal, means including a third of said timing circuits for reporting another ending of said supervisory signal, and means including a fourth of said timing circuits for reporting the continuance of said supervisory signal beyond a predetermined time.

9. In a multisection line telegraph communication path, means for transmitting break and disconnect conditions having identical initial characteristics and different terminal characteristics, testing means for testing one of said sections for a break condition and for a disconnect condition, said means including a first timing circuit for reporting a terminal characteristic indicative of a break condition and a second timing circuit for reporting a terminal characteristic indicative of a disconnect condition, and means controlled as a result of a prolonged spacing condition upon said section to cause said means to function to make said test.

10. In a multisection line telegraph communication path, means for transmitting spacing, break and disconnect conditions having identical initial characteristics and different terminal characteristics, testing means for testing one of said sections for a break condition and for a disconnect condition, said means including a first timing circuit for reporting initial characteristics common to said spacing, break and disconnect conditions and for subsequently reporting a terminal characteristic indicative of a break condition and a second timing circuit for reporting a terminal characteristic indicative of a disconnect condition, and means controlled as a result of a prolonged spacing condition upon said section to cause said means to function to make said test.

11. In a multisection line telegraph communication path, means for transmitting spacing, break and disconnect conditions, said spacing and break conditions having initial identity and qualitative terminal difference and said spacing and disconnect conditions having only durational difference, testing means for testing one of said sections for a break condition and for a disconnect condition, said means including a circuit for reporting a qualitative difference indicative of a break condition and a timing circuit for reporting a durational difference indicative of a disconnect condition, and means controlled as a result of a prolonged spacing condition upon said section to cause said means to function to make said test.

12. In a multisection line telegraph communication path, means for transmitting spacing, break and disconnect conditions, said break condition having initial identity with and durational difference followed by qualitative difference from said spacing condition, and said disconnect condition having only durational difference from said spacing condition, testing means for testing one of said sections for a break condition and for a disconnect condition, said means including a first timing circuit for reporting a durational difference indicative of break or disconnect conditions and for thereafter reporting a qualitative difference indicative of a break condition and a second timing circuit for reporting a durational difference indicative of a disconnect condition, and means controlled as a result of a prolonged spacing condition upon said section to cause said means to function to make said test.

13. In a multisection line telegraph communication path, means for transmitting spacing, break and disconnect conditions, said break condition having initial identity with and durational difference followed by qualitative difference from said spacing condition, and said disconnect condition having only durational difference from said spacing condition, testing means for testing one of said sections for a break condition and for a disconnect condition, said means including a first timing circuit for reporting a durational difference indicative of break or disconnect conditions and for thereafter reporting a qualitative difference indicative of a break condition and a second timing circuit for reporting a durational difference indicative of a disconnect condition, means including a third timing circuit for reporting the continuation of the qualitatively different portion of a reported break condition beyond a predetermined length of time, and means controlled as a result of a prolonged spacing condition upon said section to cause said means to function to make said test.

14. In a multisection line telegraph communication path, means for transmitting break and disconnect conditions, testing means for testing one of said sections for a break condition and for a disconnect condition, said means including a first timing circuit comprising an electrostatically controlled relay having a delaying instrumentality associated therewith for reporting a break condition and a second timing circuit comprising an electrostatically controlled relay having a delaying instrumentality associated therewith for reporting a disconnect condition, and means controlled as a result of a prolonged spacing condition upon said section to cause said means to function to make said test.

15. In a multisection line telegraph communication path, means for transmitting break and disconnect conditions having identical initial characteristics and different terminal characteristics, testing means for testing one of said sections for a break condition and for a disconnect condition, said means including a first timing circuit comprising an electrostatically controlled relay and a retarding impedance device associated therewith for reporting the initial characteristic of a break condition or a disconnect condition, said means also including a second timing circuit comprising an electrostatically controlled relay and a retarding impedance device associated therewith for reporting the terminal characteristic of a disconnect condition, and means controlled as a result of a prolonged spacing condition upon said section to cause said means to function to make said test.

16. A teletypewriter switching system comprising permutation code controlled line selecting devices, means for energizing said permutation code controlled line selecting devices, and means responsive to the energization thereof for transmitting a preliminary signal of indeterminate duration for indicating such energization.

17. A teletypewriter switching system comprising a teletypewriter trunk interconnecting an operator's position and a satellite office, permutation code equipment at said satellite office, means controllable from said operator's position for seizing said permutation code equipment and associating it with said trunk, said trunk having a path inward to said operator's position and a path outward therefrom, and means responsive to the seizure of said permutation code equipment for transmitting a signal of indeterminate duration indicative thereof over said inward path.

18. A teletypewriter switching system comprising a satellite office, lines connecting subscriber stations individually to said office, trunks connecting said office with a central office, a director at said satellite office comprising means responsive to permutation code signals for connecting a particular subscriber line to a particular trunk over which said signals are received, means for transmitting to said central office a signal of indeterminate duration to indicate readiness of said direction to respond to said permutation code signals, means including an operator's cord circuit for applying such signals to said trunk, means responsive to connection of said line to said trunk for terminating transmission of said readiness indicating signal, and means also responsive to connection of said line to said trunk to release said director for connecting another line to another trunk.

19. A teletypewriter switching system comprising a satellite office, lines connecting subscriber stations individually to said office, trunks connecting said office with a central office, a director at said satellite office comprising means responsive to permutation code signals for connecting a particular subscriber line to a particular trunk over which said signals are received, means for transmitting to said central office a signal of indeterminate duration to indicate readiness of said director to respond to said permutation code signals, means including an operator's cord circuit for applying such signals to said trunk, and means responsive to connection of said line to said trunk to release said director for connecting another line to another trunk.

20. A teletypewriter switching system comprising a satellite office, lines connecting subscriber stations individually to said office, trunks connecting said office with a central office, a director at said satellite office comprising means responsive to permutation code signals for connecting a particular subscriber line to a particular trunk over which said signals are received, means controlled from said central office over said trunk for associating said director with said trunk, means for transmitting to said central office a signal of indeterminate duration to indicate readiness of said director to respond to said permutation code signals, means including an operator's card circuit for applying such signals to said trunk, means responsive to connection of said line to said trunk for terminating transmission of said readiness indicating signal, and means also responsive to connection of said line to said trunk to release said director for connecting another line to another trunk.

21. A teletypewriter communication system comprising a plurality of trunks, a power driven distributor connectable to any one of said trunks for receiving permutation code signals sent over said trunk from a remote point, means at a remote point for seizing a trunk, means responsive to seizure of said trunk at said remote point in preparation for sending such signals to apply driving power to said distributor, and means for transmitting to said remote point a continuous signal of indeterminate duration for indicating application of driving power to said distributor and attainment by said distributor of predetermined speed.

22. A system comprising channels of telegraph transmission to be selected, a permutation code selector for selecting one of said channels, means controllable from a remote point for seizing said selector for utilization, means responsive to seizure for transmitting a signal of indeterminate duration for indicating back to said remote point the readiness of said seized selector, and further means for terminating transmission of said signal for indicating back to said remote point the completion of a selecting function by said selector.

23. A teletypewriter switching system comprising permutation code controlled line selecting devices, means for energizing said permutation code controlled line selecting devices and means responsive to the energization thereof for transmitting a preliminary signal of indeterminate duration capable of outlasting transient conditions of signal transmission interference for indicating such energization.

24. A teletypewriter switching system comprising permutation code controlled line selecting devices, means for energizing said permutation code controlled line selecting devices, a line extending to a remote point at which the energization of said devices is to be indicated, and means responsive to the energization thereof for transmitting a preliminary signal for indicating such energization, said signal comprising a continuous condition impressed upon said line.

25. In a teletypewriter switching system, permutation code controlled line selecting devices normally non-responsive to permutation code combinations, signal responsive means for conditioning said selecting devices to a condition responsive to permutation code combinations, and means responsive to the conditioning of said devices for transmitting a continuous signal indicative of said conditioning.

26. In a teletypewriter switching system, permutation code controlled line selecting devices normally non-responsive to permutation code combinations, signal responsive means for conditioning said selecting devices to a condition responsive to permutation code combinations, a line extending to a remote point at which the conditioning of said line selecting devices is to be indicated, and means responsive to the conditioning of said line selecting devices for initiating without capability of terminating the transmission over said line to said remote point of a signal indicative of said conditioning.

27. In a teletypewriter switching system, permutation code controlled line selecting devices normally non-responsive to permutation code combinations, signal responsive means for preparing said line selecting devices to be responsive to permutation code combinations, a line extending to a remote point at which the preparation of said line selecting devices is to be indicated, and means responsive to the preparation of said line selecting devices for impressing on said line a signaling condition indicative of said preparation and continuing until action taken at said remote point in response to said signaling condition terminates the signaling condition.

28. In a teletypewriter switching system, permutation code controlled line selecting devices normally non-responsive to permutation code combinations, signal responsive means for preparing said line selecting devices to be responsive to permutation code combinations, a line extending to a remote point at which the preparation of said line selecting devices is to be indicated, means responsive to the preparation of said line selecting devices for connecting a signaling potential to said line over a provisional path for indicating at said remote point the preparation of said line selecting devices, and means for substituting a final path over which the connection of said signaling potential to said line is continued.

29. In a teletypewriter switching system, permutation code controlled line selecting devices normally non-responsive to permutation code combinations, signal responsive means for preparing said line selecting devices to be responsive to permutation code combinations, a line extending to a remote point at which the preparation of said line selecting devices is to be indicated, means responsive to the preparation of said line selecting devices for connecting a signaling potential to said line over a provisional path for indicating at said remote point the preparation of said line selecting devices, and means for substituting a final path over which the connection of said signaling potential to said line is continued, said final path having means associated therewith for interrupting said connection in accordance with any of certain permutation code combinations.

30. In a teletypewriter switching system, permutation code controlled line selecting devices normally non-responsive to permutation code combinations, a pair of lines extending from said line selecting devices to a distant point, means responsive to a signaling condition received over one of said lines from said distant point for preparing said line selecting devices to be responsive to permutation code combinations, and means responsive to the preparation of said line selecting devices for impressing on the other of said lines a signaling condition for transmission to said remote point indicative of said preparation and continuing until action taken at said remote point in response to said signaling condition effects a control over said first-mentioned line to terminate the signaling condition on said other line.

31. In a teletypewriter switching system, comprising a satellite office, lines connecting subscriber stations individually to said office, trunks connecting said office with a central office, a director at said satellite office comprising means responsive to permutation code signals for connecting a particular subscriber line to a particular trunk over which signals are received, means for transmitting to said central office a signal of indeterminate duration capable of outlasting transient conditions of signal transmission interference to indicate readiness of said director to respond to said permutation code signals, means including an operator's cord circuit for applying said permutation code signals to said trunk and means responsive to connection of said line to said trunk to release said director for connecting another line to another trunk.

FULLERTON S. KINKEAD.
CHARLES W. LUCEK.